(12) United States Patent
Manohar et al.

(10) Patent No.: US 9,985,774 B2
(45) Date of Patent: May 29, 2018

(54) METHODS AND SYSTEMS FOR SYNCHRONIZATION BETWEEN MULTIPLE CLOCK DOMAINS

(71) Applicant: Cornell University, Ithaca, NY (US)

(72) Inventors: Rajit Manohar, New York, NY (US); Sandra J. Jackson, Cazenovia, NY (US)

(73) Assignee: Cornell University, Ithaca, NY (US)

( * ) Notice: Subject to any disclaimer, the term of this patent is extended or adjusted under 35 U.S.C. 154(b) by 0 days. days.

(21) Appl. No.: 15/481,407

(22) Filed: Apr. 6, 2017

(65) Prior Publication Data

US 2017/0214514 A1     Jul. 27, 2017

Related U.S. Application Data

(63) Continuation of application No. PCT/US2015/054311, filed on Oct. 6, 2015.

(60) Provisional application No. 62/060,546, filed on Oct. 6, 2014.

(51) Int. Cl.
| | | |
|---|---|---|
| *H04L 7/02* | (2006.01) | |
| *H04L 7/00* | (2006.01) | |
| *H04L 12/863* | (2013.01) | |

(52) U.S. Cl.
CPC ........ *H04L 7/0037* (2013.01); *H04L 47/6245* (2013.01)

(58) Field of Classification Search
CPC .................. H04L 7/0037; H04L 47/6245
USPC ......................................... 375/359; 713/401
See application file for complete search history.

(56) References Cited

U.S. PATENT DOCUMENTS

| | | | |
|---|---|---|---|
| 5,594,743 A | 1/1997 | Park | |
| 9,355,690 B1 * | 5/2016 | Tuan | G11C 7/1039 |
| 2002/0167337 A1 | 11/2002 | Chelcea et al. | |
| 2005/0102545 A1* | 5/2005 | Clavequin | G06F 1/12 |
| | | | 713/401 |
| 2010/0115322 A1 | 5/2010 | Petrick | |
| 2010/0209111 A1 | 8/2010 | Loprieno et al. | |

OTHER PUBLICATIONS

International Search Report and Written Opinion dated Feb. 4, 2016 for International Application No. PCT/US2015/054311, filed on Oct. 6, 2015 (9 pages).

* cited by examiner

*Primary Examiner* — Chieh M Fan
*Assistant Examiner* — Fitwi Hailegiorgis
(74) *Attorney, Agent, or Firm* — Perkins Coie LLP

(57) ABSTRACT

A synchronization solution is described, which, in one aspect, allowed finer grained segmentation of clock domains on a chip. This solution incorporates computation into the synchronization overhead time and is called Gradual Synchronization. With Gradual Synchronization as a synchronization method, the design space of a chip could easily mix both asynchronous and synchronous blocks of logic, paving the way for wider use of asynchronous logic design.

14 Claims, 38 Drawing Sheets

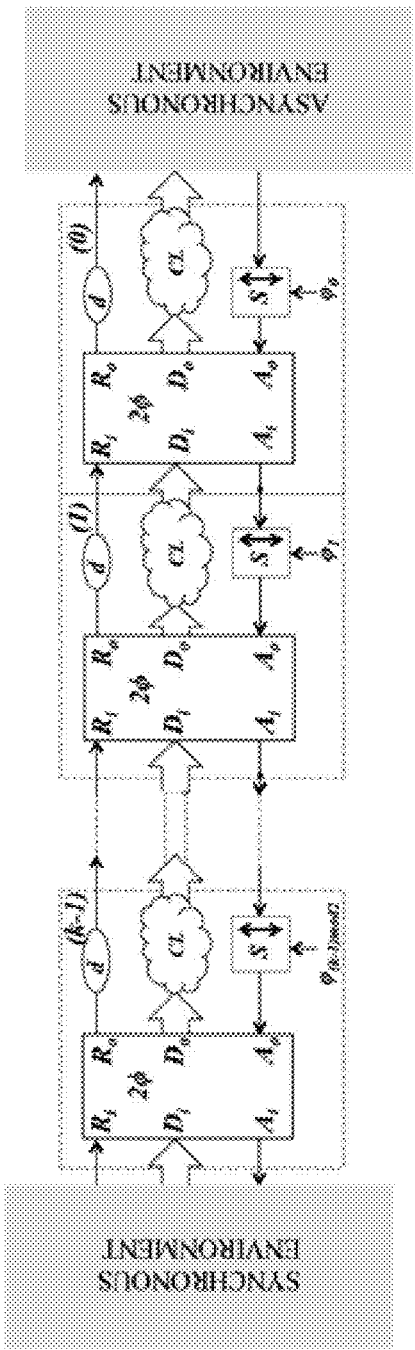
FIG. 13
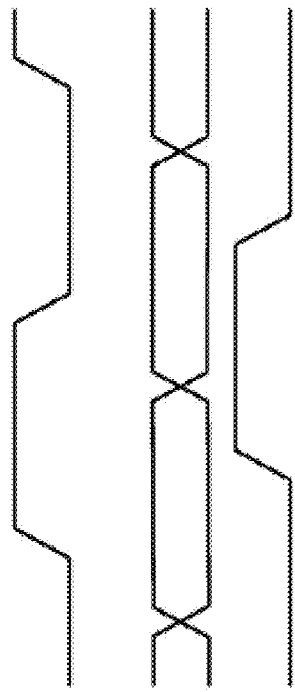
FIG. 14
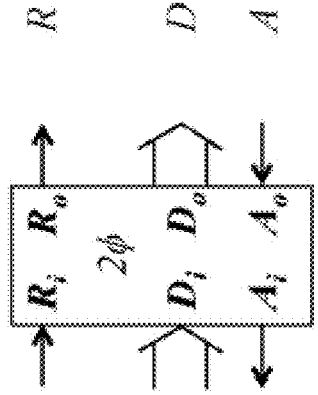

METHODS AND SYSTEMS FOR SYNCHRONIZATION BETWEEN MULTIPLE CLOCK DOMAINS

CROSS REFERENCE TO RELATED APPLICATIONS

This patent document is a continuation of International Application No. PCT/US2015/054311 entitled "Methods and Systems for Synchronization Between Multiple Clock Domains" and filed Oct. 6, 2015, which claims the priority and benefit of U.S. Provisional Patent Application No. 62/060,546 entitled "Methods and Systems for Synchronization Between Multiple Clock Domains" and filed Oct. 6, 2014. The entire content of the before-mentioned patent applications are incorporated by reference as part of the disclosure of this document.

BACKGROUND

This patent document relates to systems, devices, and processes for synchronization between of circuits of multiple clock domains.

Synchronous circuit design is the most accepted style of circuit design for modern microprocessors and other digital circuit systems. This method distributes computation into segments meant to complete during one cycle of a clock. This clock must be routed across the entire die so that each segment of computation appears to complete its portion of work at the same time as all other segments and is therefore known to be ready for the next portion of work. One global clock distributed across an entire die becomes more difficult to maintain due to larger dies.

SUMMARY

This document discloses a synchronization method, called a gradual synchronizer, useful for mixing all types of timing domains, including non-clocked, as well as any clock relationship. Comparison of the gradual synchronizer technique with other synchronizer is provided with respect to latency, throughput, area, power and failure rate. Since gradual synchronization reduces the appearance of synchronization latency in the presence of available computation, a sample set of designs in which gradual synchronization could provide performance benefits are disclosed. Embodiments of a gradual synchronizer in the network interface of a network-on-chip (NoC) are also disclosed. Circuit level simulations demonstrate performance savings using the gradual synchronization method.

In one example aspect, a device for gradual clock synchronization is disclosed. The device includes a cascade of multiple First In First Out (FIFO) blocks coupleable between a first clock domain comprising circuits clocked by a first clock and a second clock domain comprising circuits clocked by a second clock. Two adjacent FIFO blocks in the cascade include data storage FIFOs that are connected in parallel to each other via a fixed delay circuit, a data computation block and a synchronizer. The data computations through the data computation block occur in parallel to clock synchronization through the synchronizer.

In another example aspect, a device is disclosed as having a first clock domain comprising circuits clocked by a first clock, a second clock domain comprising circuits clocked by a second clock, a first FIFO block with a data output, wherein the first FIFO block operates without a master clock and is connected to the first clock domain to receive data from the first clock domain, a second FIFO block with a data input, wherein the second FIFO block operates without a master clock and is connected to the second clock domain to send data to the second clock domain, and a data computation block placed between the data output of the first FIFO block and the data input of the second FIFO block.

In yet another example aspect a method performed by a first FIFO block of a device is disclosed. The method includes receiving a request signal passing through a synchronizer block from a second FIFO block connected to a second clock domain comprising circuits clocked by a second clock, wherein the first FIFO block is connected to a first clock domain comprising circuits clocked by a first clock, the second FIFO block receives data from the second clock domain, the first FIFO block sends data to the first clock domain, and the synchronizer is to synchronize signals output from the second clock domain to the first clock domain, receiving the request signal passing through a fixed delay element, and receiving a data input signal from the first FIFO block passing through a computation block placed between the first FIFO block and the FIFO block.

BRIEF DESCRIPTION OF THE DRAWINGS

FIG. 13 shows an example of a two-phase synchronous to asynchronous gradual synchronizer.

FIG. 14 shows an example of a two-phase FIFO buffer for synchronous to asynchronous gradual synchronization.

DETAILED DESCRIPTION

Figure 1:
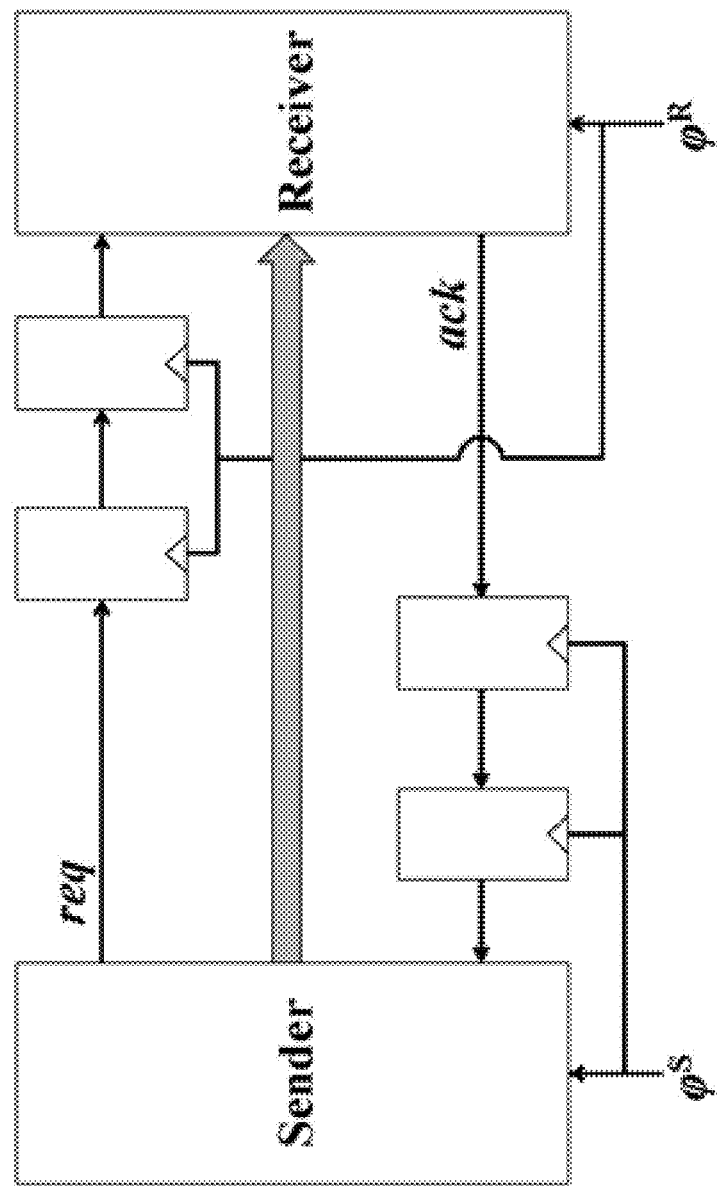
FIG. 1 shows an example of a classic two-flop synchronizer φR is the receiver clock and φS is the sender clock. Two sets of flip-flops are needed for complete synchronization between the two clocked environments. One set for the req signal and one for the ACK signal.

Synchronous circuit design is the most accepted style of circuit design for modern microprocessors and other digital circuit systems. This method distributes computation into segments meant to complete during one cycle of a clock. This clock must be routed across the entire die so that each segment of computation appears to complete its portion of work at the same time as all other segments and is therefore known to be ready for the next portion of work.

As the notion of one global clock distributed across an entire die becomes more difficult to maintain due to larger dies and increasing within die variation some modern circuit designs divide the die into multiple regions. Circuits within the same region all use the same local clock, but the different regions all have different clocks. Each region is referred to as a clock domain. This type of system is called a globally asynchronous, locally synchronous (GALS) system.

While GALS systems solve the problem of distributing one clock throughout an entire chip, a new challenge is created when the locally synchronous regions must communicate with one another. The two regions are now asynchronous with respect to each other. A signal is synchronous if its voltage is established and stable around the sampling edge of the reference clock. If a signal from one region were connected without compensation for clock differences to another region, the sender region may not be holding data stable at the time the receiving region samples it. This would cause a metastability, which is an occurrence of Buridan's principle.

Buridans Principle: A discrete decision based upon an input having a continuous range of values cannot be made within a bounded length of time.

The circuit sampling the signal must decide whether the signal is a logic value of zero or a logic value of one. This decision is made based on the voltage of the signal, which is a continuous value. If the voltage is changing at the point the receiving circuit samples the signal, there is no way to be sure how long the circuit will take to make a decision. This could cause the circuit to malfunction if it takes too long to make the decision. The occurrence of metastability in a physical circuit was first demonstrated in 1973.

In order to avoid corruption of data during communication across clock domain boundaries circuitry must be added to synchronize the data to the receiver's clock. These circuits are referred to as synchronizers. Synchronizers are difficult to design because of the possibility of metastable data. Synchronizers exist to completely eliminate the possibility of a circuit error due to a metastability, but these synchronizers can be difficult to design and come at a substantial performance cost. In order to combat the performance hit synchronizers that reduce the probability of a failure due to metastability to an acceptable range for the design are commonly used instead. These synchronizers can exhibit high latency and low throughput. Since cycles can be lost to synchronization designers must carefully weigh the advantages of increasing the number of clock domains against the additional latency of more synchronizers.

This document provides, among other techniques, gradual synchronization as a synchronization method that can reduce the synchronization bottleneck by gradually synchronizing signals. In this way synchronization can be performed in parallel with computation making it possible to implement a GALS approach at a finer granularity than previously possible. In addition since the gradual synchronizer employs a handshaking circuit structure, some asynchronous domains can seamlessly be included in the system. Asynchronous logic uses no clocks and this can pose an advantage for the performance of certain circuits.

Section headings are used herein to facilitate a reader's understanding of the discussion, and does not in any way limit the scope of the technology disclosed.

Synchronizer Circuits are extremely vulnerable to modern issues such as variation. Variation can significantly alter how fast a circuit can resolve a metastable signal.

Synchronization

There is a large collection of previous work on the topic of synchronization. Initially, synchronizers were designed to completely eliminate the possibility of metastable behavior. Eventually, it became apparent that these circuits were too costly and designs turned to exploiting known relationships between the clocks of the two communicating domains in order to eliminate metastability. However, methods were still needed that were capable of synchronizing signals between domains where clock relationships were completely unknown at design time. As asynchronous circuit design re-emerged as a technique capable of reducing power, synchronizers were needed that could interface a clocked domain with an entirely asynchronous domain. Circuit techniques aimed at saving power or reducing chip temperature, like dynamic voltage and frequency scaling, require the need for synchronization between two domains where the clock speeds changed during operation became apparent. These situations extended the search for synchronizers to finding synchronizers that reduced the probability of failure due to metastability to an acceptable level instead of completely eliminating it.

Synchronizers

Pausable and Stretchable Clocks

Pausable and Stretchable clocks are an early subset of synchronization solutions that can handle completely asynchronous clock domains, where the timing relationships are unknown. The synchronizer circuit simply detects the metastable state and pauses the receiver clock until the metastability is resolved or stretches the receiver clock to prevent a metastability from occurring. These solutions can be viewed as synchronizing the clock to the input; rather than the input to the clock. Pausable clock methods were some of the first synchronization solutions developed to combat metastability while maintaining ease of design and testability. Early versions relied on timing restrictions to ensure correct order of operations and data stability. Q-Modules provided a more modular design method and preserved order of operation by employing some acknowledgment that the modules were ready for the next data. One pausable clocking scheme uses asynchronous FIFOs to communicate between pausable clock circuitry in the synchronous modules. An asynchronous wrappers method stretches the receiver clock until an asynchronous handshake is completed between the wrapper and the sending environment. The synchronous circuit asserts the clock stretch signal anytime communication is required on any input or output port until the asynchronous handshake of the wrapper is complete. This scheme prevents a metastability from ever occurring instead of detecting a metastability and then pausing the clock until the metastability is resolved. Another method proposes using an arbiter to detect metastability between the clock and the control signals of an asynchronous handshake and pauses the clock until the metastability is resolved. An asynchronous FIFO decouples the synchronous to asynchronous and asynchronous to synchronous interfaces allowing the producer to send data every clock cycle if the FIFO is empty. These methods are extremely robust in that they completely eliminate the probability of failure due to metastability. However, as circuit complexity and clock frequencies increase these solutions become more costly since they cannot maintain high-bandwidth. They also incur a penalty since the clock for the entire receiving domain is paused in the case of a synchronization issue.

Synchronizers for Phase Differences

In some circuit designs, different clock domains use clocks that have the same frequency, but the transitions are out of phase relative to each other. In these cases it is often beneficial to use methods that take advantage of this knowledge. One conventional technique includes a method that applies a data delay to each data input entering a clock domain in order to readjust the data to the receiver's clock. This method uses a training period to learn the proper delay to apply to each input, once known the circuit can apply the delays during normal circuit operation. The training period can be repeated if clock drift occurs. A method called STARI uses a self-timed FIFO to interface sender and receiver timing domains and accommodates for clock skew. The self-timed FIFO serves as sufficient synchronization because the clocks at either end are simply out of phase, therefore the FIFO operation can be set up to never over or underflow and be kept at approximately half full. The use of these types of synchronizers is desirable in an environment where clocks are of the same frequency but have phase differences, because they introduce only a small amount of overhead to circuits.

Synchronizers for Systems with Known Frequency Differences

Another possibility that has been exploited in previous synchronizer designs is a relationship between the clock frequencies. If the clocks are available to the synchronizer and are periodic it is possible to create a circuit to predict timing conflicts before they occur even if the frequencies are different. This is accomplished by creating fast forwarded versions of the clocks and then comparing those in advance. If a conflict is detected sampling of the data can then be delayed until it is safe.

Two Flip-Flop Synchronizer

The most common simple synchronizer is the so-called Two Flip-Flop Synchronizer. This synchronizer is capable of synchronizing two completely asynchronous domains. It trades robustness for a low probability of failure, enabling it to synchronize the incoming request to the clock more efficiently. The signal to be synchronized is passed through two sequential flip-flops that are clocked by the receiver's clock. While the two flip-flops are sufficient for synchronization, the circuit must also ensure that any signals traveling from the sender to the receiver are held stable FIG. 1 shows an example of a classic two-flop synchronizer $\varphi^R$ is the receiver clock and $\varphi^S$ is the sender clock. Two sets of flip-flops are needed for complete synchronization between the two clocked environments. One set for the req signal and one for the ack signal long enough for the receiving side to latch them. The receiver must send an acknowledge signal back to the sender, and that signal must be synchronized to the sender's clock. The synchronizer shown synchronizes control signals sent between the sender domain and receiver domain. Data can be added by ensuring data is stable before sending out the request, in this way only the request and acknowledge signals need to be synchronized. Other versions of this synchronizer type can be implemented including having data traveling in both directions. The big drawback to this type of synchronizer is the latency and throughput. Optimized designs of this synchronizer type have often led to incorrect operation. Clever modifications, primarily to the surrounding circuitry, avoid increasing the failure rate while improving the latency and throughput. The simple four-phase synchronizer resembles the synchronizer in FIG. 1. The circuitry of the fast four-phase synchronizer succeeds in reducing latency by changing the logic to remove extra flip-flops while minimally altering the path of the synchronizing request and acknowledge signals. Additional latency reduction can be achieved by changing to a two-phase handshake as in the fast two-phase synchronizer.

Pipeline Synchronization

One convention scheme uses pipeline synchronization as a high throughput synchronization solution. The pipeline synchronizer is constructed of a series of asynchronous FIFO stages, each stage attempts to further adjust signal timing to the clock domain of the receiver. This method is capable of synchronizing any signal, regardless of whether the signal originates from a synchronous circuit or from an asynchronous circuit. Since the synchronizer incorporates handshaking FIFO blocks as part of the method to reduce the probability of failure, multiple signals can be in the synchronization pipeline at the same time. While the throughput of this method can be high the latency is still a significant problem as each additional FIFO stage adds half of the receiver's clock cycle to the latency. This work is discussed in greater detail in this document because the gradual synchronization approach builds on pipeline synchronization.

Mixed-Clock FIFO

The general idea behind mixed-clock FIFO synchronizers is that the FIFO is a circular array of data cells. The sender places data into a cell and data remains in the same cell until the receiver domain retrieves it. The sender and receiver domains may have different clocks or be completely asynchronous. Early designs rely on a RAM to store the data items with counters that are used to determine the location head and tail pointers as well as the status of the data in the FIFO. This design is meant to operate at very low clock frequencies placing the failure rate at an acceptable level without using synchronization circuits. A similar design that can be used at higher frequencies, which uses synchronizers to synchronize the addresses of the head and tail pointers on every clock cycle. While this version is more robust the synchronization scheme decrease the FIFO's throughput capability. Some mixed-clock FIFOs use specially designed FIFO cells (similar to registers) to hold the data. One such design, reduces the synchronizer requirement to one synchronizer per cell, but it can only be used to interface two clocked domains. Another design includes an interface for asynchronous environments as well. In addition synchronization takes place only on the signals that control the empty and full flags, using flip-flop synchronizers. If the FIFO is busy (partially full) then the receiver can grab data from the next cell safely and very quickly. However, if the FIFO is empty or approaches full the synchronization overhead is exposed. Efficient use of this method requires knowledge of the relative operating frequencies of the domains to choose an appropriate number of data cells in order to avoid exposing the synchronization latency. Another design uses circuits that can mediate between clock domains with specific relationships, their method can be applied to FIFO interfaces and for systems with those particular types of clock relationships the method can significantly reduce synchronization delays. Mixed-clock FIFOs are sometimes called dual-clock FIFOs.

Bi-Synchronous FIFO

This FIFO design is similar to the mixed-clock FIFOs above, except it uses a token ring encoding scheme on the read/write pointers to synchronize the computation of the empty and full signals. The write and read tokens are passed through a ring of flip-flops that determines which data register is safe to write or read next. This design avoids the use of status registers, is implementable using standard cells and includes a lower latency mode for mesosynchronous clocks. A mesosynchronous clock is one which shares the same frequency with another reference clock but the phase offset of the two clocks is unknown.

Even/Odd Synchronizer

The even/odd synchronizer is a fast, all digital periodic synchronizer. It measures the relative frequency of the two clocks and then computes a phase estimate using interval arithmetic. The transmitting side writes registers on alternating clock cycles and the receiver uses the estimate to decide which register is safe to sample. In order to ensure that every data is sampled this approach must be integrated with flow control. This approach requires that the two communicating domains have a clock, neither can be asynchronous.

Pipeline Synchronization

Figure 2:
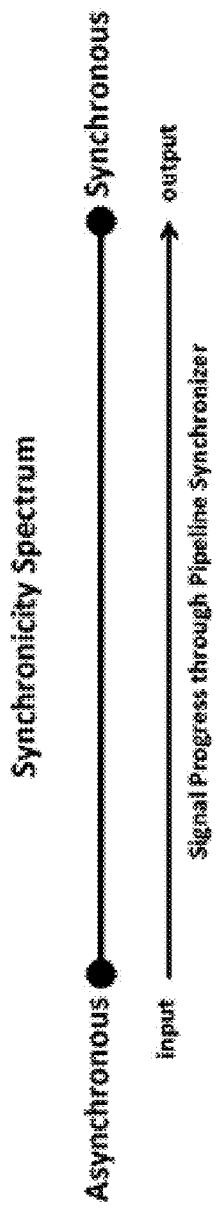
FIG. 2 shows an example of each stage of the pipeline synchronizer increases the synchronicity of the signal
Figure 3:
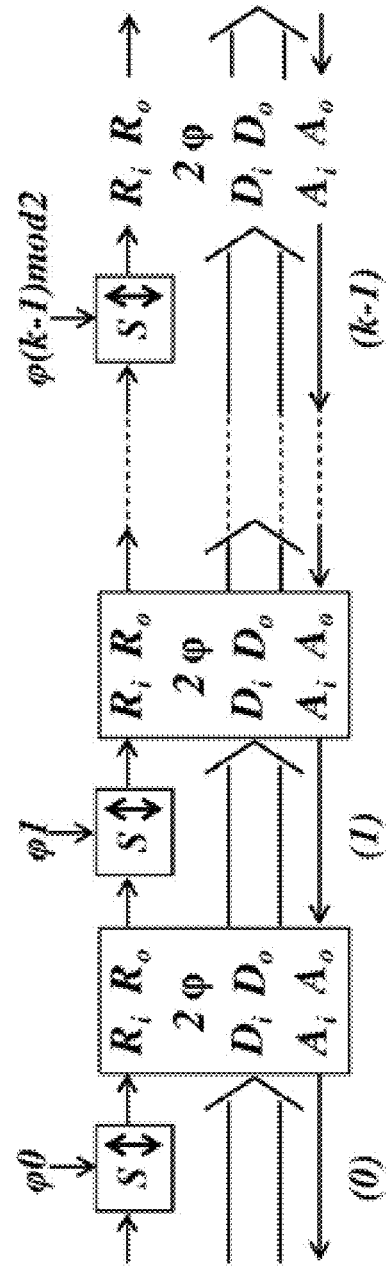
FIG. 3 shows an example of an asynchronous-to-synchronous pipeline synchronizer with k stages and two-phase non-overlapping clocks.

The distinguishing factor of pipeline synchronization is that synchronization is treated as a staged process, rather than one distinct signal manipulation to create a synchronous signal from an asynchronous signal. In this vein the notion of asynchronicity and its opposite, synchronicity, are introduced, establishing a spectrum (FIG. 2) with signals completely synchronous to a particular reference clock at one end and completely asynchronous signals at the other. However, asynchronicity also allows for signals to lie somewhere in the range between the two end points of the distribution. FIG. 3 An asynchronous-to-synchronous pipeline synchronizer with k stages and two-phase non-overlapping clocks.

The pipeline synchronizer adjusts the asynchronous signal further toward the synchronous end of this spectrum with each stage. This is accomplished by using a synchronizing (SYNC) block and an asynchronous FIFO element in each stage, as shown in FIG. 3. The stages are cascaded to form the full pipeline.

Figure 4:
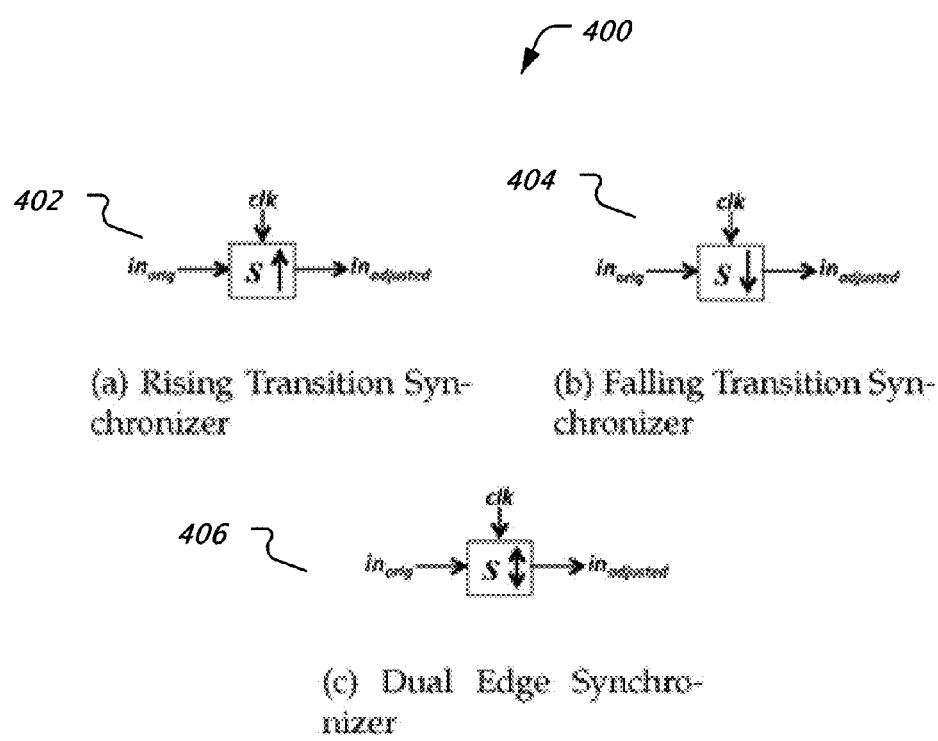
FIG. 4 shows an example of synchronizer Blocks.

The SYNC blocks are built from mutual exclusion (ME) elements. FIG. 4 shows examples 400 of synchronization blocks. Synchronization circuits that synchronize the rising transition of a signal (402) or the falling transition of a signal (404) can be built from the ME elements simply by attaching one input to the clock. The aforementioned synchronizers are suitable if a four-phase signaling protocol is in use because the synchronizer only needs to synchronize one transition, since two transitions occur on the signal per event In order to work with to a two-phase signaling protocol, the SYNC block must be able to synchronize both transitions (406). This is accomplished using two ME elements and minimal additional control circuitry.

The receiver clock is connected to one input of the SYNC block and the signal to be synchronized is connected to the other input. When the input signal changes at the same time as the relevant clock edge a metastability occurs. The ME element is given until the next clock edge is encountered to exit the metastable state on its own, but will be forced out of the metastable state by that clock transition otherwise. This effectively adds a bounded variable delay to the signal when a metastability is encountered. This variable delay is what makes the adjustment to the timing of the input signal and helps reduce the asynchronicity. If the timing bound is encountered then the signal is passed to the next stage so it can try again. This forced metastability resolution is how the latency of the pipeline synchronizer remains at T/2 per stage and how the throughput is maintained.

The SYNC blocks in alternate stages use two-phase non-overlapping clocks. This prevents the input signal from racing through the stages of the pipeline synchronizer if the pipeline is not full and maintains synchronicity (the stable state) once it is attained.

The asynchronous FIFO blocks (e.g., FIFO blocks that are clocked with asynchronous clocks) act as data storage for each stage. The handshaking protocols of the asynchronous FIFO blocks deems synchronization useful only on the request signal for an asynchronous-to-synchronous pipeline synchronizer or on the acknowledge signal for a synchronous-to-asynchronous pipeline synchronizer. The pipeline synchronizer can be designed to use either 4-phase or two-phase handshaking protocols.

As the asynchronous signal travels through the stages of the pipeline synchronizer the probability of synchronization failure decreases, until it is in an acceptable range at the end of the pipeline. Increasing the number of stages decreases the probability of metastability failure.

NoC (Network on a Chip)

NoC is a chip communication strategy introduced to alleviate problems with point-to-point dedicated wires and buses moving data in large designs. The modularity of NoC designs makes it a natural candidate for reducing clock wiring and power by using multiple clocks or by changing between timing-based and data-based communication. In both cases, synchronization is required, and an efficient synchronization method can increase the performance of such a NoC.

Various NoC strategies are characterized into two basic groups—synchronous NoC and asynchronous NoC. Some synchronous NoCs assume that the entire system operates off of the same clock, in this case data synchronization need not be addressed, however these embodiments may have to careful clock network design and timing analysis to ensure proper chip operation. Other Synchronous NoCs employ multiple clocks (GALS), when data crosses the boundary of one clocked region into another synchronization is necessary. Region boundaries can be network to module or the network itself may span multiple regions requiring multiple synchronizations along the transfer path. In asynchronous NoC synchronization is only required at either end of a communication, the routers are completely asynchronous using handshaking protocols to pass the messages. These synchronizations take place in the network interface that attaches each clocked module to the clock-less network. Table 1 shows a summary of relevant NoC implementations. Since the need for multiple clock systems continues to increase in importance NoCs that assume operation under a signal clock frequency are omitted. The service type granted by the NoC is shown in the third column. Guaranteed services (GS) ensure that data is delivered within a bounded amount of time. Best effort service specifies that there is no bound on latency or minimum throughput level, the network simply makes its best attempt to deliver data based on the current network traffic. Service Levels (SL) implement the same concept except that all data transfers are characterized by importance, highest priority data will be routed through the network first, but there can be many different priority levels.

TABLE 1

Summary of NoC Implementations

| NoC | Type | Service | Synchronization |
| --- | --- | --- | --- |
| DSPIN | Synchronous | BE, GS | bi-synchronous FIFOs |
| AEthereal | Synchronous | BE, GS | bi-synchronous FIFOs |
| Chain | Asynchronous | N/A | Unspecified |
| Nexus | Asynchronous | N/A | Clock Domain Converter |
| MANGO | Asynchronous | BE, GS | Two Flip-Flop Synchronizer |
| QNoC | Asynchronous | SL | Unspecified |

Synchronous NoCs

Synchronous NoCs can take different approaches to clocking. If clocks are used to control progress through the routers in the network, designs can rely on methods to ensure the same clock is used over the entire chip and network. In this case no synchronization issues need to be addressed. However, since a single clock network dispersed over an entire chip is becoming more difficult and undesirable to maintain in terms of complexity and power another approach allows the NoC to span multiple clock domains which means communications may require synchronization en-route.

NoCs Operating in a Single Clock Domain

NoCs that assume operation with a single clock across the network do not require synchronization. However, a short discussion of some of these NoCs appears here to highlight the motivation behind moving away from a single clock, bus based system. In some embodiments, a NoC router supports virtual channels and can accommodate multiple service levels, the router can route flits in a single cycle if a path is available by computing some path and arbitration control in the previous router. However, such a design requires a special clocking scheme to ensure minimal clock skew between adjacent routers. SPIN, is a packet switched network with a fat-tree topology. It uses wormhole switching, adaptive routing and credit-based flow control. The links between the routers can be pipelined and operate using the same clock as the modules. SPIN is compared to a bus only communication architecture showing that as the number of cores increases a network communication approach offers much better performance. A conventional technique, called ViChaR, dynamically allocates virtual channels to match low-latency/efficient utilization conditions for various traffic patterns by using a unified buffer. The evaluation assumes operation of the network of routers with the same clock frequency, but results show that this router buffer modification can provide similar performance with a 50 percent smaller buffer thereby reducing router area and power.

DSPIN

A conventional technique, known as DSPIN, is an extension of SPIN that allows for use of a GALS design approach of the system. The network is updated to use a mesh topology and links between routers are implemented with bi-synchronous FIFOs. The entire network uses clocks with the same frequency, however the clocks can be out of phase. The network interface controllers that link the clusters to the network also use the bi-synchronous FIFOs to synchronize the router clock to the cluster clock. The cluster clocks do not have to operate at the same frequency as the network clock. DSPIN provides support for both Best Effort (BE) and Guaranteed Service (GS) network traffic. GS is implemented using a virtual channel (VC) approach that separates the storage resources and synchronization for the two types of traffic.

AEthereal

A technique called AEthereal provides both BE and GS services using time division multiplexing (TDM), no arbitration is necessary in the router. GS requests wait until their allocated time slot and then move uncontested into the network. Empty slots are used to provide the BE services. The router assumes a global clock. Another technique called AElite updates the technique to accommodate local clock regions using bi-synchronous FIFOs for synchronization.

Xpipes

The Xpipes network-on-chip technique uses wormhole switching and flow control. Virtual channels exist to provide improved latency and throughput. Routing is set statically with a look-up table. This method does not include a concept of service levels. The network is clocked, discusses integrating synchronization into the Xpipes switches first using a mesosynchronous synchronizer for clock-phase offsets and then a dual-clock FIFO synchronizer for clock frequency differences this allows the clocking schemes to vary not only from core to network, but in the network from switch to switch as well.

Nostrum

The Nostrum NoC architecture attempts to supply both Guaranteed Bandwidth (GB) and Best-Effort (BE) packet delivery options. The network is a 2D-mesh architecture that establishes Virtual Circuits (VC) across a set of switches to supply GB. The VCs are implemented using the concept of Looped Containers and Temporarily Disjoint Networks. The looped containers provide empty packets that can be filled by the application requiring GB. However, Nostrum requires a globally synchronous clock, rendering the technique in need of additional research to meet the needs of a multi-clocked chip.

Asynchronous NoC

There are several advantages of using an Asynchronous NoC design style. Most relevant to this thesis are the synchronization advantages. Primarily there are fewer required synchronizations. Since clocks are only used within the modules, the network interface (NI) that connects the modules to the router mesh only needs to use one synchronization circuit in each interface, synchronizing incoming messages or acknowledgements to the local module's clock. The router mesh uses asynchronous handshaking protocols so additional synchronization is not necessary to communicate with the router side of the NI. Additional synchronizations are also not necessary in the routers since no clocks are used.

CHAIN

The CHAIN interconnect uses small links to transmit two bits at a time in a one hot/return to zero encoding scheme. Each link routes the bits from sender to receiver using a route path predetermined by the initiating sender. For higher bandwidth multiple links are grouped together, routing information is sent to each link and the data bits are spread over several links. The links are freed only after the end of packet symbol is observed, allowing packets of variable size. These links can be used to set up any type of network topology depending on the needs of the system. Since the network is asynchronous the network interfaces could be designed to attach synchronous modules to the network, but the CHAIN implementation described connects only asynchronous modules. No specific interface is specified for cases in which a synchronous module would be connected to the network, but pausable clocks are mentioned as a standard synchronization solution.

Nexus

Nexus is an asynchronous interconnect designed to connect synchronous modules. Synchronous source modules send data to synchronous destination modules across a crossbar that uses asynchronous QDI handshake signaling to advance data through multiplex/demultiplex circuits that are arranged in a grid structure. Nexus is capable of variable length transfers but only offers a single service level. Each module has a clock domain converter that handles synchronization of the incoming data to the module's clock. An arbiter is used to ensure that both sender and receiver are ready to complete the data transfer on the rising edge of the clock. If both sides are ready the new data is latched otherwise the old data must be held. This synchronization method does not completely eliminate the possibility of failure due to metastability.

QoS Router

While the Asynchronous NoC architectures above attempt to solve the problem of a distributed clock across a chip and provide modularity to system communication they do not address QoS. Since TDM cannot apply to an asynchronous router (because TDM requires network synchronization) the solution is to introduce priority levels to the scheduling scheme used in the network. A conventional asynchronous router with QoS support uses a typical 5-port router that supports GS and BE service levels using multiple buffers to access the links. BE traffic uses one buffer and GS traffic is assigned to different buffers so that BE traffic cannot block GS traffic. The scheduler then accepts and transmits flits from the buffer with the highest priority first. Each service level also has a credit counter in order to ensure the receiving buffer is not full. This technique refers to the service levels as virtual channels. While no network interface is implemented, it may be possible to interface clocked modules to the asynchronous NoC.

ANOC

ANOC provides a full NoC architecture implementation, including the NIs. The routers are implemented with full asynchronous QDI four rail encoded handshakes. Two service levels are provided, one is "real-time" which is similar to GS and the other is BE. Requests from ports are serviced using a First-in-First-Serve priority with "real-time" requests receiving higher priority than the BE requests, and requests that arrive at the same time are settled by a "Fixed Topology Arbiter" that assigns an order based on which port the request arrived on either north, east, south or west. The NI is implemented using two multi-clock synchronization FIFOs based on Gray code per input/output port. One FIFO is used for "real-time" traffic and the other for BE traffic. The full and empty FIFO signals are synchronized to the synchronous clock using two-flop synchronizers. Additional synchronizers are required on the FIFO outputs in the synchronous-to-asynchronous direction in order to ensure the stability of the value until the acknowledge is received.

MANGO

Mango is another asynchronous implementation of a NoC. It provides both best effort and guaranteed services routing. It uses a scheduling discipline called Asynchronous Latency Guarantee (ALG) that ensures hard per connection latency and bandwidth guarantees and also uses virtual channels. Cores are connected to the network using a network adapter which is responsible for synchronization. The network adapter uses two-flop synchronizers with 2-phase handshaking. Since the handshaking on the network is four-phase the NA employs a handshake converter in between the synchronizer and router port.

QNoC

QNoC provides an implementation of an asynchronous router that provides a given number of service levels (SL) that implement priority routing. In the paper four service levels are explored, however the architecture could easily be adjusted for more or less SLs. Within the SLs virtual channels (VCs) are provided which help alleviate contention among service levels when routing paths do not conflict. The router dynamically allocates VCs based on availability. While a network interface is needed for the cores connected to the network, such an interface is not included in the work. Synchronization methods for clocked cores are not discussed.

Variation and Technology Scaling

Currently, the industry is seeing increased use for synchronization, given that synchronizers can cause such catastrophic circuit failures, it seems useful to study the effects technology scaling, increased process variation, and dynamic variations such as temperature, voltage and frequency could have on synchronizer circuits. Unless methods are found to combat the effects these issues have on synchronizers, chip performance will suffer from over-designed synchronization times.

Effects of Variation and Technology Scaling on Synchronizers

There is some discordance in the industry about whether synchronizer performance scales along with technology. Some work suggests that the synchronizer resolution time constant ($\tau$) degrades as technology scales, requiring the use of more robust synchronizers. Other work suggests $\tau$ really does scale with technology, but that use of standard-cell components, common flip-flop optimizations, or addition of test circuitry can result in degrading the synchronizer. What is clear is that synchronizers are more affected by simple circuit changes and variations than logic circuits, so careful consideration and design must be applied when employing the use of synchronizers.

In a synchronizer, a slower circuit could mean the difference between a correctly sampled value and a value sampled during metastability. Since the impact of process variation increases as technology scales, this leads to designing for longer periods for synchronization, just in case.

Dynamic variations also affect r causing synchronizer performance to vary. Specifically, the mean time before failure (MTBF) can change over time, so either a static synchronizer must be used that can accommodate for every possible operating point or methods must be developed that can handle worst case dynamic variations without degrading the performance of the common case.

Methods to Combat Effects of Variation on Synchronizers

Improvements in synchronizer metastability resolution time can be accomplished simply, by increasing the size of the transistors in the synchronizer. This approach has its drawbacks, namely increased power consumption. Some embodiments use training periods which can either pick from redundant synchronizers which has the best performance or adapt a variable delay line (VDL) which controls the synchronization time of the synchronizer. Both approaches prevent an increase in power consumption during normal operation.

The use of redundant synchronizers is intended to combat process variations, therefore it only runs once upon start up, after which point the extra circuitry is powered down. Power consumption during operation remains the same as for a single non-redundant synchronizer. This method is easily adapted to other synchronizer types and seems like a wise caution to take given that synchronizers are such an important chip component.

Use of a VDL must be considered carefully according to the design requirements of the chip as this method requires a large amount of area and consumes quite a bit of power, especially if it needs to be running often to combat clock, voltage and temperature variations.

Example Embodiments

Gradual Synchronization is a staged synchronization method that, in one aspect, merges synchronization with computation in order to hide the synchronization latency. Gradual Synchronization takes advantage of the pipelined structure of computation to preserve throughput and utilizes handshaking control signals to achieve a low probability of synchronization failure.

The intuition is that once synchronization is attained in the gradual synchronizer the operation of the synchronizer resembles that of pipelined computation. Asynchronous FIFOs, or pipeline stages, in each stage act similar to flips-flops in a synchronous environment, locking in stable data. Since the clock signals used by the synchronizing elements in alternating stages are two-phase alternating clocks the behavior resembles that of two-phase pipeline operation.

Serial Computation

Figure 5:
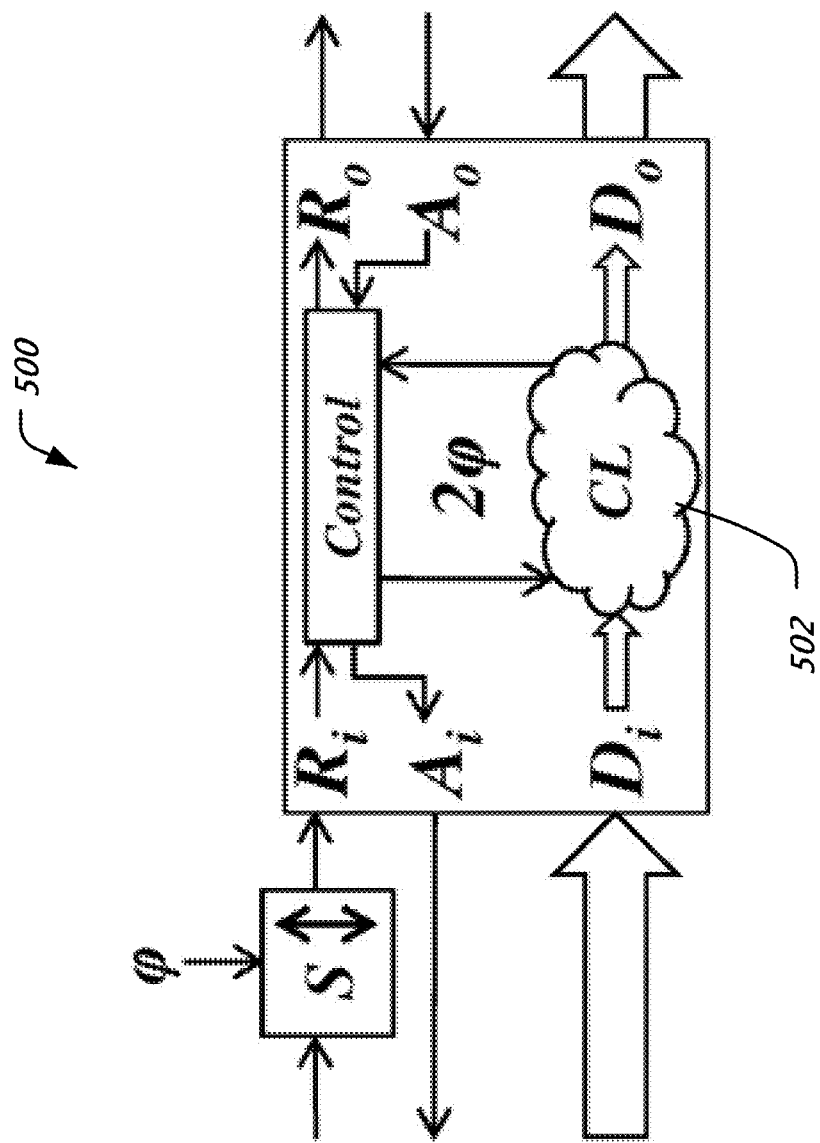
FIG. 5 shows an example of a synchronizer stage with data computation (CL) inserted into the FIFO block.

The FIFO blocks in the pipeline synchronizer (PS) are asynchronous, which means the desired computation could be added inside the FIFO block 500 as shown in FIG. 5. The FIFO block would receive data from the previous stage, perform computation on the data and then send the completed result to the next stage. Implemented in this manner synchronization would still occur outside of the FIFO blocks. The asynchronous FIFO block would ensure the stability of the data during communication however this method has disadvantages. The FIFO block may this include a FIFO, which is simply a data storage unit, with no computations being performed, with a computation circuit.

FIG. 5 shows an example of a synchronizer stage with data computation (CL) 502 inserted into the FIFO block 500.

The probability of metastability failure at the end of the $k^{th}$ stage of the pipeline synchronizer (PS) is:

$$P_f^{(k)}(PS) = P_f^{(0)} e^{-\frac{k(\frac{T}{2} - T_{oh})}{\tau_0}} \qquad (3.1)$$

where $T_{oh}$ is the overhead of the implementation and $\tau_0$ is the resolution time constant of the synchronizer block. In pipeline synchronization $T_{oh}$ is the sum of the delay through the synchronizer $\tau_S$ and the time between a FIFO element receiving a request on $R_i$ and sending one out on $R_o$ ($\tau_{R_iR_o}$):

$$T_{oh}(PS) = \tau_S + \tau_{R_iR_o} \qquad (3.2)$$

Figure 6:
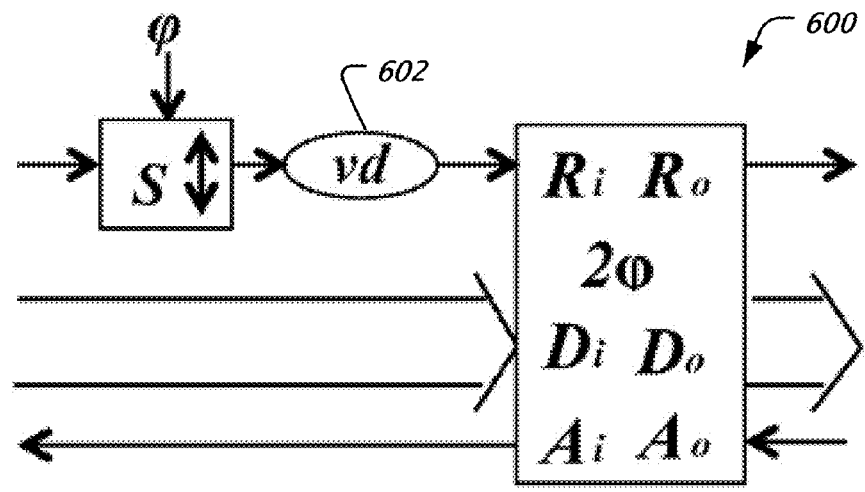
FIG. 6 shows an example of a timing-wise placing computation in the FIFO is equivalent to placing a variable delay (vd) in series with the synchronizer.

If gradual synchronization were implemented with the computation internal to the FIFO, $\tau_{R_iR_o}$ would increase because of the addition of computation delay ($\tau_{vd}$). The asynchronous FIFO internalized computation delay would also be variable, since asynchronous logic signals its own completion. A simple way to represent the timing result is that including the computation delay inside the FIFO is equivalent to adding a delay in a stage serially with the FIFO request signal and synchronization as shown in FIG. 6, which shows that timing-wise placing computation in the FIFO 600 is equivalent to placing a variable delay (vd) 602 in series with the synchronizer. Represented in this way $T_{oh}$ becomes:

$$T_{oh}(SCS) = \tau_S + \tau_{R_iR_o} + \tau_{vd} \quad (3.3)$$

where $\tau_{vd}$ is variable and SCS stands for serial computation synchronizer.

The configuration 600 described above adds a variable computation delay ($\tau_{vd}$) to the FIFO delay ($\tau_{R_iR_o}$). This reduces the time allotted for synchronization $T_{sync}$ in each stage, since:

$$T_{sync} = \frac{T}{2} - T_{oh}. \quad (3.4)$$

Reduced synchronization time means that the probability of metastability failure of the serial computation synchronizer would increase compared to the pipeline synchronizer. In addition asynchronous circuitry signals the completion of computation with handshakes as soon as results are stable, rather than sampling after a fixed period of time equal to the worst case logic delay. A variable delay inserted serially into each stage of the pipeline synchronizer would cancel out any synchronization the previous stages had achieved, essentially rendering the signals fully asynchronous again.

Fixed Delay

Figure 7:
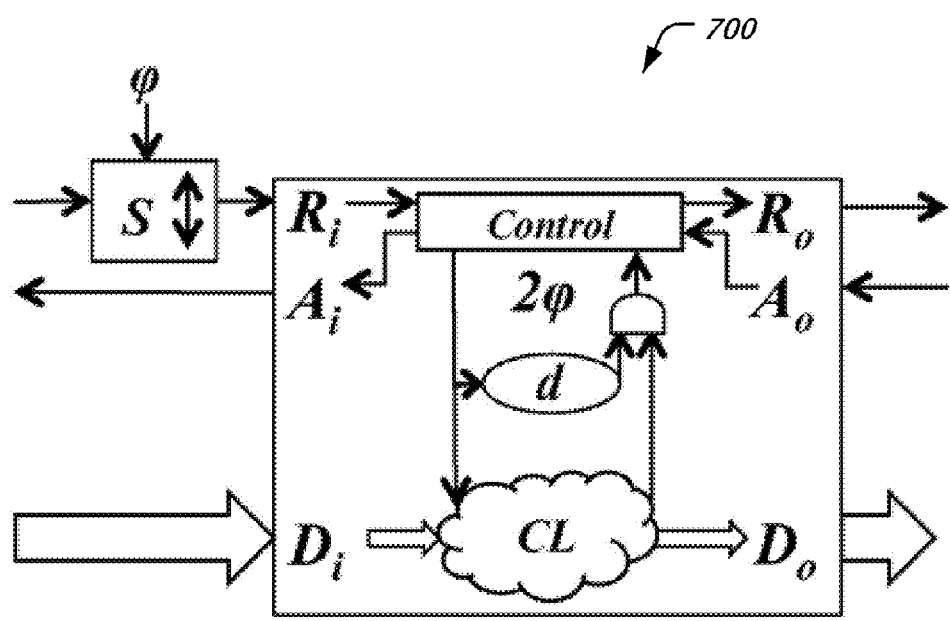
FIG. 7 shows an example of a fixed delay synchronizer (FDS) stage.

FIG. 7 shows an example embodiment 700 of a fixed delay synchronizer (FDS) stage. If embodiments force the variable delay in the above case to be fixed, the problem of recreating an asynchronous signal would be solved. The fixed delay $\tau_d$ would be equal to the worst case delay through the computation and the FIFO could be designed to ensure that at least $\tau_d$ has passed since it received a request on $R_i$ before releasing a request on $R_o$ as shown in FIG. 7. However, this method would still result in a less efficient synchronizer since $T_{oh}$ would still be increased. An increased $T_{oh}$ means more stages are necessary to meet an acceptable MTBF. Timing wise this set up is equivalent to placing a fixed delay in series with the synchronizer yielding a $T_{oh}$ equivalent to:

$$T_{oh}(FDS) = \tau_S + \tau_{R_iR_o} + \tau_d. \quad (3.5)$$

Merging Delays

Figure 8:
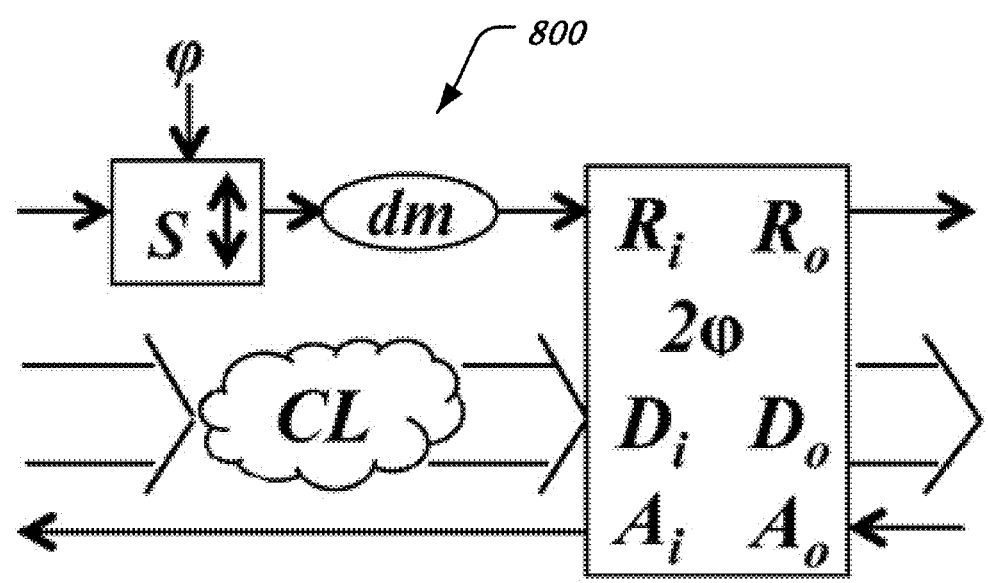
FIG. 8 shows an example of a synchronizer stage with computation placed outside of the FIFO, a fixed delay (dm) in series with the synchronizer ensures data safety.

FIG. 8 shows an example 800 of a synchronizer stage with computation placed outside of the FIFO, a fixed delay (dm) in series with the synchronizer ensures data safety.

The configuration above leads to a paranoid synchronizer since we are employing both worst case timing and asynchronous computation completion signals. Since the worst case delay would avoid sabotaging the synchronization the computation could be moved to the data lines in between the FIFOs. Some embodiments could remove the asynchronous completion tree and place a fixed delay in series with the synchronization on the request signal as shown in embodiment 800 in FIG. 8. In this embodiment, the additional overhead could be reduced by combining the delays. The two delays could be merged by subtracting the known delay through the synchronizer $\tau_S$ from $\tau_d$ and then using the resulting value as the fixed delay:

$$\tau_{dm} = \tau_d - \tau_S. \quad (3.6)$$

$T_{oh}$ is still increased, leaving less time for synchronization. Since the synchronizer still has the possibility of an unknown delay portion due to metastability resolution or blocking, the computation even in the worst case could be complete before the end of the fixed computation delay. This means the data would be stable for the remaining duration of $\tau_{dm}$ causing an unnecessary increase in latency.

A better solution would completely decouple the synchronization time from the computation time and merge them only when both are complete.

Gradual Synchronization

A gradual synchronizer places computation on the data wires in between FIFOs. The computation now occurs in parallel with the synchronization. This configuration uses the synchronization delay as computation time, which hides a portion of the synchronization latency and preserves the low probability of metastability failure.

In the steady state operation of the gradual synchronizer, the computation delay can be viewed as built into the blocking phase of the SYNC block. However, before the steady state is achieved the stages still need to ensure enough time has passed for computation to be complete. This is guaranteed by adding a fixed delay equal to the worst case delay through the computation in parallel with the SYNC block. While it might seem undesirable to use worst case delay with asynchronous circuits, the synchronizer elements are already clocked which means the performance of the asynchronous circuitry is already limited by the presence of the receiver clock. In addition the presence of a fixed time for computation ensures the probability of failure remains low and only affects the circuit operation if the gradual synchronizer is not in the steady state. The fixed delay also allows more computation time to be reclaimed than employing the use of completion trees.

Figure 9:
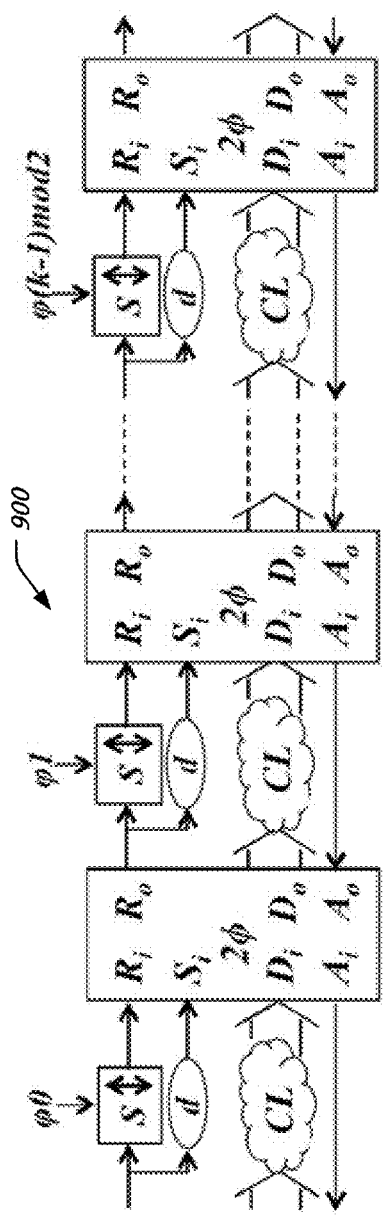
FIG. 9 shows an example of an asynchronous to synchronous gradual synchronizer with k stages.
Figure 10:
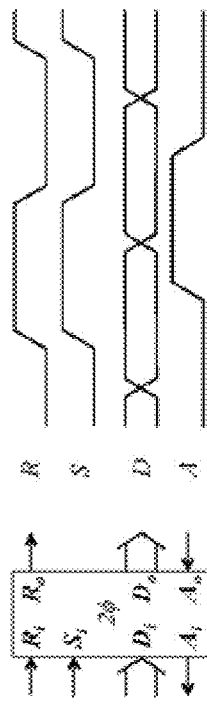
FIG. 10 shows an example of a two-phase FIFO with the added input $S_i$.

The signal that feeds into the fixed delay is the same request that is already issued from the previous stage's FIFO. That request is split and passed to both the fixed delay and the SYNC block as shown in FIG. 9, which shows an asynchronous to synchronous gradual synchronizer with k stages. The FIFO block is modified so that both versions of the request are present before acknowledging the request and issuing its own request to the next stage as shown in FIG. 10. The control signals for a two-phase protocol FIFO now follow the specification:

$$*[[R_i \wedge S_i]; A_i, R_o; [A_o]] \quad (3.7)$$

The brackets ([ ]) around signal names indicate that the FIFO is waiting for the signal(s) named inside them. A semi-colon (;) separates events that must occur in sequential order and the (,) creates a list of events that can occur at the same time. The asterisk followed by brackets (*[ ]) surrounding the whole sequence means to repeat the sequence forever. So, the FIFO waits for $R_i$ and $S_i$, after events on both signals are present it generates events on both $A_i$ and $R_o$. Then the FIFO waits for an event on $A_o$ and returns to the beginning of the sequence. The events on each signal are numbered starting with zero. So, the times of the events generated by the FIFO ($A_i$ and $R_o$) are:

$$t_{A_i}^{(j)} = \begin{cases} \max(t_{R_i}^{(0)} + \tau_{R_iA_i}, t_{S_i}^{(0)} + \tau_{S_iA_i}) & j=0 \\ \max(t_{R_i}^{(j)} + \tau_{R_iA_i}, t_{S_i}^{(j)} + \tau_{S_iA_i}, t_{A_o}^{(j-1)} + \tau_{A_oA_i}), & j>0 \end{cases}, \quad (3.8)$$

$$t_{R_o}^{(j)} = \begin{cases} \max(t_{R_i}^{(0)} + \tau_{R_iR_o}, t_{S_i}^{(0)} + \tau_{S_iR_o}) & j=0 \\ \max(t_{R_i}^{(j)} + \tau_{R_iR_o}, t_{S_i}^{(j)} + \tau_{S_iR_o}, t_{A_o}^{(j-1)} + \tau_{A_oR_o}), & j>0 \end{cases}, \quad (3.9)$$

The environment must work as follows:

$$t_{R_i}^{(j)} > \begin{cases} 0, & j=0 \\ t_{A_i}^{(j-1)} & j>0 \end{cases}, \quad (3.10)$$

-continued $$t_{S_i}^{(j)} > \begin{cases} 0, & j = 0 \\ t_{A_i}^{(j-1)}, & j > 0 \end{cases}, \quad (3.11)$$

$$t_{A_o}^{(j)} > t_{R_o}^{(j)}, \quad j \geq 0. \quad (3.12)$$

With this structure the synchronization delay is used for computation time and should the synchronization complete before the computation is complete, the FIFO will not lock the data until the data values are safe. Each stage is still limited to $$\frac{T}{2}$$

in length meaning the total latency introduced per stage is the same as in the pipeline synchronizer, but computation that was occurring on either side of the synchronizer has been distributed internally. Throughput is also maintained. The only thing left to do is ensure that the gradual synchronizer can exhibit effective synchronization performance.

Correctness Proof

The validity of the gradual synchronization method is examined below. The same notation and structure is used as in the correctness proof for pipeline synchronization.

In gradual synchronization the intention is that the data exiting the synchronizer will be different than when it entered. The full synchronizer circuit resembles a computation pipeline. However, since the asynchronous FIFOs that lock the data are speed independent, any delay introduced on a signal wire, either from the synchronizer or the computation delay does not affect the functional behavior of the circuit.

Figure 11:
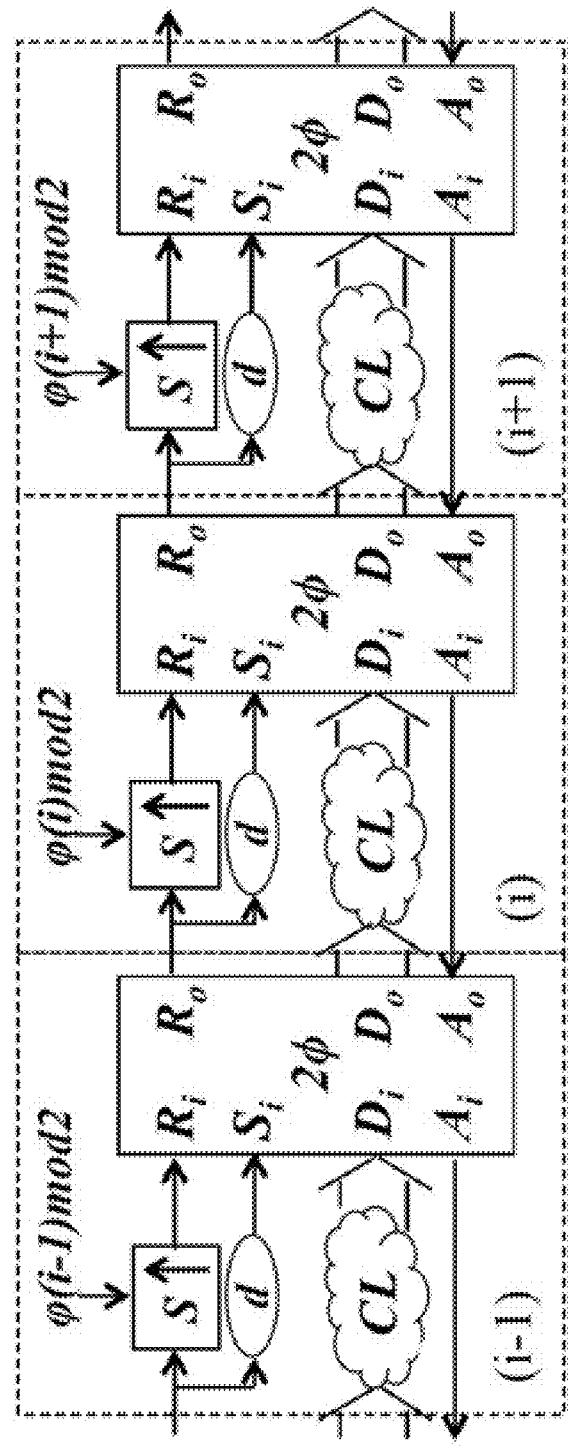
FIG. 11 shows an example of a three stage segment of a two-phase asynchronous to synchronous gradual synchronizer.

The probability of metastability failure decreases with each additional synchronizer stage. In any one stage the $j^{(th)}$ event on $R_o^{(i)}$ can occur at time:

$$t_{R_o}{(i)}^{(j)} = t_{R_i}{(i)}^{(j)} + \tau_{R_iR_o}, \quad (3.13)$$

$$t_{R_o}{(i)}^{(j)} = t_{A_o}{(i)}^{(j-1)} + \tau_{A_oR_o}, \quad (3.14)$$

or at time:

$$t_{R_o}{(i)}^{(j)} = t_{S_i}{(i)}^{(j)} + \tau_{S_iR_o}, \quad (3.15)$$

where i is one stage in the gradual synchronizer as shown in FIG. 11, which shows an example of a three stage segment of a two-phase asynchronous to synchronous gradual synchronizer. Metastable behavior occurs when $R_o$ arrives at a synchronizer at the same time as the clock edge the synchronizer is attempting to synchronize to. For the duration of this proof the falling edge will be used for consistency, however the method can be adapted to either clock edge. The probability of metastability failure at stage (i+1) is therefore the sum of the probabilities of failure for each possible arrival time:

$$P_f^{(i+1)} \leq P_f^{(i+1)}(R_i) + P_f^{(i+1)}(A_o) + P_f^{(i+1)}(S_i). \quad (3.16)$$

The final term is equal to the probability that $S_i$ arrives at the input to the FIFO $\tau_{S_iR_o}$ before the relevant clock edge. Therefore, the time available for computation in each stage is limited only by the presence of the FIFO in that stage, not by the synchronization:

$$\tau_d + \tau_{S_iR_o} < \frac{T}{2}. \quad (3.17)$$

$R_o^{(i-1)}$ must arrive at the computational delay exactly $t_d$ after the clock edge in order for $S_i^{(i)}$ to cause a metastability in the $(i+1)^{st}$ synchronizer. However, since $R_o^{(i-1)}$ will also arrive at the $(i)^{th}$ synchronizer at the same time $\tau_d$ begins, the $i^{th}$ synchronizer will block $R_o$ and the $(i)^{th}$ FIFO will be waiting for $R_i^{(i)}$ not $S_i$. Meaning, $$P_f^{(i+1)}(S_i) = 0. \quad (3.18)$$

Since the probability that any $S_i$ causes a metastability is zero, the modifications made to support gradual synchronization do not affect the term $P_f^{(i+1)}(R_i)$. This is because the only condition in which $R_i$ causes a metastability in the $(i+1)^{st}$ stage is when there was a metastability in the previous stage. Since $S_i$ cannot cause a metastability it cannot affect the $R_i$ term. So that probability remains:

$$P_f^{(i+1)}(R_i) \leq P_f^{(i)} e^{\frac{-T/2 - \tau_S - \tau_{R_iR_o}}{\tau_0}}. \quad (3.19)$$

It is useful to note that at the input to the synchronizer $S_i$ does not exist. The first stage of the synchronizer splits the incoming request into the inputs for the computation delay and the synchronizer. Therefore there is no endpoint case for $S_i$ because the first $S_i$ could only affect the synchronizer in the second stage.

Now, the remaining term, $A_o$, must be examined. In pipeline synchronization this probability could be ignored even if it was not equal to zero. This is due to the property called second-event metastability (SEM). First-event metastability (FEM) and second event metastability are defined specifically for the purposes of the proof of pipeline synchronization. The definitions are included here as they also apply to the proof for gradual synchronization.

Definition 1

When the input of a synchronizer element S, clocked with φ, changes state coincident with an arbitrary, $j^{th}$, down-going edge of φ, and there were no prior input events between the $(j-1)^{st}$ and the $j^{th}$ down-going edge of φ, we shall say that S has entered first-event metastability.

Definition 2

When the input of a synchronizer element S, clocked with φ, changes state coincident with an arbitrary, $j^{th}$ down-going edge of φ, and there was at least one prior input event between the $(j-1)^{st}$ and the $j^{th}$ down-going edge of φ, we shall say that S has entered second-event metastability.

SEM is not a problem because the synchronous end of the pipeline can be designed to accept only one input event per clock cycle. This means that any event occurring after another within the same clock cycle will be ignored until the next clock cycle and therefore cannot cause a metastability.

If the computational delay and the addition of $S_i$ to the FIFO can cause SEM created by a transition on $A_o$ the gradual synchronizer still operates correctly due to the synchronous environment. This implies that the only way the changes can significantly impact the behavior of $A_o$ o would be if the gradual synchronizer signal $S_i$ can influence a transition on $A_o$ to cause a first-event metastability (FEM). This would mean that $t_{R_o(i)}^{(j-1)}$ could somehow occur at a time:

$$t_{R_o(i)}^{(j-1)} < t_{R_o(i)}^{(j)} - T. \quad (3.20)$$

However, $$t_{A_o(i+1)}^{(j-1)} = t_{A_o(i)}^{(j-1)} = t_{R_o(i)}^{(j)} - \tau_{A_o R_o} \quad (3.21)$$

and the only way $S_i$ could change the behavior of $A_o^{(i)}$ would be if the transition on $S_i^{(i+1)}$ dominated the FIFO delay. This would imply that:

$$t_{R_o(i+1)}^{(j-1)} = t_{R_o(i)}^{(j)} - \tau_{A_o R_o} - \tau_{S_i A_i} - \tau_d \quad (3.22)$$

For any FIFO implementation that includes $S_i$:

$$\tau_{S_i A_i} \approx \tau_{S_i R_o} \quad (3.23)$$

Therefore, as long as the previously existing requirement $$\tau_{A_o R_o} < T/2 \quad (3.24)$$

is preserved, $$t_{R_o}^{(j-1)} = t_{R_o}^{(j)} - T. \quad (3.25)$$

contradicting equation 3.20 which means a transition on $A_o$ cannot cause FEM in the gradual synchronizer.

Finally, if the $j^{th}$ event on $R_o^{(i)}$ is SEM at the $(i+1)^{st}$ synchronizer and that causes a metastability at the $(i+2)^{nd}$ synchronizer, the metastability at the $(i+2)^{nd}$ synchronizer is also SEM because the $(j-1)^{st}$ event at the $(i+2)^{nd}$ synchronizer must have occurred less than T before the $j^{th}$ event. Since the synchronous domain at the end of the gradual synchronizer is designed to only accept one event per clock period SEM is harmless.

Throughput

Since the synchronous environment on the receiving end of the synchronizer must be designed to only accept one data item per clock cycle this limits the throughput of the gradual synchronizer. For the best performance the gradual synchronizer should be able to sustain that throughput at all times. To ensure the gradual synchronizer operates at the desired throughput a few additional requirements must be met, these requirements are derived below.

Figure 12:
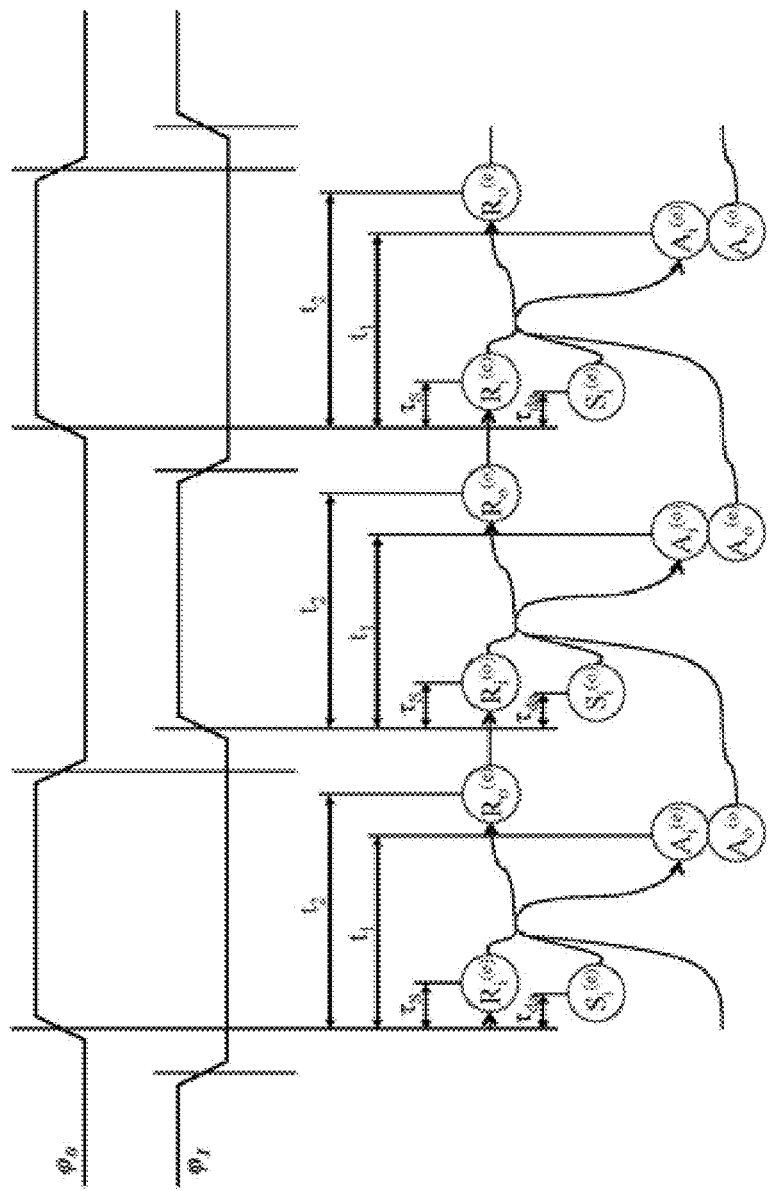
FIG. 12 shows an example of a Steady-state operation of the 2-phase asynchronous-to-synchronous gradual synchronizer.

FIG. 12 shows the steady state of a gradual synchronizer with an infinite number of stages. All events on $R_i$ entering even-numbered FIFO blocks arrive $\tau_S$ after the rising edge of $\varphi_0$. All events on $R_i$ entering odd-numbered FIFO blocks arrive $\tau_S$ after the rising edge of $\varphi_1$. All events on $S_i$ entering even-numbered FIFO blocks arrive $\tau_{da}$ after the rising edge of $\varphi_0$ and all events on $S_i$ entering odd-numbered FIFO blocks arrive $\tau_{da}$ after the rising edge of $\varphi_1$. $\tau_{da}$ is the portion of the computational delay that occurs after the clock edge. In the steady state, no synchronizer assumes a metastable state, and:

$$t1 = \max\left(\tau_S + \tau_{R_i A_i}, t1 + \tau_{A_o A_i} - \frac{T}{2}, \tau_{da} + \tau_{S_i A_i}\right) \quad (3.26)$$

$$t2 = \max\left(\tau_S + \tau_{R_i R_o}, t1 + \tau_{A_o R_o} - \frac{T}{2}, \tau_{da} + \tau_{S_i R_o}\right)$$

The value $\tau_{da}$ is just the portion of the computational delay that takes place after the clock edge, because $\tau_d$ may cross over the clock edge. So, $\tau_{da}$ is just, $$\tau_{da} = \tau_d - \tau_{db}, \quad (3.27)$$

and $$\tau_{db} = T/2 - t2. \quad (3.28)$$

For $$\tau_{A_o A_i} < \frac{T}{2},$$

$$t1 = \max(\tau_S + \tau_{R_i A_i}, \tau_{da} + \tau_{S_i A_i}) \quad (3.29)$$

$$t2 = \max\left(\tau_S + \tau_{R_i R_o}, \tau_S + \tau_{R_i A_i} + \tau_{A_o R_o} - \frac{T}{2}, \tau_{da} + \tau_{S_i A_i} + \tau_{A_o R_o} - \frac{T}{2}, \tau_{da} + \tau_{S_i R_o}\right)$$

To maintain the steady state $t_2$ must be less than T/2. Based on that fact and the above equations the additional requirements for the FIFO implementation, synchronizer implementation and computation time allowed are:

$$\tau_{A_o A_i} < T/2$$

$$\tau_S + \tau_{R_i R_o} < T/2$$

$$\tau_S + \tau_{R_i A_i} + \tau_{A_o R_o} < T$$

$$\tau_{da} + \tau_{S_i R_o} < T/2$$

$$\tau_{da} + \tau_{S_i A_i} + \tau_{A_o R_o} < T \quad (3.30)$$

It is important to note that $\tau_{da} + \tau_{S_i R_o}$ is already limited to a value less than T/2 by the stricter requirement in equation 3.17, so this requirement need not be included in the final list of conditions. It is enough to simply state that:

$$\tau_d = \tau_{db} + \tau_{da}. \quad (3.31)$$

That leaves only the final inequality in the above equation with the rather ambiguous term $\tau_{da}$. Going back to equation 3.29, and substituting for $\tau_{da}$, the third term in the equation becomes:

$$\tau_d - \tau_{db} + \tau_{S_i A_i} \tau_{A_o R_o} - \frac{T}{2}. \quad (3.32)$$

Substituting for $\tau_{db}$ gives:

$$\tau_d - \left(\frac{T}{2} - t2\right) + \tau_{S_i A_i} + \tau_{A_o R_o} - \frac{T}{2}, \quad (3.33)$$

which reduces to:

$$t2 + \tau_d + \tau_{S_i A_i} + \tau_{A_o R_o} - T. \quad (3.34)$$

In order to cancel the above term. The inequality:

$$\tau_d + \tau_{S_i A_i} + \tau_{A_o R_o} < T \quad (3.35)$$

is added to the requirement list. Since $\tau_{A_o R_o}$ is the same value in all equations, the above inequality really means that the value $\tau_S$ will be equal to or more than $\tau_{da}$ and in the steady state the receiving FIFO will never be left waiting for $S_i$.

The gradual synchronizer is not infinitely long, it has a finite number of stages starting at the asynchronous interface and ending at the synchronous interface. If the asynchronous side meets the requirements.

$$\tau_S + \tau_{R_i A_i} + \tau_{AR} < T \quad (3.36)$$

and $$\tau_d + \tau_{S_i A_i} + \tau_{AR} < T, \quad (3.37)$$

where $\tau_{AR}$ is the delay from one acknowledge until the next request, and if the synchronous side satisfies the condition:

$$\tau_{RA}+\tau_{A_oR_o}<T, \quad (3.38)$$

where $\tau_{RA}$ is the delay from request to acknowledge, then the maximum throughput can be maintained.

In order to ensure safe operation of the two-phase asynchronous-to-synchronous gradual synchronizer and maintain the required throughput the design requirements that must be met are:

$$\tau_S+\tau_{R_iR_o}<T/2$$

$$\tau_{A_oR_o}<T/2$$

$$\tau_{AR}<T/2$$

$$\tau_{A_oA_i}<T/2$$

$$\tau_d+\tau_{S_iR_o}<T/2 \text{(new)}$$

$$\tau_S+\tau_{R_iA_i}+\tau_{A_oR_o}<T$$

$$\tau_S+\tau_{R_iA_i}+\tau_{AR}<T$$

$$\tau_{RA}+\tau_{A_oR_o}<T$$

$$\tau_d+\tau_{S_iA_i}+\tau_{A_oR_o}<T \text{(new)}$$

$$\tau_d+\tau_{S_iR_i}+\tau_{AR}<T \text{(new)} \quad (3.39)$$

Synchronous to Asynchronous Gradual Synchronizer

FIG. 13 shows an example of a two-phase synchronous to asynchronous gradual synchronizer The gradual synchronizer described above takes care of sending signals from an asynchronous environment to a synchronous environment. In order to send signals between two synchronous environments that are asynchronous with respect to each other, a gradual synchronizer should send signals from a synchronous environment to an asynchronous environment. The two can be paired to allow two different clock domains to interface with each other.

One difference between a synchronous-to-asynchronous (s-to-a) synchronizer and an asynchronous-to-synchronous (a-to-s) synchronizer is that the synchronization now is performed on the acknowledge signal. The data travels in the opposite direction of the acknowledge so the SYNC block gets moved to the wire between $A_i$ and $A_o$ and there is no need for the FIFO block to include the extra signal $S_i$ as in the asynchronous to synchronous case since the computation delay block can be placed directly on the request wire as shown in FIG. 14. At first glance this setup looks like it causes the computation delay to take place in series with the synchronization delay, and indeed it does if the transfer being observed is the just the $j^{th}$ item. But the $j^{th}$ event on $A_i^{(i)}$ does not block the forward progress of the $j^{th}$ transfer. However, the FIFO may be waiting for the arrival of the $(j-1)^{st}$ event on $A_o^{(i)}$ when the $j^{th}$ event on $R_i^{(i)}$ arrives. This is the synchronization time computation can take place during without adding latency.

FIG. 14 shows an example of a two-phase FIFO buffer for synchronous to asynchronous gradual synchronization in the synchronization time. The FIFO block shown in FIG. 14 follows the behavioral specification:

$$*[[R_i;A_iR_o;[A_o]]. \quad (3.40)$$

The FIFO block receives a request on $R_i$, if the previous request has already been acknowledged it locks the data and then acknowledges the current request and sends a request on $R_o$.

This structure shown in FIG. 13 of a gradual synchronizer using the FIFO block shown in FIG. 14 allows the computation timer to begin as soon as data is present on the data output of the FIFO block. There will not be a case in which the computation timer is delayed in starting because of synchronizations. We can use similar proof techniques to show correctness and find the rest of the requirements for correct operation of the synchronous-to-asynchronous gradual synchronizer.

All the requirements for a synchronous to asynchronous gradual synchronizer are:

$$\tau_S+\tau_{A_oA_i}<T/2$$

$$\tau_{R_iA_i}+\tau_d<T/2$$

$$\tau_{RA}<T/2$$

$$\tau_{R_iR_o}+\tau_d<T/2$$

$$\tau_S+\tau_{A_oR_o}+\tau_{R_iA_i}+\tau_d<T$$

$$\tau_S+\tau_{A_oR_o}+\tau_{RA}<T$$

$$\tau_{AR}+\tau_{R_iA_i}+\tau_d<T. \quad (3.41)$$

Figure 15:
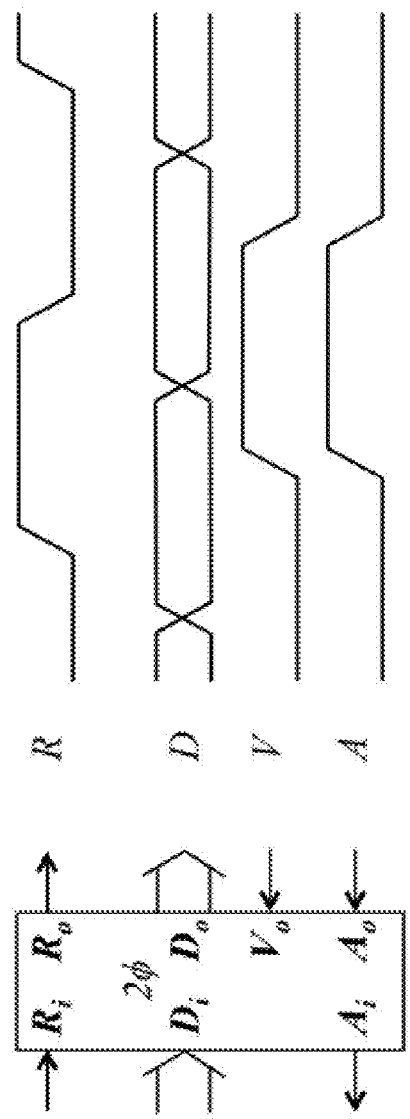
FIG. 15 shows an example of a two-phase FIFO with Vo input. Both Ao and Vo must be present to complete the handshake, but the presence of Vo alone can initiate latching of the data.

While this structure and requirements are enough to provide sufficient synchronization, the overhead ($T_{oh}$) of this synchronizer can be reduced. We know that when FIFO(i) is waiting on $A_o^{(i)}$ to lock the data $A_i^{(i-1)}$ is present at least $\tau_S$ before $A_o^{(i)}$ arrives. At that point it is safe to lock the data in the FIFO, just not to release the control signals because of synchronization. We can therefore reduce $\tau_{A_oA_i}$ by adding a data locking signal $V_o$ to the FIFO as shown in FIG. 15. The resulting FIFO follows the behavioral specification:

$$*[[R_i;A_iR_o;[A_o \wedge V_o]]. \quad (3.42)$$

Figure 16:
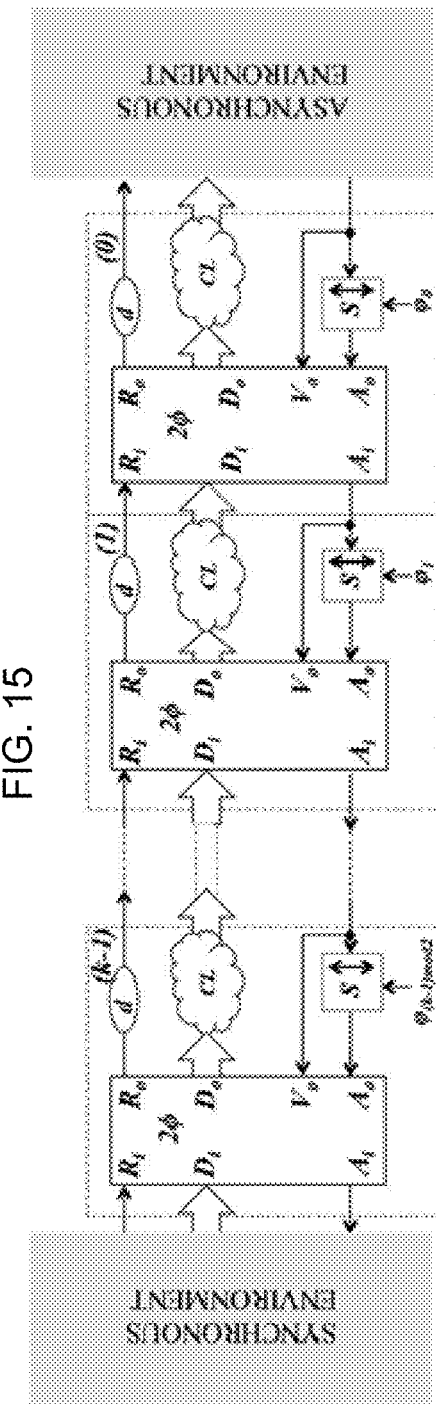
FIG. 16 shows an example of a two-phase synchronous to asynchronous gradual synchronizer with Vo FIFO input.

The resulting gradual synchronizer splits the $A_i$ signal with one wire attached directly to the $V_o$ input of the FIFO and the other to the SYNC block (see FIG. 16, which shows a two-phase synchronizer). Given the set up of the synchronizer we know that $V_o$ will always arrive at least $\tau_S$ before $A_o$, now the FIFO starts locking the data at least $\tau_S$ before the arrival of $A_o$. This reduces $\tau_{A_oA_i}$ since previously $\tau_{A_oA_i}$ included all of the data locking delay.

This synchronizer design change does not functionally change the requirements of the synchronizer because of the known arrival order of $A_o$ and $V_o$. Since $V_o^{(i)}$ always arrives before $A_o^{(i)}$ FIFO$^{(i)}$ is never waiting for $V_o^{(i)}$. $V_o$ only allows some of the latching time of the $j^{th}$ transfer to occur in parallel with the synchronization of the $(j-1)^{st}$ acknowledge.

Four-Phase Protocol FIFO Elements

The Gradual Synchronizer can also be implemented using a four-phase handshake protocol. This is accomplished by replacing the two-phase FIFO elements with four-phase FIFO elements and also replacing the computation delay block and the synchronizer. Although the four-phase handshake is more complex, the synchronizer is much simpler because it only needs to acknowledge either an up-going transition of the input signal or a down-going transition of the input signal, it is a single ME element. The computation delay block must also be asymmetric since computation delay will only apply to transitions in one direction as well. For the purposes of the four-phase gradual synchronizer many implementations are viable. A FIFO implementation that simultaneously completes the acknowledge handshake and releases the first part of the request handshake is a good choice in both the asynchronous-to-synchronous and synchronous-to-asynchronous cases.

Four-Phase Protocol Asynchronous-to-Synchronous Gradual Synchronizer

Figure 17:
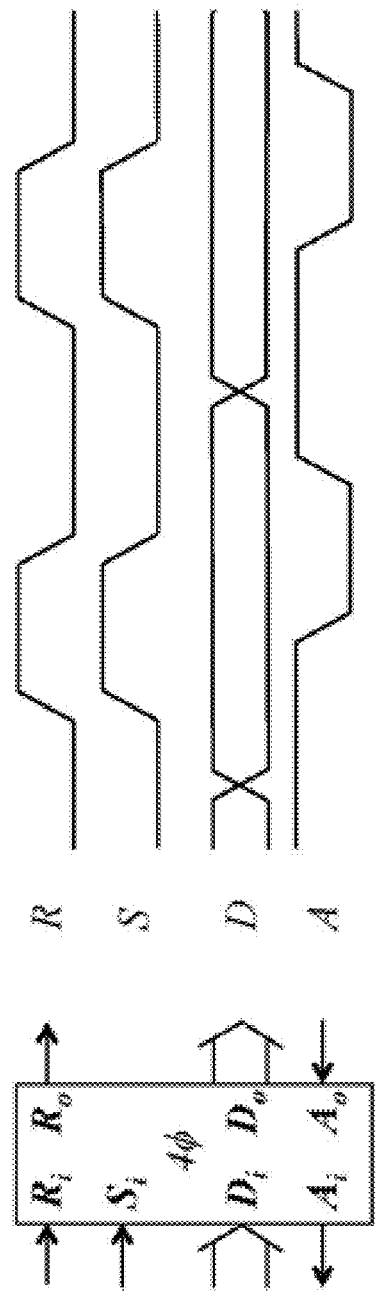
FIG. 17 shows an example of a 4-phase FIFO element with $S_t$ signal for computation safety.

FIG. 17 shows an example of a 4-phase FIFO element with $S_i$ signal for computation safety.

In the asynchronous-to-synchronous case the four-phase FIFO we use is shown in FIG. 17. The handshaking expansion for this FIFO block is:

$$*[[R_i \wedge S_i]; A_i\downarrow; [\overline{R_i} \wedge \overline{S_i}]; A_i\uparrow, R_o\uparrow; [\overline{A_o}]; R_o\downarrow; [A_o]]. \quad (3.43)$$

It waits for $R_i$ and $S_i$ then latches the data and acknowledges the request by setting $A_i$ low. The FIFO then waits for $R_i$ and $S_i$ to transition from high to low, at which point it sets $A_i$ high signifying that the data has been latched. At the same time $R_o$ is set high and then waits for an acknowledge low event on $A_o$. It pulls $R_o$ low and proceeds to wait for the final acknowledge high event on $A_o$ at which point the handshake starts over again.

Figure 18:
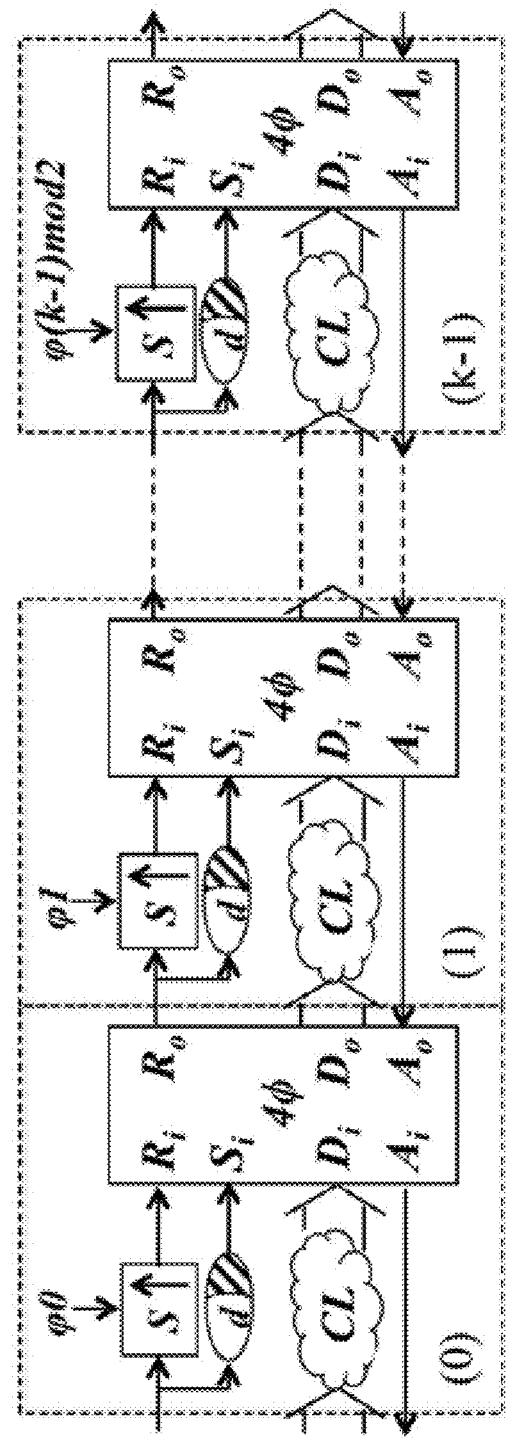
FIG. 18 shows an example of an asynchronous-to-synchronous gradual synchronizer using four-phase FIFO elements.

The signal $S_i$ is still a copy of $R_o$ coming from the previous stage passed through a delay instead of the synchronizer but in this case the delay only needs to be present on the initial part of the handshake. When $R_o$ from the previous stage is logical 0 it is immediately forwarded to $S_i$ of the FIFO bypassing $\tau_d$ so that $S_i$ does not delay the rest of the handshake. The synchronizer block in this case synchronizes only the up-going transition of $R_o$. A down going transition of $R_o$ is not blocked. The four-phase asynchronous-to-synchronous synchronizer structure is shown in FIG. 18, which shows an example of an asynchronous-to-synchronous gradual synchronizer using four phase FIFO elements.

The proof of this case is discussed later on in this document. The conditions for correct operation are:

$$\tau_S + \tau_{R_iR_o} < T/2$$

$$\tau_{A_oR_o} < T/2$$

$$\tau_{AR} < T/2$$

$$\tau_{A_oA_i} < T/2$$

$$\tau_d + \tau_{S_iR_o} < T/2 \text{(new)}$$

$$\tau_S + \tau_{R_iA_i} + \tau_{A_oR_o} < T$$

$$\tau_S + \tau_{R_iA_i} + \tau_{AR} < T$$

$$\tau_{RA} + \tau_{A_oR_o} < T$$

$$\tau_d + \tau_{S_iA_i} + \tau_{A_oR_o} < T\text{(new)}$$

$$\tau_d + \tau_{S_iR_i} + \tau_{AR} < T\text{(new)} \quad (3.44)$$

Note that in the equations above the various FIFO delays encompass both rising and falling transitions, so $$\tau_{R_iA_i} = \tau_{R_i\uparrow A_i\downarrow} + \tau_{A_o\downarrow R_o\downarrow} + \tau_{R_i\downarrow A_i\uparrow}$$

$$\tau_{R_iR_o} = \tau_{R_i\uparrow A_i\downarrow} + \tau_{A_o\downarrow R_o\downarrow} + \tau_{R_i\downarrow R_o\uparrow}$$

$$\tau_{A_oA_i} = \tau_{A_o\uparrow A_i\downarrow} + \tau_{A_o\downarrow R_o\downarrow} + \tau_{R_i\downarrow A_i\uparrow}$$

$$\tau_{A_oR_o} = \tau_{A_o\uparrow A_i\downarrow} + \tau_{A_o\downarrow R_o\downarrow} + \tau_{R_i\downarrow R_o\uparrow}.$$

$$\tau_{S_iA_i} = \tau_{S_i\uparrow A_i\downarrow} + \tau_{A_o\downarrow R_o\downarrow} + \tau_{S_i\downarrow A_i\uparrow}$$

$$\tau_{S_iR_o} = \tau_{S_i\uparrow A_i\downarrow} + \tau_{A_o\downarrow R_o\downarrow} + \tau_{S_i\downarrow R_o\uparrow} \quad (3.45)$$

There will be some minimal delay in forwarding $R_o \downarrow$ to $S_i \downarrow$ as it bypasses the computation delay (one AND delay). Therefore, in the four phase case:

$$\tau_d = \tau_{d\uparrow} + \tau_{d\downarrow}, \quad (3.46)$$

where $\tau_{d\uparrow}$ is the worst case computation delay and $\tau_{d\downarrow}$ is the delay of an AND gate.

The same goes for the asymmetric synchronizer delay which becomes:

$$\tau_S = \tau_{S\uparrow} + \tau_{S\downarrow}. \quad (3.47)$$

Four Phase Protocol Synchronous to Asynchronous Gradual Synchronizer

Figure 19:
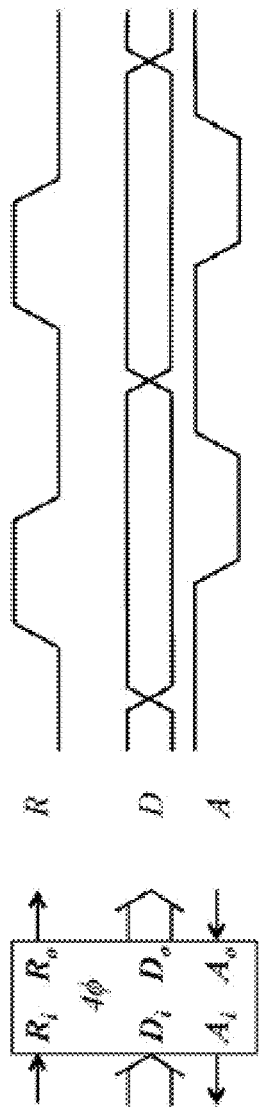
FIG. 19 shows an example of a the four-phase FIFO element used for the synchronous-to-asynchronous gradual synchronizer.

Use of a four-phase protocol for the case when data is being sent from a synchronous to an asynchronous environment is more complex. The critical part is ensuring that the computation occurs in parallel with synchronization. Since there are two transitions on each signal for every data item transferred, only one of the two directions is chosen for synchronization. In addition only one transition must be subject to the computation delay. In the synchronous to asynchronous case either $A_i \downarrow$ or $A_i \uparrow$ must be chosen for synchronization and either $R_o \uparrow$ or $R_o \downarrow$ must be delayed by the computation timer. In order to determine which edge is suitable it is helpful to examine the handshake. Assume the four-phase FIFO block in FIG. 19 can be used. FIG. 19 shows an example of a four-phase FIFO element used for the synchronous-to-asynchronous gradual synchronizer.

The following handshaking expansion describes the behavior of the FIFO's control signals:

$$*[[R_i]; A_i\downarrow; [\overline{R_i}]; A_i\uparrow, R_o\uparrow; [\overline{A_o}]; R_o\downarrow; [A_o]]. \quad (3.48)$$

This FIFO receives a request ($R_i \uparrow$), sends an initial acknowledge ($A_i \downarrow$) of that request and begins the latching process. Once the latching is complete and the FIFO receives $R_i \downarrow$ it send the final acknowledge ($A_i \uparrow$) out simultaneously with the outgoing request ($R_o \uparrow$). It then waits for an acknowledge of the request ($A_o \downarrow$) before sending $R_o \downarrow$. At this point the FIFO waits for $A_o \uparrow$ which indicates that it is now safe to change the data. At the same time the FIFO returns to waiting for an incoming request ($R_i \uparrow$).

Figure 20:
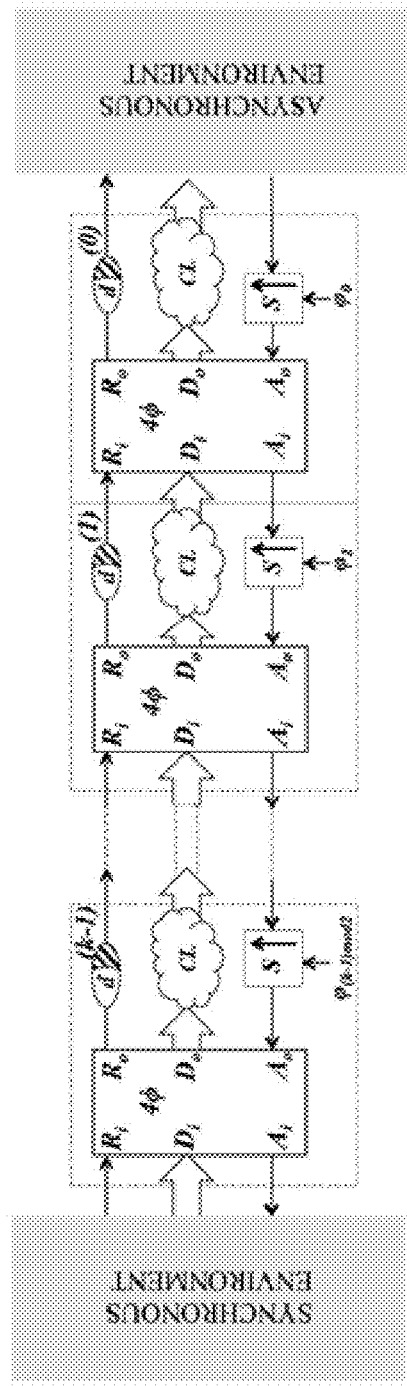
FIG. 20 shows an example of a four-phase protocol synchronous to asynchronous gradual synchronizer.

In order for computation to take place in parallel with synchronization one FIFO may be waiting for the computation to end and for synchronization to end at the same time. In addition we know that computation must be complete before the FIFO latches data. Since the FIFO begins latching data when it receives $R_i \uparrow$ computation must be complete so that delay occurs on the incoming up-going transition of $R_i$. We only need to look at the handshake to know that the synchronization must occur on the up-going transition of $A_o$ as this is the only time the FIFO is waiting for transitions on both inputs. The request must bypass the computational delay block if its value is logical zero and the acknowledge is simply passed through the synchronizer when it transitions to logical zero. The resulting gradual synchronizer is shown in FIG. 20, which shows an example of a four-phase protocol synchronous to asynchronous gradual synchronizer.

The proof of this case is provided below to enhance the flow of this thesis for the reader. The union of all the requirements for this synchronizer is:

$$\tau_S + \tau_{A_oA_i} < T/2$$

$$\tau_{R_iA_i} + \tau_d < T/2$$

$$\tau_{RA} < T/2$$

$\tau_{R_iR_o} + \tau_d < T/2$ $\tau_S + \tau_{A_oR_o} + \tau_{R_iA_i} + \tau_d < T$ $\tau_S + \tau_{A_oR_o} + \tau_{RA} < T$ $\tau_{AR} + \tau_{R_iA_i} + \tau_d < T,$ (3.49)

where, $\tau_{R_iA_i} = \tau_{R_i\uparrow A_i\downarrow} + \tau_{A_o\downarrow R_o\downarrow} + \tau_{R_i\downarrow A_i\uparrow}$ $\tau_{R_iR_o} = \tau_{R_i\uparrow A_i\downarrow} + \tau_{A_o\downarrow R_o\downarrow} + \tau_{R_i\downarrow R_o\uparrow}$ $\tau_{A_oA_i} = \tau_{A_o\uparrow A_i\downarrow} + \tau_{A_o\downarrow R_o\downarrow} + \tau_{R_i\downarrow A_i\uparrow}$ $\tau_{A_oR_o} = \tau_{A_o\uparrow A_i\downarrow} + \tau_{A_o\downarrow R_o\downarrow} + \tau_{R_i\downarrow R_o\uparrow}.$ (3.50)

In addition, $\tau_S$ must become:

$\tau_S = \tau_{S\uparrow} + \tau_{S\downarrow}.$ (3.51)

And so $\tau_d$ must be:

$\tau_d = \tau_{d\uparrow} + \tau_{d\downarrow}.$ (3.52)

Previously, in the two-phase case, we added an extra FIFO acknowledge input in order to reclaim some time from the $A_oR_o$ and $A_oA_i$ delays. In the four phase case described here, the $V_o$ FIFO modification provides a similar benefit. The saving occurs in the $A_o \uparrow A_i \downarrow$ delay which is part of both the $A_oA_i$ and the $A_oR_o$ delay in the four-phase case.

Proof of Concept

We have proven theoretically that the gradual synchronizer is a valid synchronizer assuming all the requirements can be met. Now, we evaluate the synchronizer in a more realistic manner. The 2-phase and 4-phase gradual synchronizers have been simulated over a range of transmitter and receiver operating frequencies. We compare the results against three different flip-flop based synchronizers: simple 4-phase, fast 4-phase, and fast 2-phase; the 2-phase and the 4-phase pipeline synchronizer and the dual clock FIFO synchronizer.

All simulations are done with HSIM using technology files for a 90 nm process. The various synchronizers are placed between a synchronous transmitter environment and a synchronous receiver environment. The two synchronous environments are simulated over a range of clock speeds and relationships.

MTBF

Fast synchronizers are designed to diminish the probability of a metastability failure at the output of the synchronizer. Most synchronizer research classifies the performance of these synchronizers in terms of the mean time before failure (MTBF). In order to fairly compare the performance of synchronizers the MTBF should be taken into account, in addition to latency and throughput. In order to compare MTBFs we must know the operating frequency, in general faster frequencies result in lower MTBFs.

The flip-flop synchronizers have an MTBF of:

$$MTBF(FF_{single}) = \frac{e^{S/\tau}}{T_w \cdot F_c \cdot F_d},$$ (4.1)

where S is the time allotted by the synchronizer for metastability resolution, $\tau$ is the resolution time constant of the synchronizer, $T_w$ is the time window during which the input signal must be held stable in order to avoid a metastability, $F_c$ is the sampling clock frequency, and $F_d$ is the frequency of changes in the input data.

Recall that for two clock domains to be synchronized to each other the request signal must be synchronized to the receiving clock and the acknowledge signal must be synchronized to the sending clock. This means that the MTBF in equation 4.1 is actually only for one side of the synchronization. The flip-flop synchronizers need two synchronizer circuits to accomplish the task of synchronizing between the two clocked domains. The MTBF for the full synchronizer is equal to:

$$MTBF(FF_{total}) = \frac{1}{1/MTBF(\text{send}) + 1/MTBF(\text{rcvr})}.$$ (4.2)

Figure 21:
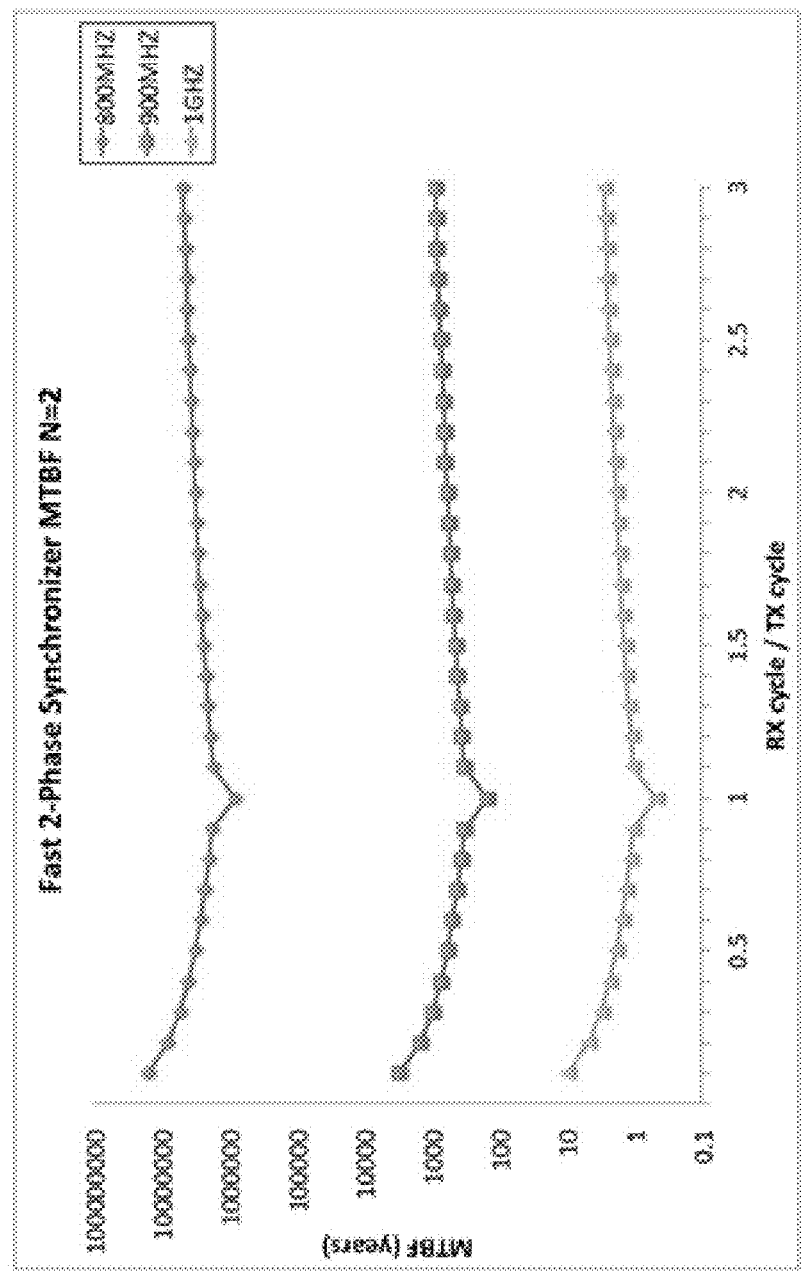
FIG. 21 shows an example graph of mean time between failure (MTBF) of the Fast 2-Phase Synchronizer for maximum clock frequencies of 800 MHz, 900 MHz and 1 GHz.

If we plot the MTBF over a range of receiver to sender frequency ratios of one of the base comparison synchronizers, say the fast 2-phase synchronizer, we can observe from FIG. 21, which shows an example of MTBF of the Fast 2-Phase Synchronizer for maximum clock frequencies of 800 MHz, 900 MHz and 1 GHz, that while 1 GHz is an acceptable and popular operating frequency for chips using a 90 nm process, synchronizers in this case may need to be made more robust (adding additional flip-flops or stages) in order to increase the MTBF. For instance, we can observe that if two clock domains interface with each other both operating at 1 GHz (clock ratio of one) the MTBF is a little less than one year. Since we would like to compare all of the synchronizers over a variety of sender/receiver clock ratios without varying their structure and with a high maximum frequency we use a 900 MHz clock frequency which yields a high enough MTBF for simulation purposes. We also want to show the flip-flop synchronizers at their best latency and throughput performance so we do not inadvertently bias the results in favor of our research.

Next, we take a look at the MTBF of the pipeline and gradual synchronizers. The probability of a metastability failure at the output of the two phase pipeline or gradual synchronizer is equal to, $$P_f^{(PS\ or\ GS)} = P_f^{(k)} = P_f^{(0)} e^{-\frac{k(T/2 - T_{oh})}{\tau_o}}.$$ (4.3)

$P_f^{(0)}$ is the rate that metastability occurs at the inputs to the synchronizer. The rate of entering metastability can be calculated as:

$R(\text{metastability}) = T_w \cdot F_C \cdot F_D,$ (4.4)

where $T_w$ is the window around the sampling edge of the clock during which a change in the input data could cause the latch to become metastable, $F_C$ is the clock frequency and $F_D$ is the injection rate of the input data.

The synchronizer then reduces the chance that a metastability at its input will cause a failure in the circuit at its output. Therefore the rate of failure is:

$$R(\text{failure}) = T_w \cdot F_C \cdot F_D e^{-\frac{k(T/2 - T_{oh})}{\tau_o}}.$$ (4.5)

The MTBF is the inverse of the failure rate:

$$MTBF_{(GS)} = \frac{e^{\frac{k(T/2 - T_{oh})}{\tau_o}}}{W \cdot F_C \cdot F_D},$$ (4.6)

$T_{oh}$ is equal to the overhead introduced by the signaling asynchronous FIFOs. For example, in the asynchronous-to-synchronous two-phase gradual synchronizer the overhead is $$T_{oh} = \tau_S + \tau_{R_iR_o}. \quad (4.7)$$

Figure 22:
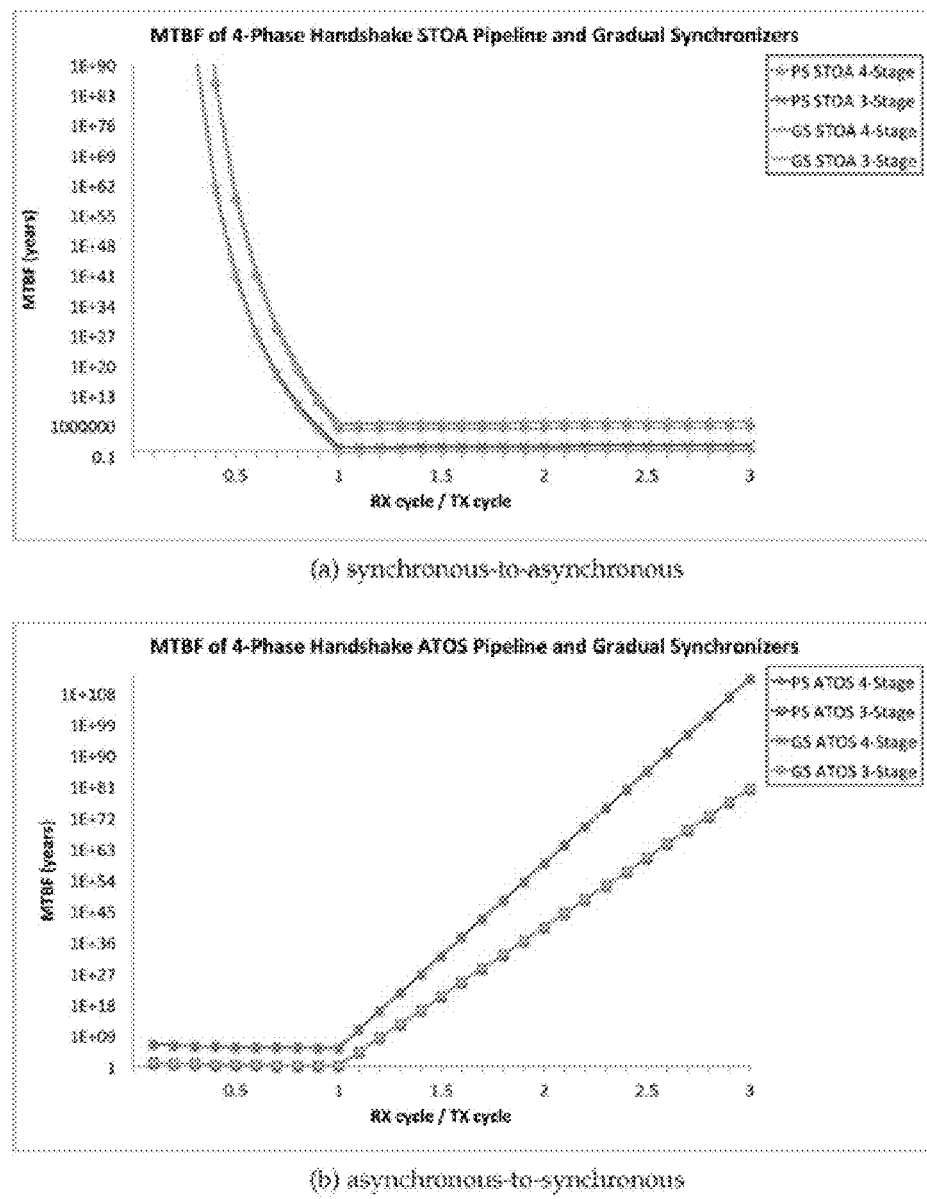
FIG. 22 shows an example graph of MTBF of the 4-Phase Handshake 3-stage and 4-stage Pipeline and Gradual Synchronizers.
Figure 23:
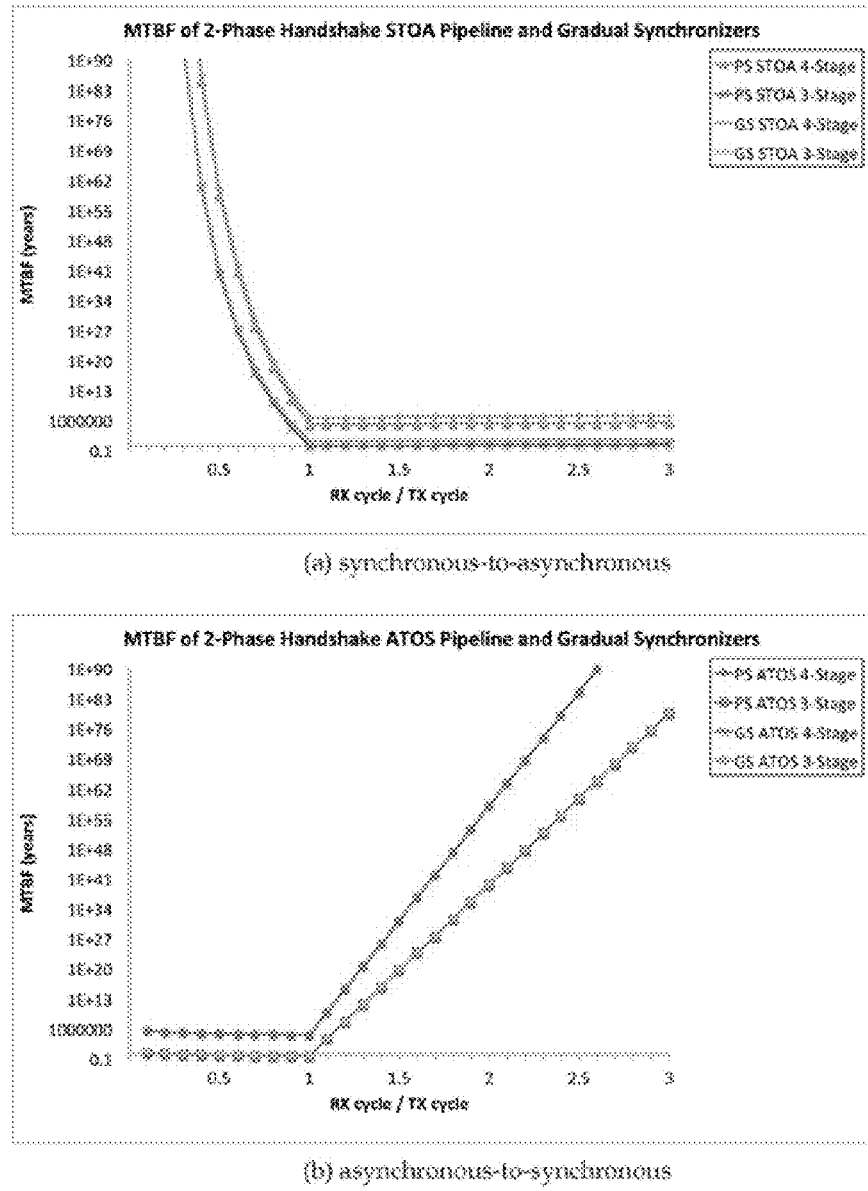
FIG. 23 shows an example graph of MTBF of the 2-Phase Handshake 3-stage and 4-stage Pipeline and Gradual Synchronizers.

Both the Pipeline Synchronizer and the Gradual Synchronizer have many different configuration options. They can use 2-phase or 4 phase handshakes, synchronize either the request or the acknowledge, and the number of stages can be varied. Increasing the number of stages yields a better MTBF but will also result in a longer latency. FIG. 22 and FIG. 23 compare the different configurations for a maximum clock frequency of 900 MHz. The MTBFs of the four phase synchronizers are very close. Slight differences can be attributed primarily to differences in fanout and transistor stacks. The MTBF of the s-to-a gradual synchronizer suffers slightly from the down-going transition of the asymmetric computation delay (no computation is going on at this time but the signal bypasses the delay using an AND gate). In the a-to-s direction the down-going transitions do not stack therefore we don't see a difference between the pipeline and gradual synchronizers in that case. The MTBFs of the three-stage synchronizers are low enough to be a bit risky for any system. We conclude that a four-stage 4-phase gradual synchronizer is a suitable choice for our comparisons.

When using two phase synchronizers, the MTBFs vary a bit more. The 3-stage pipeline synchronizers show the shortest MTBF, and this is especially significant when the frequency ratios are one or lower. For this reason 4-stage 2-phase synchronizers are used for latency and throughput comparisons. Notice that the s-to-a direction of the gradual synchronizer has higher MTBFs. This is because of the $V_o$ input modification to the FIFO for this direction, which allows the FIFO to get a jump start on locking the next data which reduces $\tau_{A_oA_i}$ as the entire data lock can take place before even the minimal sync block delay, $\tau_S$, completes. This modification could also be applied to the pipeline synchronizer to improve its MTBF but since it would only improve the s-to-a direction and for our main comparison we choose not to vary the synchronizer structure it is not necessary to make this modification.

Figure 24:
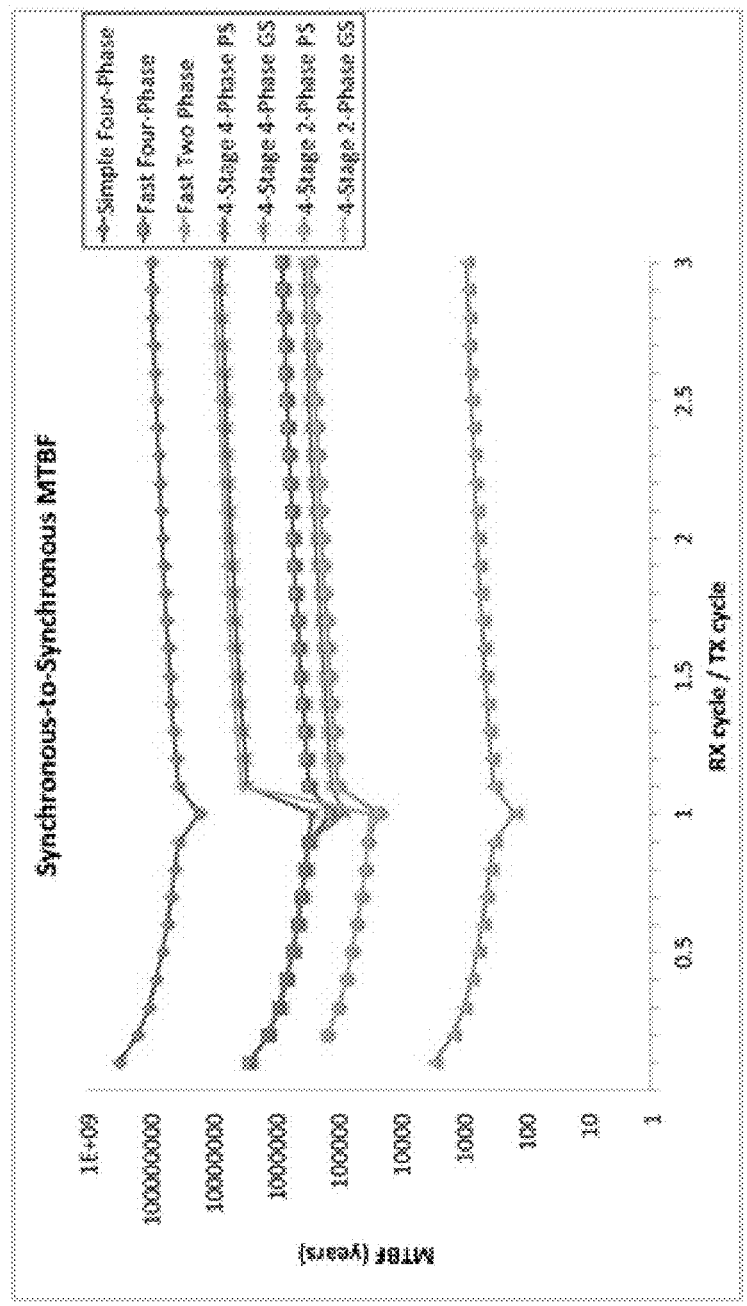
FIG. 24 shows an example of a comparison of the MTBF of several synchronizer configurations. The flip-flop synchronizers shown are for N=2 meaning about one clock cycle is allotted for metastability resolution.

The most fair latency and throughput comparison of synchronizers would be between synchronizers where the third characteristic, MTBF, were equal. As can be seen in FIG. 24 this is difficult to achieve. The synchronizer configurations can only be adjusted by adding or removing flip-flops in the case of flop based synchronizers and adding or removing stages in the pipeline and gradual synchronizers. Instead of equal MTBFs, we settle for choosing configurations that lead to MTBFs above a certain threshold. Note that a higher MTBF is better. For our comparison simulations we choose a threshold of 100 years since nothing catastrophic is going to happen if our simulations fail due to a metastability. When the synchronization of the request and acknowledge are combined the worse of the two MTBFs dominates the resulting MTBF of the combined system. This is why there are dips and jumps around a ratio of one. A jump in the MTBF occurs when the worst MTBF changes from the request curves to the acknowledge curves seen in FIG. 23 and FIG. 24. Jumps do not occur as we transition from the send side being slower to the receive side being slower for the flip-flop synchronizers because the send and receive sides are essentially identical except for the clock frequencies. The dips in the data for both types of synchronizers occur as a result of the combined MTBFs. At a ratio of one the two MTBFs are close and therefore combined create a worse resultant MTBF. At ratios other than one the order of magnitude of the MTBFs differ enough that the higher MTBF is an insignificant contribution toward the total MTBF.

Figure 25:
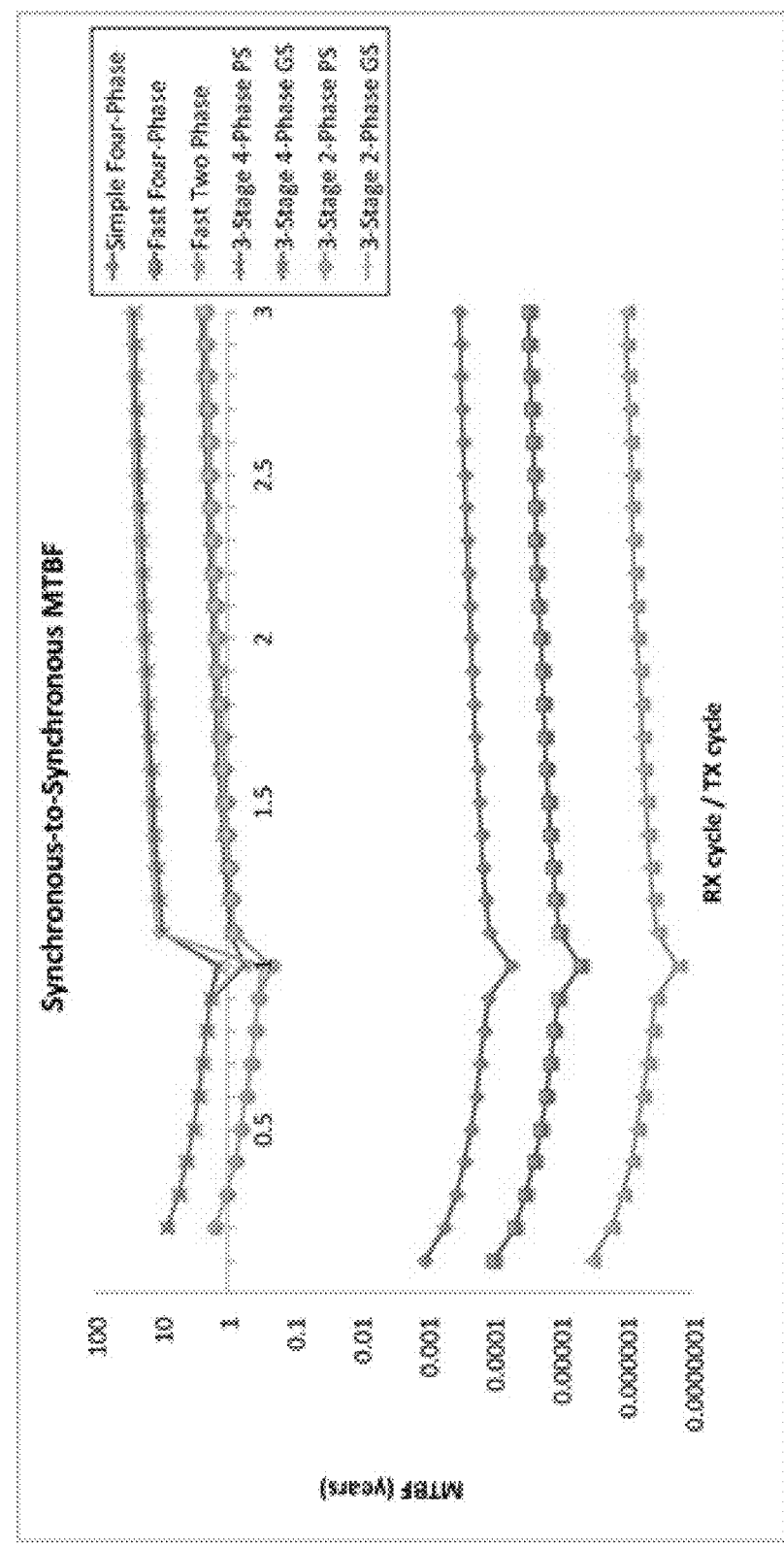
FIG. 25 shows an example of a comparison of the MTBF of several synchronizer configurations. The flip-flop synchronizers shown are for N=1.5 meaning about half a clock cycle is allotted for metastability resolution.

FIG. 25 shows that reducing the time allotted for metastability resolution in the flip-flop based synchronizers to one-half of a clock cycle (by using opposite-edge triggered flip-flops) reduces the MTBF of all the flip-flop based synchronizers below our simulation target MTBF of 100 years. The graph also shows the same result for reducing the staged synchronizers to 3-stages. For this reason section 4.2 discusses only the four-stage versions of the pipeline and gradual synchronizers and the N=2 versions of the flip-flop synchronizers.

Figure 26:
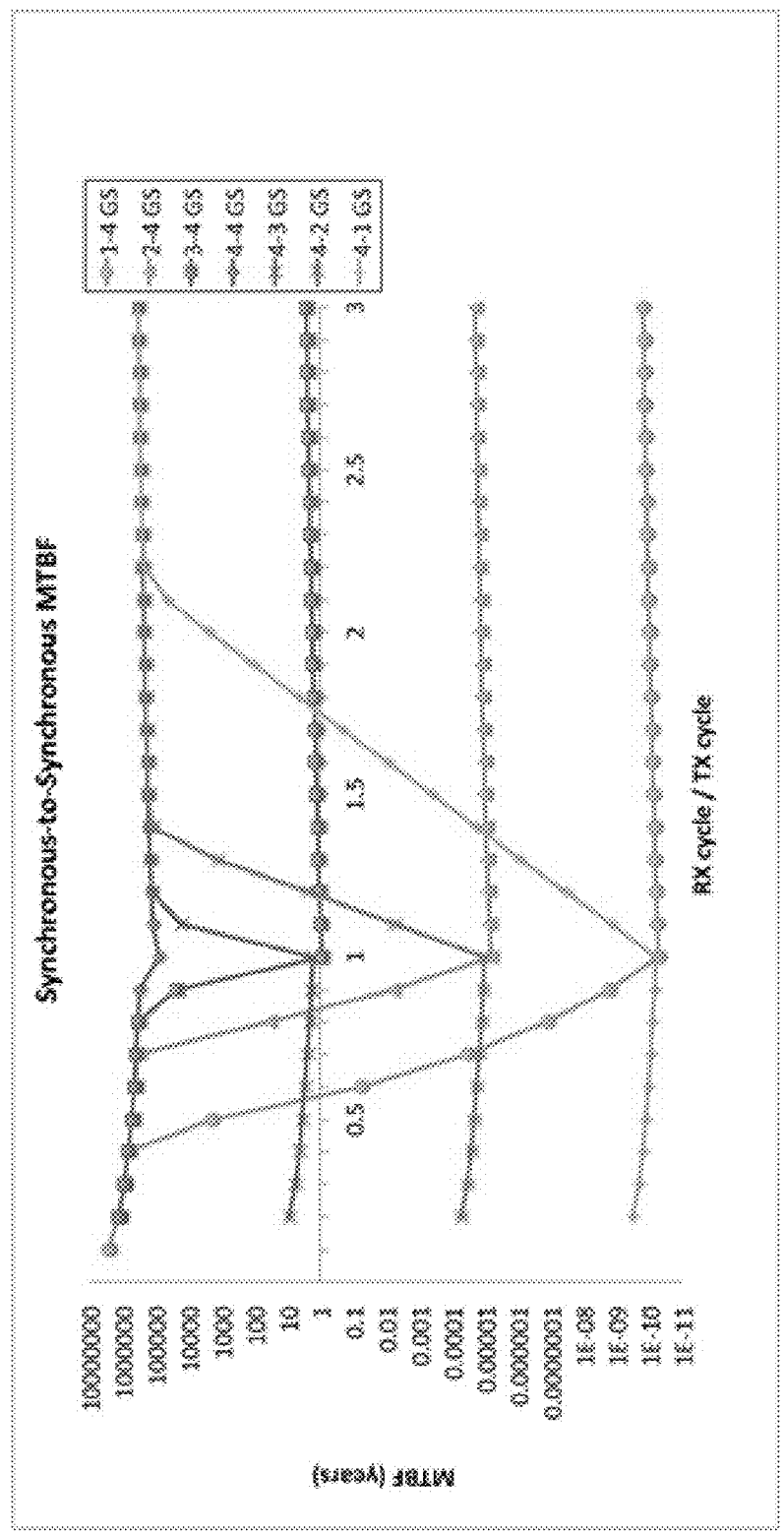
FIG. 26 shows an example of a comparison of the MTBF of a 4-phase gradual synchronizer with varying numbers of stages on the request and acknowledge ends.

Another option is employing a different number of stages/flip-flops on the request side than on the acknowledge side based on the corresponding clock speeds. This is definitely a possibility and should be considered in the design of any system. FIG. 26 shows what happens to the MTBF for a few different combinations of one of the staged synchronizers. We used the gradual synchronizer, it is the most interesting since we need to be aware that changing the number of stages not only changes the latency but also changes the total amount of time available for computation. In most cases where one side is twice as fast as the other it is possible to reduce the number of stages on the slow end to just one stage. For cases where one side is faster but less than double the speed of the other end it is possible to reduce the number of stages on the slower end to three or even two stages. This reduction will obviously have a significant (positive) effect on the latency of the synchronizer. However, presenting the performance of all of these options had the effect of making our data seem very jumbled and hard to interpret. Instead of presenting latency and throughput for every synchronizer in multiple configurations we've shown comprehensive results for the synchronizers with the same number of stages at both ends and included a few significant results for different configurations at certain ratios. This improves readability of this thesis and also gives the reader a good representation of the effect all the synchronizer design factors can have on performance.

The Dual-Clock Synchronizer is not included on the MTBF graphs because the synchronization of the empty and full control signals uses flip-flop synchronizers. The MTBF of the flip-flop synchronizers depends on the characteristics of the flip-flops used and not the surrounding circuitry.

Latency and Throughput

For our latency and throughput comparisons we created two synchronous environments and addressed synchronization between the two environments using each synchronizer type. For each synchronizer type we ran multiple simulations, varying the clock speeds and phase relationships for the sender environment and receiver environment. This allows us to report absolute worst case forward latency for any data item and ensure throughput is maintained. Maximum throughput is maintained for the FIFO style methods, including gradual synchronization, if the environment for the slower of the two clocks is able to send or receive every cycle.

Figure 27:
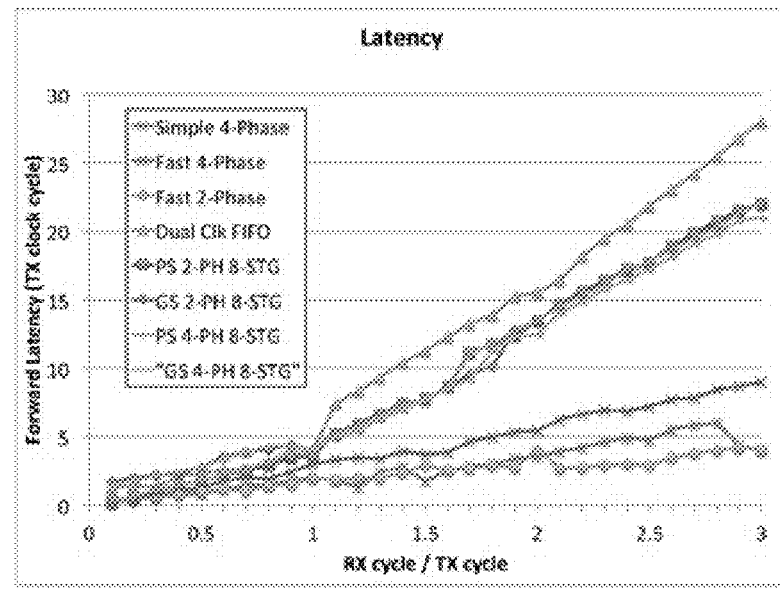
FIG. 27 shows an example comparison of a worst case forward latency of the synchronizers.

The latency reported in FIG. 27 is the forward latency, from entry of request into the synchronizer to validity in the receiver. We present latency and throughput results in terms of tx cycles and words per tx cycle because no matter what the top clock frequency is the latency and throughput trends remain the same when reported in this manner, therefore it is unnecessary to show results for multiple clock speeds. It is important to note that the latency of the gradual synchronizer does not include the cycles that would be saved by merging computation from the surrounding circuitry into the synchronizer. We refer to this as the raw latency of the gradual synchronizer. The raw latency is reported here both because it is hard to quantify the total latency savings without picking the functionality of the system and also because it may be desirable to show that the gradual synchronizer does not result in longer raw latencies than the pipeline synchronizer or dual-clock FIFO.

Figure 28:
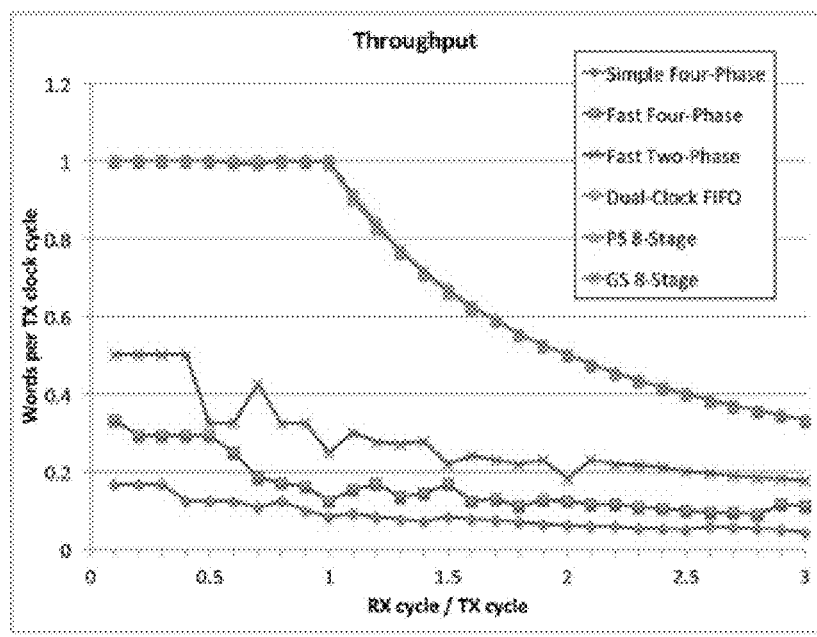
FIG. 28 shows an example of a throughput comparison of the synchronizers.

The flip-flop synchronizers have the shortest latency. Their forward latency is purely based on the delay the request signal experiences through the two flip-flops used as a synchronizer on the receiving end. The simple 4-phase version of this synchronizer takes the longest because its synchronizer is two flip-flops placed before the flip-flop on the border of the receiving end. This means the control signal actually has to pass through three flip-flops. The fast 4-phase and fast 2-phase versions use the receiving flip-flop as one of the flip-flops in the synchronizer, allowing the request control signal to pass through one less flip-flop, hence reducing the forward latency. The disadvantage of these methods is the throughput as shown in FIG. 28. Only one data item can be synchronized at a time, the acknowledge cannot begin its return to the sender until the clock cycle in which the receiver locks that data. Then the acknowledge signal returns to the sender through its own set of synchronizing flip-flops. Since the simple and fast 4-phase synchronizers use a four-phase handshake both the receive and send side synchronizers must be passed through twice before the next data item can be injected into the synchronizer. The fast two-phase has the highest throughput of the flip-flop synchronizers since each synchronizer is only encountered once to complete the handshake.

The throughput results for the FIFO synchronizers show the expected results. All of the FIFO synchronizers do exactly what they are supposed to—which is allow the slower end to send or receive every cycle. If the sender is slower (ratios less than one) then the throughput is equal to one data word per send clock cycle. If the receiver is slower the throughput is equal to one data word per receiver clock cycle, so since the throughput is reported in send clock cycles the resulting throughput exhibits a direct inverse relationship to the clock ratios.

The latency of the FIFO synchronizers is much more interesting. When the send side is slower (ratios less than one) the gradual synchronizer appears to have the longest latency. This is because the pipeline synchronizer send side forward latency only takes as long as it takes the data to pass through all the stages, since the synchronization delay only occurs on the backward traveling acknowledge signal. When we use the gradual synchronizer the computation delay adds latency to the forward direction since the computation in between stages needs time to complete. So the raw latency from insertion into the synchronizer to receipt at the other end is longer, but the total system latency will be reduced from the relocation of computation into the synchronizer. We could also counter this effect by using a pipeline synchronizer for the send half and a gradual synchronizer for the receive half, hence eliminating the computation that increases the send side latency.

Above a ratio of one the pipeline and gradual synchronizers perform better than the Dual Clock FIFO. This is because while the dual clock FIFO only locks data once because the data is written in a register and does not move until it is read by the receiving end; once the FIFO has filled up the full and empty pointers are constantly colliding, so you get latency from the FIFO plus the latency of synchronization between the two pointers. You can see this visually on the graph in the jump in latency from 1 to 1.1, this is where the pointers begin to collide. Here too, the forward latency of the system using the gradual synchronizer will actually be reduced. The gradual and pipeline synchronizers experience a latency jump as well, at ratio 1.9 and 1.7 respectively. This jump is not as drastic as the one for the dual-clock FIFO and corresponds to the point at which moving data forward through the sender stages of the synchronizer no longer hides all of the time it takes the slower receiving end to acknowledge the last transfer. The difference between the pipeline synchronizer and the gradual synchronizer is exclusively a result of the acknowledge forward signal present in the s-to-a synchronizer. This modification could be applied to the pipeline synchronizer as well.

Time Available for Computation

The amount of computation that can be accomplished in the synchronizer depends on two factors. First, it depends on the requirements whose derivation is described herein. For each synchronizer type and clock speed the limiting requirement for $\tau_d$ must be determined, i.e. the requirement that leads to the smallest $\tau_d$. In addition the design must take into account how much relocatable computation preexists in the environment. For instance, even if there is time for 1.68 clock cycles of computation, in reality only whole cycles can actually be relocated into the synchronizer, unless the cycles in the synchronous environment were not "full" in the first place and then a full two cycles may be eliminated from the environment. This is hard to determine without more knowledge of the surrounding system's functionality. It may be assumed that the synchronous environment's pipeline is well used. This means that in the above example only one cycle could be merged into the gradual synchronizer.

Figure 29:
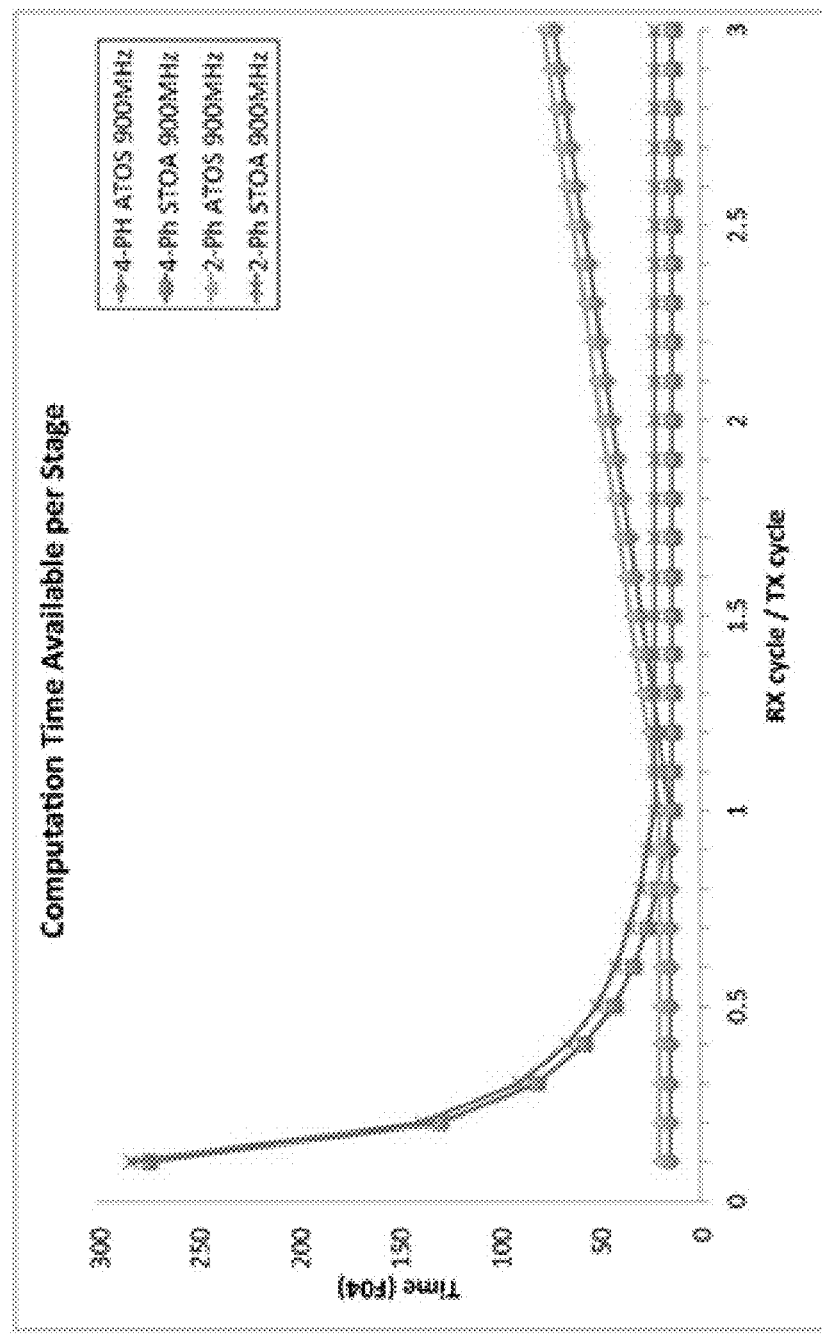
FIG. 29 shows an example of time Available for Computation in each stage of the Gradual Synchronizer.

FIG. 29 shows the amount of time (given in FO4) available in each stage for each synchronizing direction. The delay associated with passing through the FIFO in each stage does not change and therefore more time is available for computation as clock frequencies decrease. The delay of an inverter with a fanout of four is used as a metric of logic gate delay. It is useful here because it provides a better idea of the amount of work that can be accomplished in a given amount of time at a particular technology point.

Figure 30:
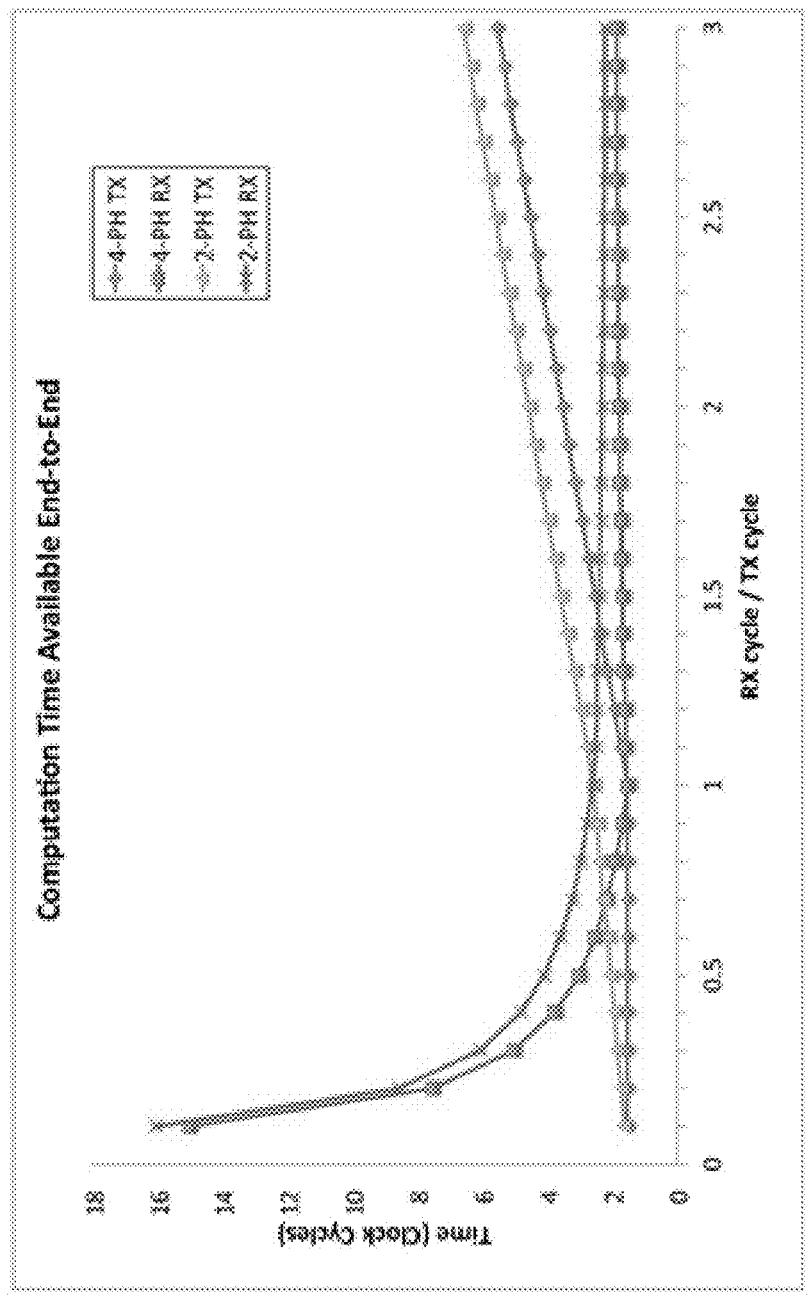
FIG. 30 shows an example of a time Available for Computation in the Gradual Synchronizer.

Now, assuming high pipeline stage utilization we know that only full cycles can be merged into the synchronizer so FIG. 30 shows both the number of send cycles and the number of receive cycles that could be merged into the gradual synchronizer if we remove computation from each end respectively. We could also take different numbers of cycles from both sides in order to make the most use of the time available. For instance, at a RX/TX ratio of 0.1 the computation time available is only equal to 1.5 TX clock cycles. So only one clock cycle from the Send side can be merged into the synchronizer. However, after merging one send clock cycle we could then use the rest of the available computation time to merge in some of the shorter RX cycles.

Figure 31:
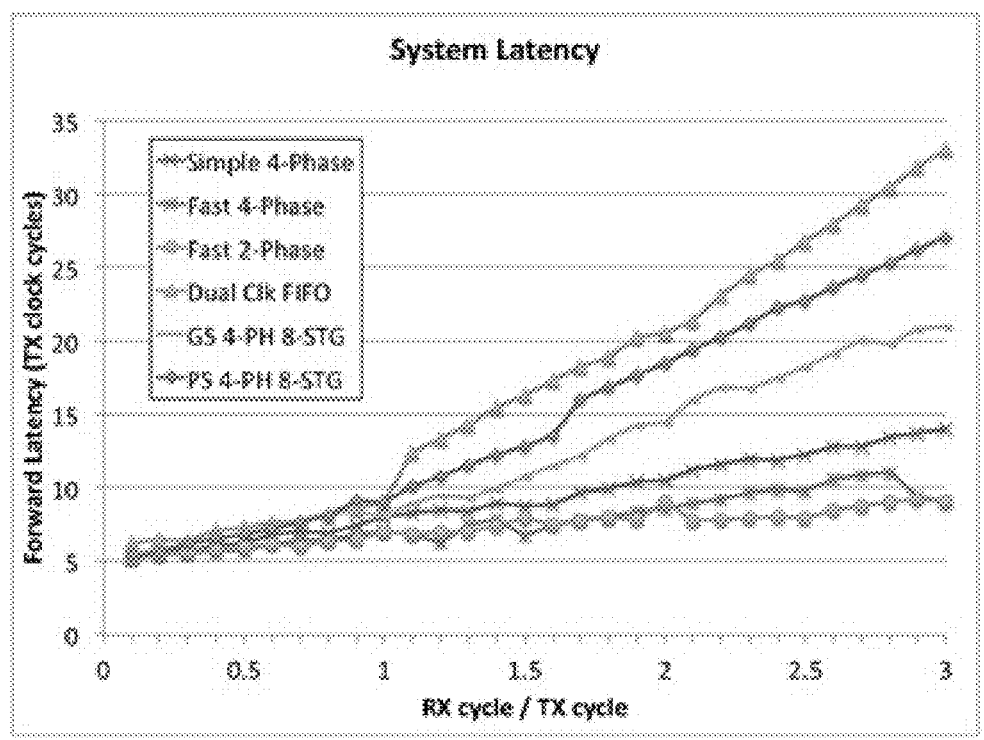
FIG. 31 shows an example of a model system forward latency using various synchronizer types.

Without knowledge of the particular system it is difficult to determine exactly how many cycles could be merged and from where. In addition, if only using one synchronizer direction (either s-to-a or a-to-s) computation could also be merged from the asynchronous environment as well. As result the potential resultant system latency that follows is only an estimate. For our estimate, we use the structure described herein, where the two synchronizers are connected end-to-end. We use a reasonable worst case projection; where only full cycles can be merged into the gradual synchronizer. The projected latency of the system is shown in FIG. 31. The system latency shown includes five cycles preceding the synchronizer from the synchronous send domain.

The system latency graph shows that when the full system latency is taken into account the gradual synchronizer exhibits further latency savings verses the other FIFO synchronizers when clock frequencies are close and when the receive side is slower. The gradual synchronizer has a higher single item forward latency than the flip-flop synchronizers, therefore knowledge of the system throughput requirements is necessary before choosing between the gradual synchronizer and the flip-flop synchronizers.

To put things in perspective, table 2 shows the latency of transferring ten data words using one of the FIFO synchronizers and one of the flip-flop synchronizers assuming the system is trying to transmit every cycle. Clearly, the FIFO based synchronizers are better in this situation.

TABLE 2

Latency comparison of transferring multiple words.

| | Synchronizer Latency (TX clk cycles) | |
|---|---|---|
| Ratio | Fast 4-Phase | GS 4-Phase 8-Stage |
| 0.5 | 31.75 | 14.10 |
| 1.0 | 56.04 | 13.03 |
| 2.0 | 56.54 | 30.50 |

Area

Area reported is the product of the width and length of the transistors in the synchronizer circuits only. The gates implementing the computational logic in the gradual synchronizer have not been included in the area calculation given that these gates pre-existed in the circuitry around the synchronizer and have simply been relocated to within the synchronizer, therefore they do not represent an area increase within the circuit. The area of the gradual synchronizer can change if extra data is created due to calculations that span stages. Therefore the area shown is an estimate and may vary slightly depending on the function of the surrounding circuitry. However, since some of these latches may also just be relocated the number of data latches is kept static from stage to stage in the estimate. Since the Gradual Synchronizer can reduce the number of pipeline stages necessary in the surrounding circuitry the Gradual Synchronizer can also cause a reduction in the area of the total circuit as compared to a Pipeline Synchronizer, this reduction is also not reflected in the area reported for the Gradual Synchronizer. The area shown in table 3 is for synchronizers moving one word (32 bits) of data.

TABLE 3

Comparison of synchronizer circuit area.

| Synchronizer | Area ($\mu m^2$) |
|---|---|
| Simple 4-Phase Synchronizer | 3.888 |
| Fast 4-Phase Synchronizer | 3.552 |
| Fast 2-Phase Synchronizer | 4.176 |
| Dual-Clock FIFO | 266.096 |
| 2-Phase 6-Stage Pipeline Synchronizer | 87.024 |
| 2-Phase 8-Stage Pipeline Synchronizer | 112.496 |
| 4-Phase 6-Stage Pipeline Synchronizer | 76.256 |
| 4-Phase 8-Stage Pipeline Synchronizer | 98.192 |
| 2-Phase 6-Stage Gradual Synchronizer | 89.184 |
| 2-Phase 8-Stage Gradual Synchronizer | 115.376 |
| 4-Phase 6-Stage Gradual Synchronizer | 81.08 |
| 4-Phase 8-Stage Gradual Synchronizer | 106.096 |

Figure 32:
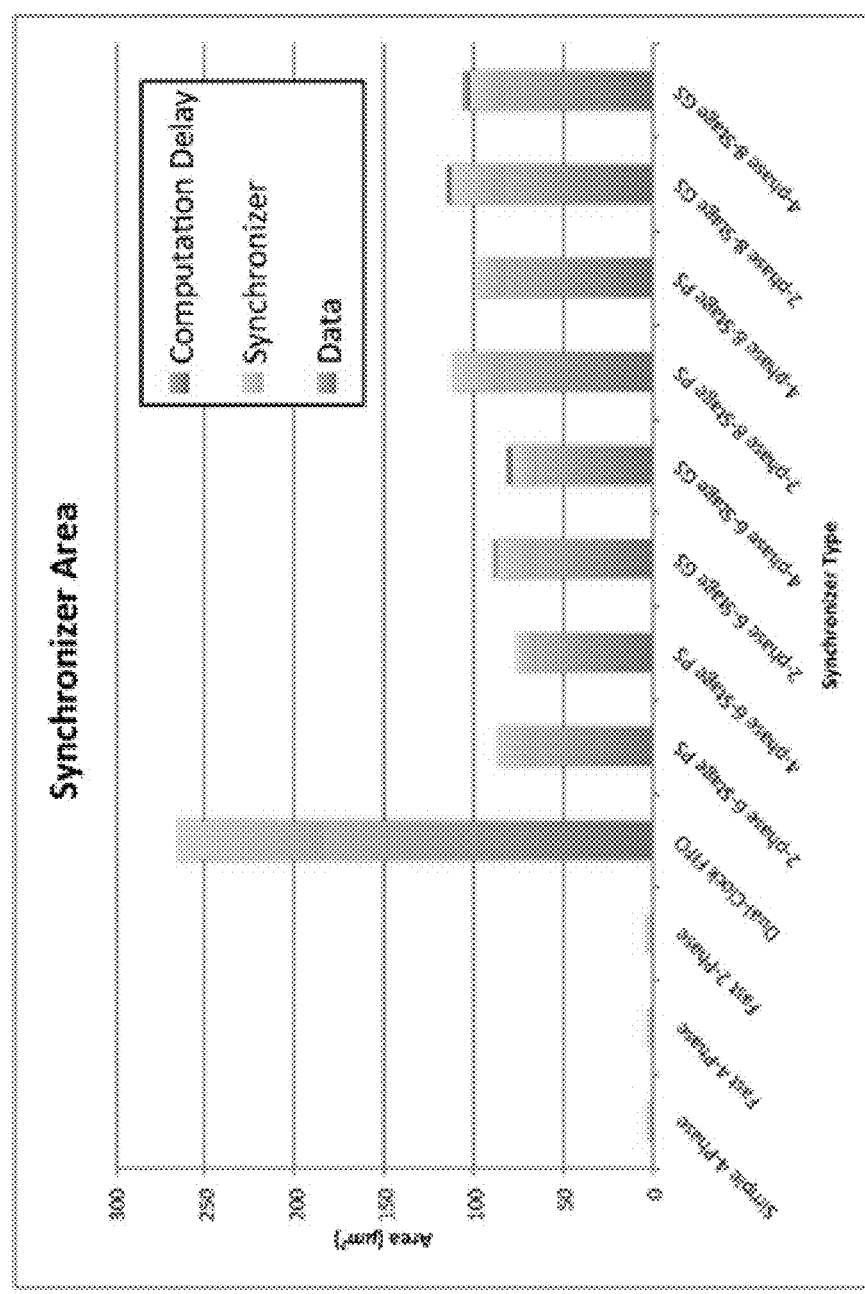
FIG. 32 shows an example of a visual breakdown by area of what function the transistors in the synchronizers serve.

The pipeline synchronizer and the gradual synchronizer are much larger than the flip-flop based synchronizers. FIG. 32 shows this increase is due largely to the increased data storage necessary within the synchronizer in order to have multiple synchronizations 'in flight' at the same time. The gradual synchronizer is not much larger than the pipeline synchronizer, the difference is mostly compromised of the transistors implementing the computational delay block which is only an inverter chain. Computation delay can also vary depending on clock frequency. Here, we have assumed fast maximum clock frequencies for both the transmitter and receiver domains. However, we can observe from FIG. 32 that the area of the computation delay block is minimal compared to the rest of the synchronizer. Even at clock speeds as slow as 90 MHz the delay block will not be larger than 11 $\mu m^2$. The Simple 4-Phase, Fast 4-Phase, and Fast 2-Phase synchronizers do not store any data, instead data is kept steady at the synchronizer send interface until it has been safely passed to the receiving interface.

The Dual-Clock FIFO is over double the size of the largest gradual synchronizer and four times the size of the flip-flop synchronizers. Since the dual clock FIFO only places data into the synchronizer once and does not move it until it is removed from the synchronizer the dual-clock FIFO data cells require more support logic to handle cell access.

Still, when you consider that the largest synchronizer is 250 $\mu m^2$ which translates to 0.000250 $mm^2$ and chip sizes at 90 nm are at least several $mm^2$ synchronizers in general do not account for a large percentage of chip area.

Power

For power estimates we have removed data computation from the simulations in order to avoid duplicate power consumption. Since the computation is really just relocated from the system environment surrounding the synchronizer it should not factor into synchronizer power usage. Only the computational delay line remains since this is an addition of transistors exclusive to the gradual synchronizer.

Figure 33:
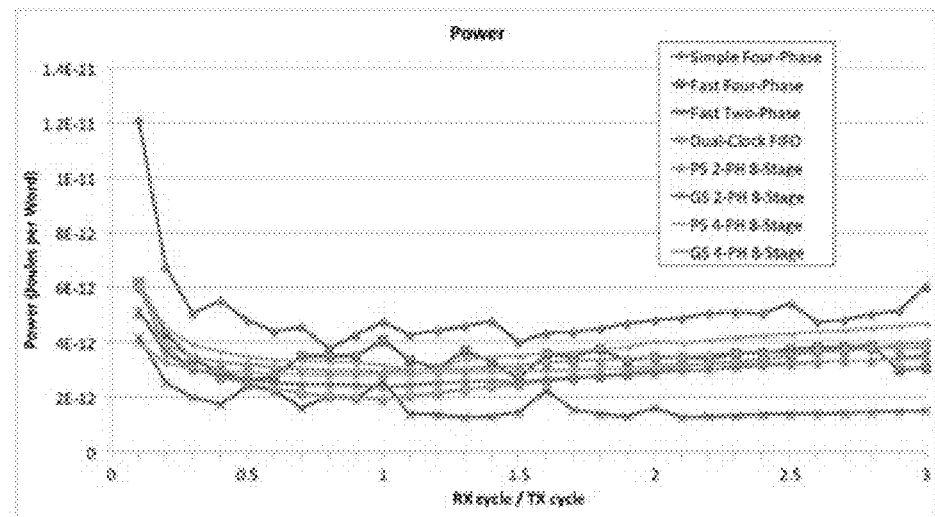
FIG. 33 shows an example of a power per word transferred comparison of the synchronizers.

FIG. 33 shows the power usage with throughput taken into account. As expected the Dual-Clock FIFO generally uses less power than the other FIFO synchronizers, it saves power by keeping the data in place after it is inserted into the synchronizer and instead synchronizing the full and empty pointers. As ratios become larger the longer latency of the Dual Clock FiFO causes it to use more power than the staged synchronizers per word transferred. Surprisingly, the Simple Four-Phase Synchronizer uses more power per word transferred than all the other synchronizers. This is a result of its low throughput, which causes static power to play a more significant role.

Figure 34:
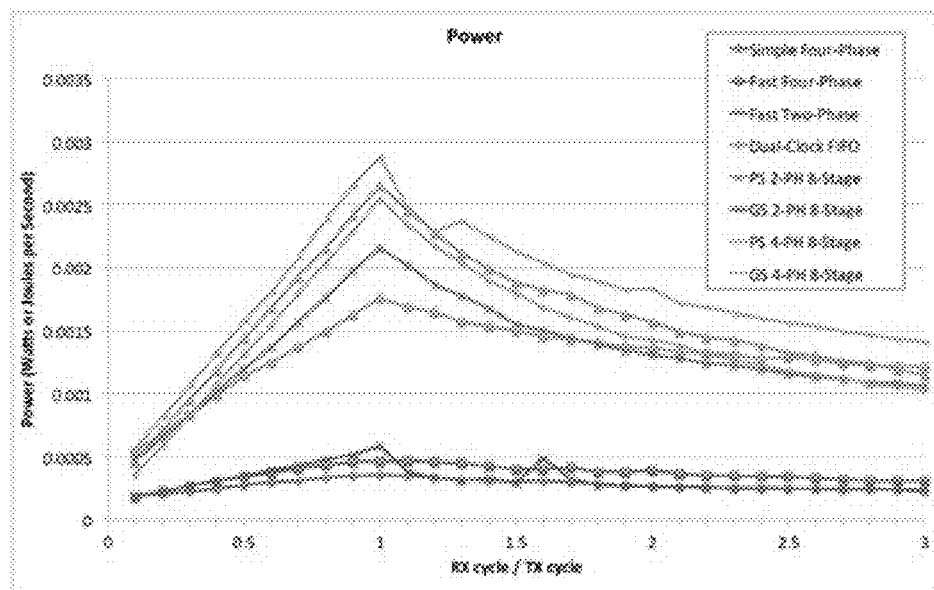
FIG. 34 shows an example of a raw power usage reported for the synchronizer simulations.

However, all of the methods are on the same rather low order of magnitude. If we take a look at the raw power numbers from the simulations (shown in FIG. 34 they show that none of the synchronizers use that much power as compared to the chip as a whole. Optimistic power estimates for a chip at the 90 nm process point with parts running at 900 MHz start at about 10 Watts. Even in the very worst case one of these synchronizers only amounts to about 0.028% of that power usage.

Applications of the Gradual Synchronizer

The next few sections provide several high level descriptions of how the gradual synchronizer could be used and one detailed example. The shorter visible latency, consistent throughput and ability to function over a long link delay means the gradual synchronizer is adaptable to many different systems. For the maximum benefit of the gradual synchronizer approach to be realized it is important to ensure that a sufficient amount of computation exists and can be dispersed into the synchronizer stages. The description details an implementation of a network interface that uses Gradual Synchronization. The implementation is simulated, evaluated and compared to a network interface that uses a fast four-phase flip-flop synchronizer.

Example Application Embodiments

The structure of the gradual synchronizer is such that it can be used under a broad range of circumstances. A few possible uses are presented here.

On-Chip Networks

Figure 35:
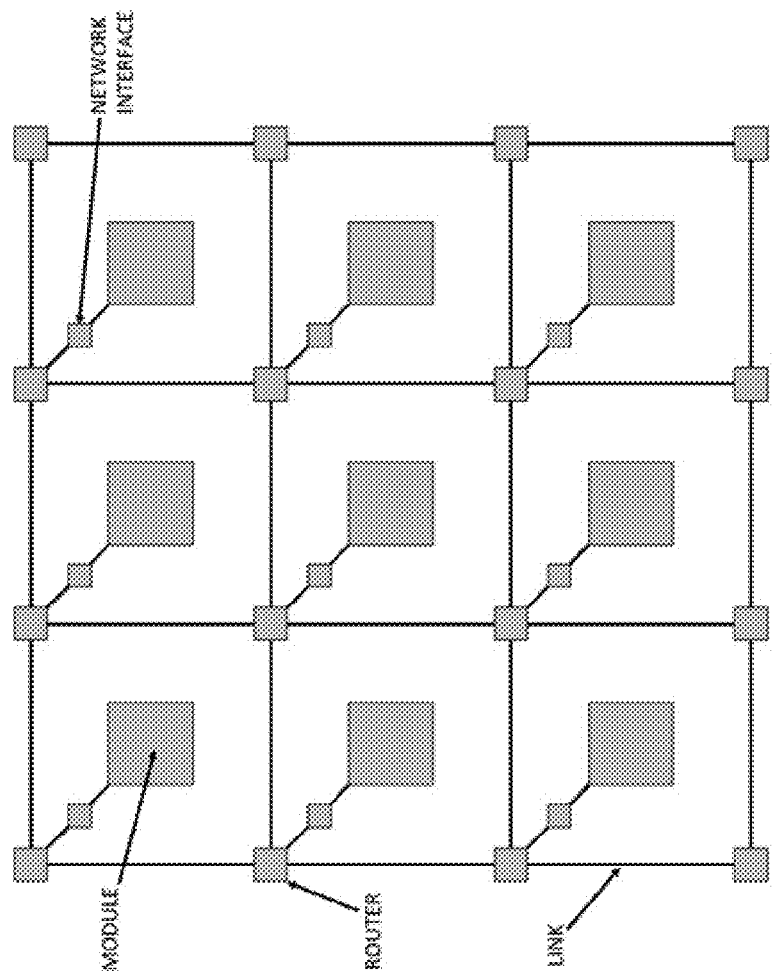
FIG. 35 shows an example of a 2D NoC mesh architecture.

GALS systems on chip (SoC) often employ network style designs with on chip interconnects and on chip routers to organize communication among the different domains. There have been a multitude of ways proposed to implement these on chip networks. A high level view is shown in FIG. 35. A network design is used because moving data around a chip with large and long buses is becoming expensive and difficult (in terms of power and timing). Using a network, each of the modules can operate as a different clock domain and can still communicate with any of the other modules on the chip. A network-like protocol is an obvious choice to manage the movement of data around the chip. Communication is implemented by packaging data into a message which then gets routed through the interconnect. The links and routers make up the network interconnect. Some designs implement the interconnect as a clocked interconnect others implement a fully asynchronous interconnect. Once a message reaches the destination module the data must be unpacked and synchronized to the receiving module's clock.

The use of gradual synchronization as the synchronization method of choice allows message preparation/unpacking and synchronization to take place simultaneously. In addition, many NoC designs include some buffering in order to allow multiple messages to be in flight. The gradual synchronizer provides at least some of this buffering automatically. Gradual Synchronization has the potential to significantly reduce network overhead latency because it merges three tasks that are usually done separately and serially. In addition this application of gradual synchronization is also easier to implement since it contains the custom design within the network interface (NI) which can then be used multiple times.

With reference to FIG. 35, synchronous NoCs usually use one clock domain for the entire routing structure. Modules then attach to the network through a network interface. Since each module could potentially operate at a different clock frequency a synchronization mechanism must be included in the network interface. Assuming the use of a synchronizer that directly employs handshake signals, two synchronizations occur as the message travels from the module through the network interface to the network fabric. One synchronization is required for the request signal and one for the acknowledge signal. Two additional synchronizations occur in the destination module's NI once the message arrives. Additional synchronizations would be required if the routing structure existed in multiple clock domains.

Asynchronous NoCs usually refer to NoCs that use data driven communication—no clock exists in the routing structure. The modules are clocked and attached to the network through a network interface but in this case only one synchronization occurs as the message travels through the NI. An outgoing message only needs to synchronize the acknowledge signal to the module clock and an incoming message synchronizes the request signal to the module clock.

Some research also extends NoCs to include error checking, error correcting and/or encryption. These functions require a lot of computation and would be excellent candidates for the type of computation that could easily be merged with synchronization using a gradual synchronizer.

Mixed Synchronous/Asynchronous Logic

Gradual Synchronization could be used to mix synchronous and asynchronous logic in a pipeline. Since the gradual synchronizer can be built into synchronous portions of the pipeline some computational units could be designed to use asynchronous style circuits. This would be a smaller scale application of the method but it could be beneficial in certain designs.

The design for this type of application could replace some of the pipeline stages leading up to the computational unit(s) designed to be asynchronous with gradual synchronization stages. If the clock domain on either side of the computational unit is the same clock the computation unit could easily be designed to swap between an asynchronously designed unit and a synchronously designed unit in the layout and simulation phase in order to achieve better power or performance.

Alternatively, the asynchronous computation unit could be designed to incorporate the gradual synchronization stages, making the unit itself completely swappable with a synchronous unit of the same function without modification to the surrounding synchronous pipeline. The benefit of the asynchronous computation would be reduced because at least part of the computation would still appear synchronous due to the synchronizer stages.

Gradual Synchronization in NoC

In this section we use gradual synchronization to improve the performance of an NI implementation, providing one concrete example of how the method can be applied. We selected the asynchronous version of QNoC as the NoC type that the NI interfaces with. This network is chosen because there are fewer synchronizations that need to take place in order for a communication to occur between two modules. Since the aim of gradual synchronization is to minimize the negative performance impact of synchronization, a set-up requiring fewer synchronizations in the base design is in line with our goals.

A simplified core interface has been designed and the NI implemented translates between the simple core requests and the QNoC compatible flits. The NI also unpacks arriving flits into the format recognized by the cores.

Network Interface Design Overview

QNoC uses a 2D mesh architecture as shown in FIG. 35. Each clocked module interfaces with an asynchronous router in the network through a network interface. The network interface connects to one of the standard router ports.

TABLE 4

Message based core send interface.

| Name | I/O | Width | Description |
|---|---|---|---|
| Valid | O | 1 | Indicates all other outputs are valid |
| Start | O | 1 | Indicates first word of transfer |
| End | O | 1 | Indicates last word of transfer |
| Data | O | 32 | Message data |
| Wait | I | 1 | Applies backpressure, preventing core from advancing data/ctrl signals until it is deasserted |

Each port is bi-directional, encompassing both an input and an output communication path. In order to prioritize important messages QNoC uses service levels (SLs), short important messages use different SLs and hence different wires therefore preventing less important messages from blocking important ones. Within SLs virtual channels (VCs) can also exist which reduces contention among messages of the same importance.

The network interface handles synchronization of incoming and outgoing requests. For outgoing messages the NI also controls selection of the SLs and VCs in addition to determining the routing path the flits must take through the network in order to reach their destination. A simple core interface (table 5.1 provides all the information the NI needs in order to prepare flits for transmission. Messages entering the core use a similar interface, except the I/O directions are reversed as shown in table 5 and the additional error signal must be included. In this design if a flit arrives at an incorrect node the NI asserts the error flag when it injects the message into the receiving core and it is the core's responsibility to prepare an appropriate response.

Figure 36:
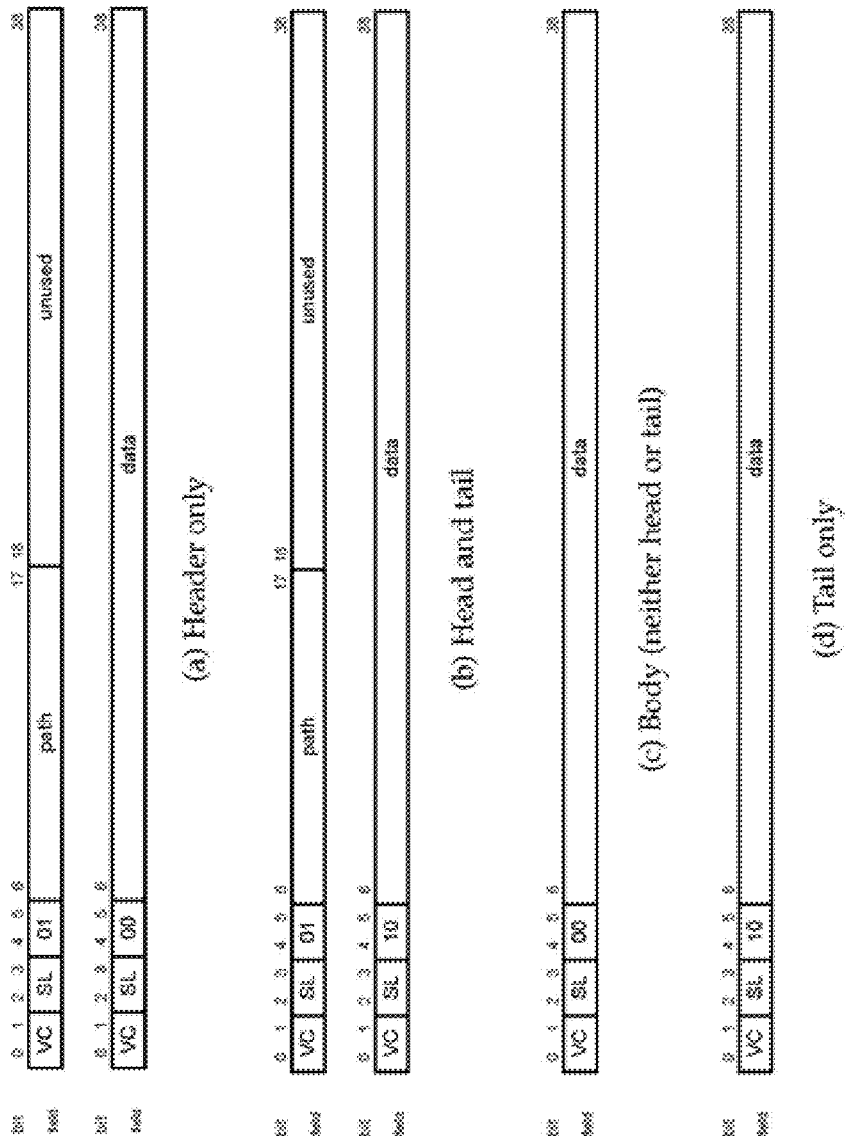
FIG. 36 shows an example of various possible flit formats in which bits four and five are the flit type (FT).

Data entering the NI from the core can be either a short message or a long message divided into multiple parts (table 6), each of which enter the NI individually, one following the next. This leads to four different assertion cases for the NI inputs start and end. FIG. 36 shows the four different injection cases and the flit outcomes at the NI output. The header message splits into two flits in order to reduce the data width requirement of the network routers. Since the header message splits into two flits the NI must take care of the transmission of the two flits. This has been addressed exclusively in the asynchronous domain since we anticipate that interface being faster than attempting the dual transmission synchronously.

TABLE 5

Message based core receive interface.

| Name | I/O | Width | Description |
| --- | --- | --- | --- |
| Valid | I | 1 | Indicates all other outputs are valid |
| Start | I | 1 | Indicates first word of transfer |
| End | I | 1 | Indicates last word of transfer |
| Error | I | 1 | Indicates destination is not a match for the current node |
| Data | I | 32 | Message data |
| Ready | O | 1 | Applies backpressure, preventing NI from advancing data/ctrl signals until it is asserted |

TABLE 6

Format of data stream

| Word | Description |
| --- | --- |
| 0 | Contains Logical ID of destination, used in outgoing transmissions as the input to the routing table. Contains the command, which is used to determine the appropriate SL and VC. |
| 1 | Message word 0 |
| 2 | Message word 1 |
| ... | ... |
| N | Message word N |

In the following section we provide the design of two network interfaces: one which uses a fast four-phase flip-flop synchronizer and one that uses a gradual synchronizer. These have been chosen based on their MTBF, latency and throughput performance previously described herein.

Fast Four-Phase Network Interface

Figure 37:
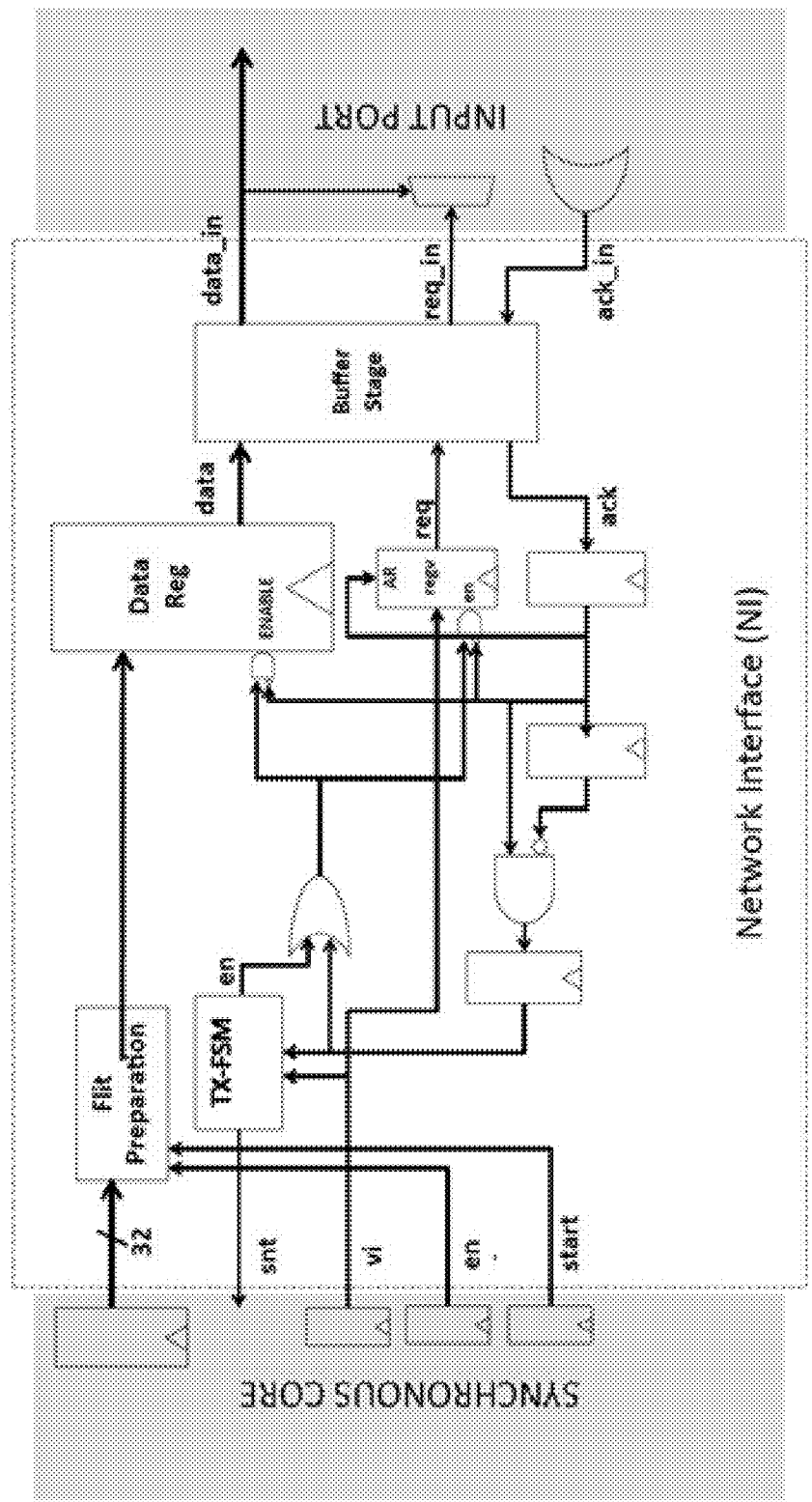
FIG. 37 shows an example of an outgoing message network interface using a fast four-phase flip-flop synchronizer.

FIG. 37 shows the structure of the send portion of a network interface that uses a fast four-phase flip-flop synchronizer. Outgoing data is injected into the NI, the interface then determines the correct service level (SL), virtual channel (VC), flit type (FT) and the routing path of the message. Flit preparation can occur during this clock cycle because the signal that needs synchronization is the acknowledge, not the request. At the beginning of the next clock cycle req is set high and the data is locked in DataReg and snt is set high indicating to the core that it can inject new data. The earliest point it would do this would be the next cycle (two clock cycles after the first injection). Req high initiates a handshake with the buffer stage, the ack transitions must be synchronized before interacting with synchronous signals. An asynchronous reset on regv eliminates an extra clock cycle in the handshake. The buffer stage forwards body flits, tail flits and the first flit of a header message flit pair directly to the network. At the same time if the data contains a header flit pair the second flit is saved into a buffer. If the second flit buffer becomes full then control of the NI-network handshake is transferred to the second flit buffer after the first flit has been transferred.

Figure 38:
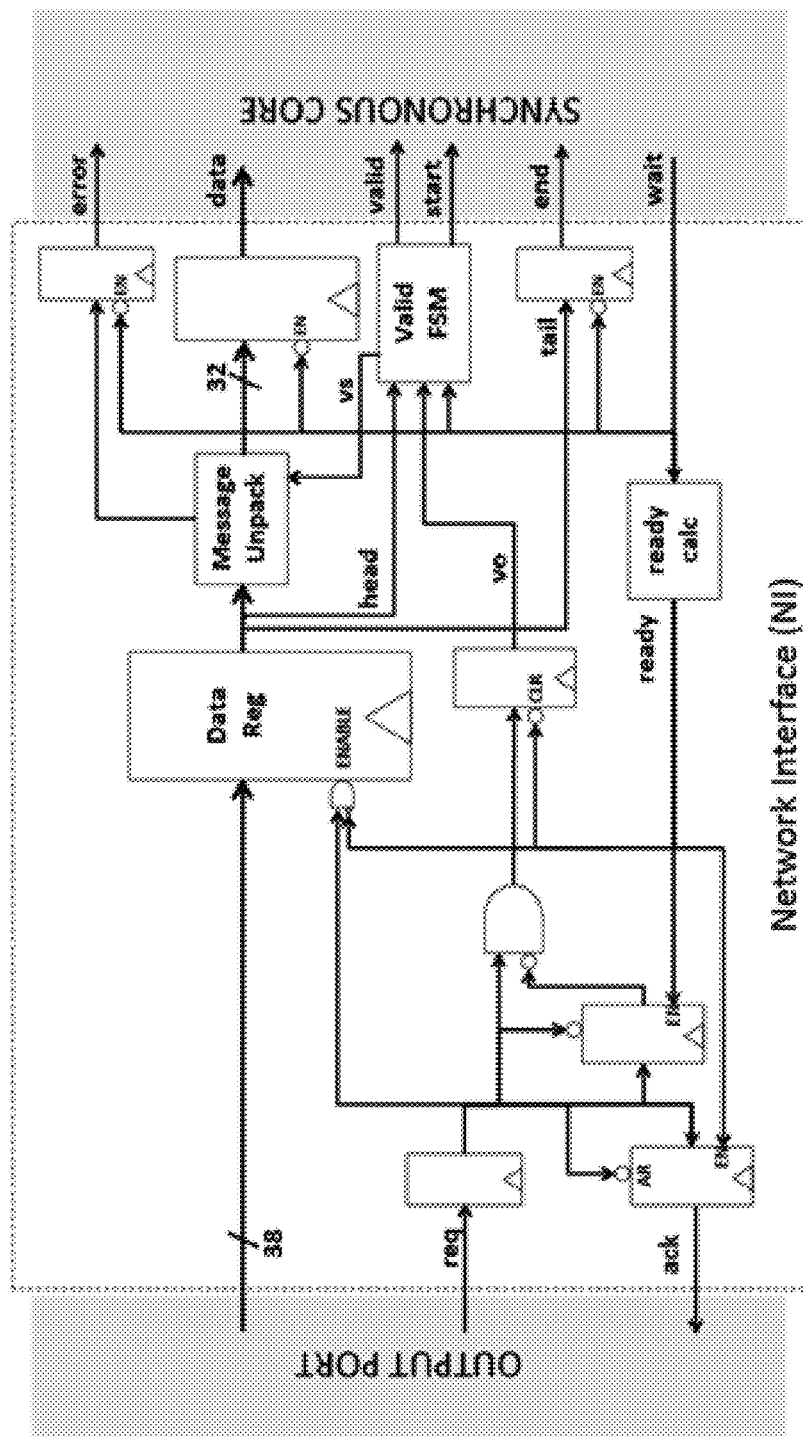
FIG. 38 shows an example of an incoming message network interface using a fast four-phase flip-flop synchronizer.

The receive portion of the fast four-phase (F4PH) NI, FIG. 38, requires the request be synchronized to the receiving clock before unpacking the incoming flits into the message format required by the core. This is because vo must be stable for processing to occur. If an attempt is made to process R2 with the incoming data, we would introduce the possibility of metastability at the input to the data register. A flit that enters this interface passes through the fast-four phase synchronizer and then once synchronized, flit processing begins. If the flit is a header flit the FSM will squash the flit without forwarding it to the core. (Alternatively, the flit data could be forwarded to the core in order to save the routing path in case of an error, but it would still not be marked as the start of the message.) The next flit it receives becomes the header flit and the destination is checked against the current node to ensure the message was routed to the correct place. If not, the NI flags an error as it passes the header to the core. In order to keep the NI small, we assume the core handles any errors. Since we want to evaluate the effect of the synchronizers on latency through the NI we assume that the core is always ready for new data. This simplifies the FSM and allows evaluation at faster clock speeds. However, the NI could easily be changed to accommodate a core stall. The fast four-phase synchronizer only pulses the vo signal for one clock cycle so if the core were not ready to receive incoming data the Valid FSM would need to both keep track of flit reconstruction and keep track of an unsent flit in the pipe.

Gradual Synchronizer Network Interface

Figure 39:
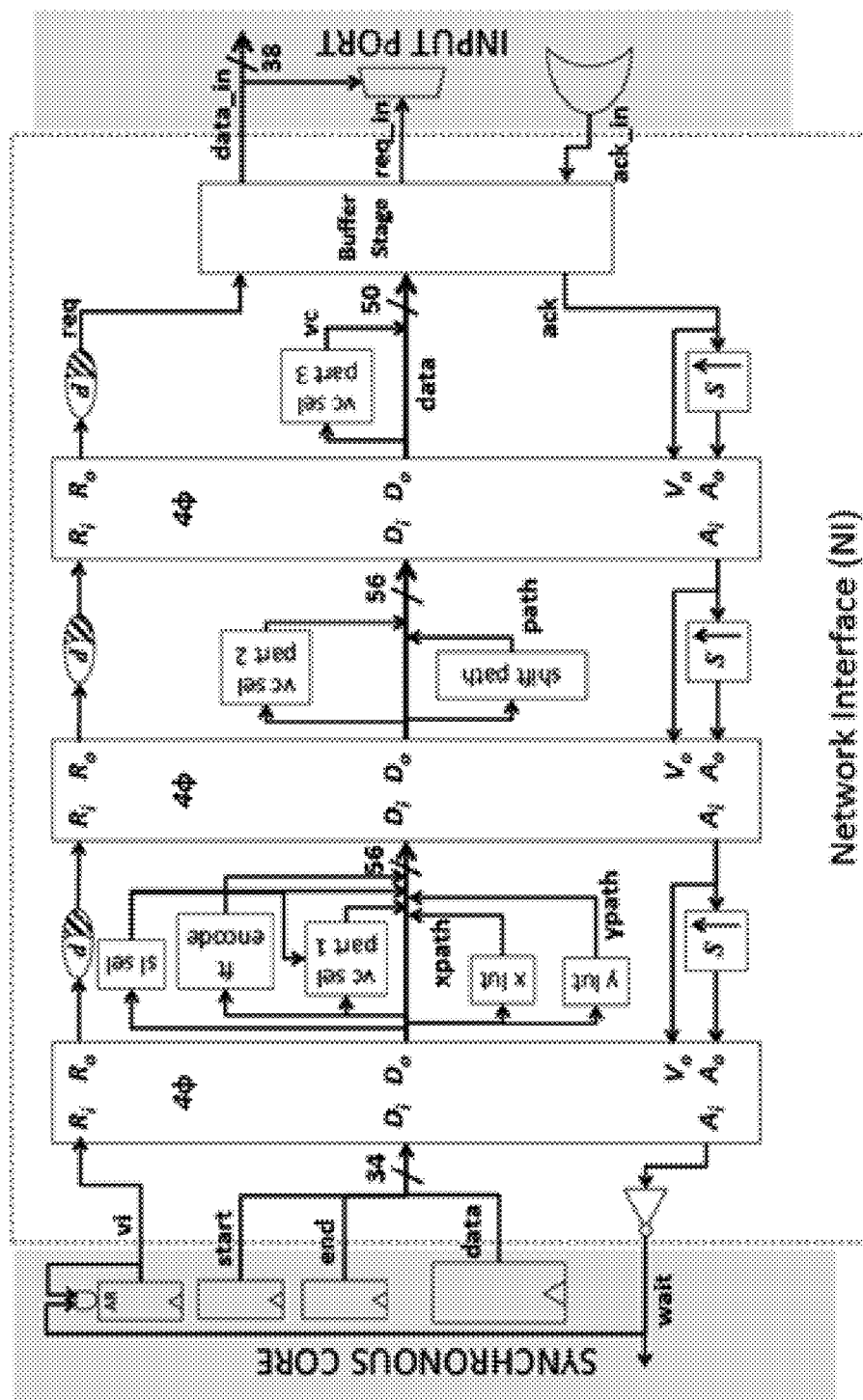
FIG. 39 shows an example of an outgoing message network interface using a gradual synchronizer.

A NI send interface implemented with a 3-stage gradual synchronizer (GS) is shown in FIG. 39. The Synchronous core must simulate four-phase handshaking. In order to prevent loss of data the synchronous side needs knowledge of the state of vi, if vi is high the core will not advance the data on the interface. The down going transition of $A_i$ is used to asynchronously clear vi, at which point the FIFO can complete the left side handshake by raising $A_i$. The gradual synchronizer NI is then ready for the core to inject a new request in the next cycle.

Flit preparation is split into the multiple stages of the gradual synchronizer. Flit type encoding takes place in the first stage in parallel with service level decoding from the command field of a header flit. Once the service level and flit type are known this stage also generates tokens used by the virtual channel selection and update computation in the second stage. Since QNOC uses XY routing, the X and Y routing paths are retrieved separately from two small LUTs in the first stage. The following stage shifts the Y path into the correct position. The final stage chooses the correct virtual channel field based on the service level. The buffer stage handles messages in the same manner as in the F4PH NI.

Figure 40:
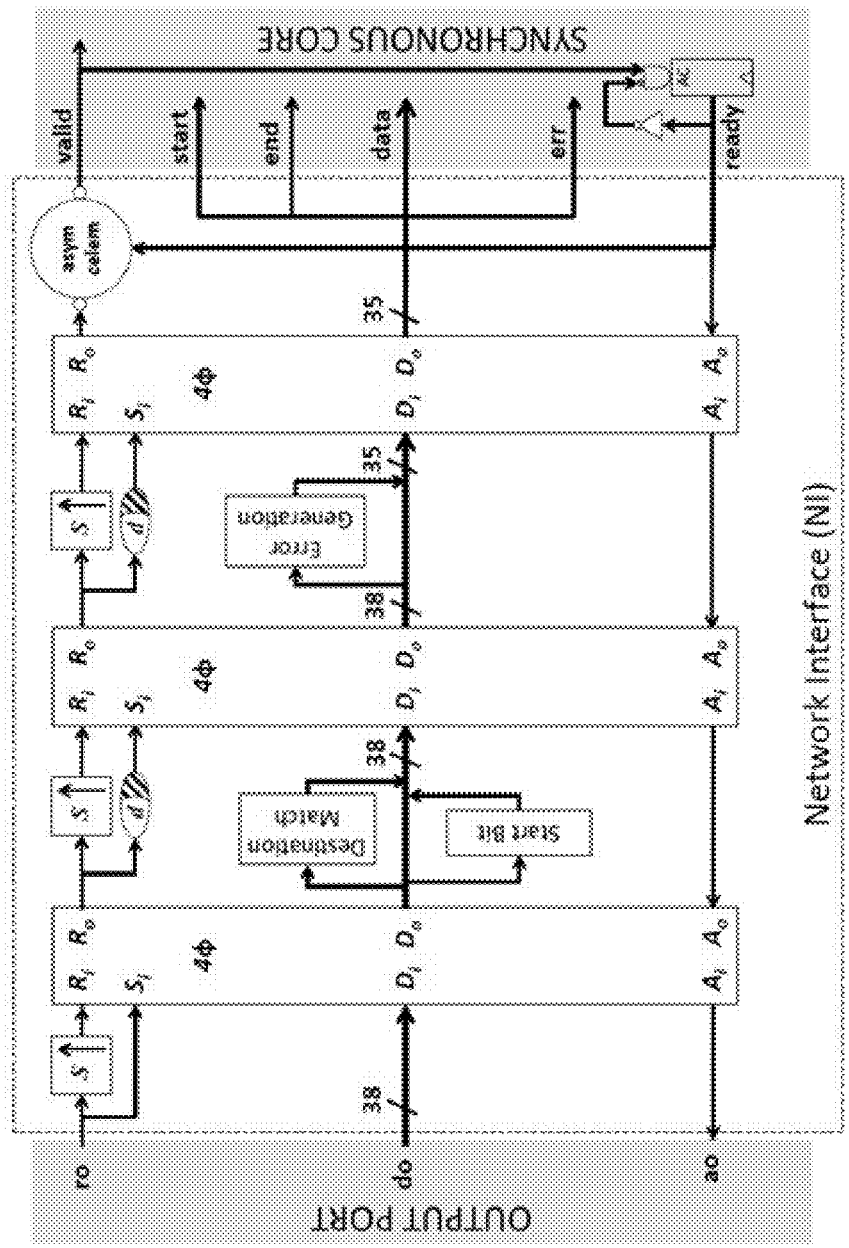
FIG. 40 shows an example of a n incoming message network interface using a gradual synchronizer.

The GS NI receive interface is implemented with three stages as shown in FIG. 40. Note that since there is so little computation involved in unpacking the message the first stage does not contain computation. The second stage checks each bit in the destination bit field of the message against the bits in the current node ID. Information needed exclusively for the routers in the NoC (sl and vc) is stripped off of the incoming flit and the message start and end bits get reconstructed. The third stage then checks that each destination bit was a match and flags whether there was a routing error.

The synchronous core consumes one message per clock cycle. If the core is ready when $R_o$ in the last stage rises, valid will rise as well. Once valid rises ready gets pulled low and by default so does $A_o$, allowing the last FIFO stage to continue the handshake with the core. When $R_o$ falls, valid is kept high waiting for the clock edge. When the clock edge arrives the message data will be locked in the core and ready rises, allowing valid to fall and the last FIFO stage to service the next flit.

Performance

The network interfaces described in the previous sections have been simulated with HSIM using 90 nm technology files. The simulations focus on the function and performance of the network interface only.

Core to Network

The output portion of the NI assumes that the network is always ready to accept new flits, preventing throttling of the NI by network stalls. Ideally, we'd also like comparable MTBFs for the two methods. We use the MTBF of the F4PH synchronizer as our minimum allowed MTBF and ensure the MTBF of the GS NI is the same as or better. We simulate the NI at 400, 600 and 800 MHz since selection of the core clock frequency is unlikely to be chosen according to NI performance.

To calculate the F4PH MTBFs we also require the average frequency with which the ack input to the first flip-flop of the synchronizer changes. This is difficult to ascertain since we don't know how often the core will try to send messages. It is wise to ensure we design for the worst case (ie. the highest frequency of change). Since an acknowledge can only occur after a request has occurred we know that highest average rate of change will be when the core is constantly trying to transmit. For the F4PH MTBF we must include both upgoing and down-going transitions in the rate.

The average frequency of the ack entering the GS NI will be different from the F4PH synchronizer. In this case only the rising-edge transition is synchronized. Just as in the F4PH NI, a rising edge can also only be observed after a request is generated. We should design the GS NI to handle the case where a send is initiated by the core every cycle. It is impossible to know what the average frequency would be without implementing and testing the NI. Even though the network side may be fast, we expect an average around the same frequency as the core clock because a long wait will occur before the next request arrives.

Table 7 shows results obtained by simulating the NIs described above. The Network frequency is the average frequency of change of the acknowledge signal, this helps determine the MTBF, and is affected by the synchronization method chosen. The latency shown is the latency from when the message packet is injected into the NI to when the flit(s) appears at the NI output. Throughput is shown measured in packets per clock cycle.

TABLE 7

Outgoing Message NI Simulation Results.

| | TX | | | Latency (ns) | | | | Throughput | |
|---|---|---|---|---|---|---|---|---|---|
| Sync | Clock | Network | MTBF | Header | | Body or Tail | | (ppc) | |
| Type | (MHz) | (MHz) | (years) | min | max | min | max | min | max |
| Fast | 400 | 272 | $1.84 \times 10^{40}$ | 5.897 | 8.454 | 2.473 | 5.027 | 0.33 | |
| 4-Phase | 600 | 397 | $4.12 \times 10^{19}$ | 4.221 | 5.906 | 1.632 | 3.313 | 0.33 | |
| | 800 | 531 | $2.05 \times 10^{9}$ | 4.732 | 8.475 | 2.525 | 6.277 | 0.33 | |
| Gradual | 400 | 400 | $2.04 \times 10^{51}$ | 2.625 | 2.656 | 1.549 | 1.586 | 1 | |
| | 600 | 600 | $6.20 \times 10^{20}$ | 2.839 | 6.654 | 1.759 | 2.254 | 0.78 | 1 |
| | 800 | 800 | $2.47 \times 10^{12}$ | 2.997 | 7.971 | 1.973 | 4.836 | 0.63 | 0.78 |

Looking at the F4PH results we can see the effect design changes can have on results. For instance, speeding up the clock to 800 MHz causes relocation of some flit preparation into an additional stage in the F4PH NI before synchronization. This leads to increased latency because the throughput bottleneck of this method can cause a packet to get stalled in the first stage of the NI if another packet is already in the synchronizer stage. At 600 MHz all flit preparation logic fits in one clock cycle, this frequency prevents the need for extra synchronous pipeline stages and also prevents wasting any portion of the clock cycle because there is no work left to be done even in the worst case. At 400 MHz there is time in the computation stage of the F4PH NI where no computation is left, but the F4PH NI cannot move the flit forward until the end of the clock cycle.

As expected the throughput of the fast 4-phase synchronizer is slow, permitting one message every three cycles. In contrast the Gradual Synchronizer is capable of sustaining one message per cycle until the network side becomes slower than the clock. At 600 MHz transmitting long messages allows continued high throughput, however if the core is transmitting a lot of headers the network side becomes slower as it transmits two flits for every one header packet. This lower throughput is still higher than the F4PH NI in the same situation. Boosting the clock speed to 800 MHz causes the need for an extra stage to be added to the Gradual Synchronizer in order to meet the required MTBF. This increases latency but is helpful too because the extra stage gets the portion of computation that no longer fits in the first three stages.

Network traffic can vary by application, since a core will not always be trying to inject messages into the NI conditions will vary greatly over time. However, we can conclude which synchronizer is better for the send NI by characterizing network traffic into two categories. If the core transmits one message packet followed by nothing for at least three cycles then the F4PH NI is better. If the core transmits one message packet followed by another less than three cycles later, the Gradual Synchronizer wins because it will transmit the multiple packets in a lower time even though the latency of one packet might be increased.

Network to Core

In the receive case we observe the worst and best case forward latency of a flit from entry into the NI from the network to validity at the NI output to the core. Although the first flit of a short message (which consists of two flits) does not contain any portion of the message, we save and pass along the routing path in case an error is detected. In this case we report the throughput in flits per clock cycle. We will assume that the receiving end is always ready so that the NI and hence the synchronizers are not stalled by a busy core. They can operate at their best capability within the limits of the core clock speed.

TABLE 8

Incoming Message NI Simulation Results.

| Sync Type | TX Clock (MHz) | Network (MHz) | MTBF (years) | Latency (ns) min | Latency (ns) max | Throughput (fpc) |
|---|---|---|---|---|---|---|
| Fast | 400 | 271 | $1.14 \times 10^{40}$ | 5.12 | 7.01 | 0.33 |
| 4-Phase | 600 | 395 | $3.93 \times 10^{19}$ | 4.51 | 5.096 | 0.33 |
|  | 800 | 527 | $1.95 \times 10^{9}$ | 3.26 | 3.64 | 0.33 |
| Gradual | 400 | 400 | $3.98 \times 10^{51}$ | 2.56 | 6.53 | 1 |
|  | 600 | 600 | $1.22 \times 10^{21}$ | 2.54 | 3.31 | 1 |
|  | 800 | 800 | $6.02 \times 10^{12}$ | 2.65 | 3.06 | 1 |

Table 8 shows the results of simulating the receive interfaces described above. Recall that computation needed to unpack flits into messages is much less complex than the packaging of messages, it fits into one clock cycle even at 800 MHz, therefore the latency of the Fast 4-phase NI scales as expected with frequency increases. The Gradual Synchronizer NI uses a 3-stage design for 400 MHz and 600 MHz, adding a $4^{th}$ stage for 800 MHz to meet our requirement that the MTBF of the GS NI be the same as or higher than the F4PH NI. This results in little decrease in the latency of the GS NI when increasing the clock speed from 600 MHz to 800 MHz. Minimum latencies for the GS NI are generally lower, however for both NI types these latencies are seen at the first message when the NI is empty and waiting for a new flit. The common case is closer to the maximum latencies. The GS NI can push a flit through faster primarily because of the parallel computation/synchronization.

In the receive case the throughput is consistent, the Fast 4-Phase NI can handle one flit every three cycles and the GS NI one every cycle. We know there are at least two flits for every incoming message, therefore throughput capability causes the GS NI to beat the F4PH NI in full message latency in all cases.

Dynamic Variations and Synchronizers

Dynamic Variation creates an interesting problem for synchronizers. Chip designs sometimes include mechanisms to dynamically vary operating conditions such as power or clock frequency in order to help mitigate problems or save power under certain conditions. If the power is the attribute being adjusted the synchronizer is no different than other circuits on the chip it much function without error and this includes ensuring that the MTBF remains acceptable under all conditions. It does not change much for use of the gradual synchronizer except that care must be taken to ensure that all the requirements are met in all operating situations, and that the desired MTBF is maintained. However, if the design requires ability to operate at different clock frequencies things become a little more interesting for synchronizers.

The thing that gets interesting is during a change. If you slow the clock down can you just leave the data in the pipe? If you speed up the clock do you need to drain the pipe first and then use a flip-flop synchronizer for the duration?

CONCLUSION

This patent document discloses new techniques for synchronization—that is, synchronization in parallel with computation—and shows the potential benefit of this possibility.

We prove theoretically that synchronization can indeed take place while other useful work continues. We have mathematically established conditions under which an asynchronous (handshaking) FIFO can be used to pipeline computation and synchronization at the same time; we name this concept gradual synchronization. Assuming circuit components can meet the derived requirements, we have proven that the gradual synchronizer will function correctly, reduce probability of failure, maintain a throughput of one item per synchronous clock cycle, and limit latency. Requirements have been established for both two-phase and four-phase handshaking protocols, both transmitting and receiving data.

Once we had established the theoretical possibility of such a synchronizer, we implemented multiple versions of the gradual synchronizer with the intention of comparing performance with several other synchronizers. We showed the necessity of including a mean time before failure (MTBF) comparison in any presented results and factored the MTBF into the design of several synchronizer scenarios.

Latency, throughput, area and power results are presented for several classic synchronizers in addition to the gradual synchronizer, under various operating conditions. Through these results we show that the gradual synchronizer can maintain throughput in practice and established a baseline for the potential latency reduction of the method. Potential latency reduction is particularly evident in cases where the receiving end is much slower than the sending side. The gradual synchronizer also keeps worst case latency down in the event of a metastability. These results all confirm that circuits can be designed to meet the requirements necessary to make use of gradual synchronization.

Since, the method would only be useful if available computation could be gracefully divided into the synchronizer stages we suggested some possible design types that could make use of the gradual synchronizer. Then we took one of the high level examples (the network interface) and designed and implemented an NI capable of interfacing with an existing NoC design. Simulations validate that viable computation can be found to merge with synchronization, and that the result is increased performance.

In some embodiments, a device, e.g., an integrated circuit or a chip, may include one or more stages, arranged as a pipeline, e.g., as described with respect to FIG. 6 to FIG. 9. The device includes a first clock domain comprising circuits clocked by a first clock, a second clock domain comprising circuits clocked by a second clock, a first asynchronous First-In-First-Out (FIFO) block operating without a master clock and connected to the first clock domain to receive data from the first clock domain, a second asynchronous FIFO block operating without a master clock and connected to the second clock domain to send data to the second clock domain, a synchronizer placed between a request output of the first asynchronous FIFO block and a request input of the second asynchronous FIFO block, wherein the synchronizer is to synchronize signals output from the first clock domain to the second clock domain, a fixed delay placed between the request output of the first asynchronous FIFO block and the second asynchronous FIFO block, and a data computation block placed between a data output of the first asynchronous FIFO block and a data input of the second asynchronous FIFO block.

In some embodiments, e.g., as depicted in FIG. 9 or FIG. 13, a device for gradual clock synchronization may include a cascade of multiple FIFO blocks that may be coupleable between a first clock domain comprising circuits clocked by a first clock and a second clock domain comprising circuits clocked by a second clock. Two adjacent FIFO blocks in the cascade include data storage FIFOs that are connected in parallel to each other via a fixed delay circuit, a data computation block and a synchronizer. The data computations through the data computation block occur in parallel to clock synchronization through the synchronizer. The fixed delay circuit delays a signal passing through by a time that is equal to a worst case delay through the data computation block. In some embodiments, the FIFO stage locks data values computed by the data computational block only after ascertaining stability of the data values. The cascade of FIFO blocks may be used to gradually synchronize clocks between a first clock domain and a second clock domain by carrying data through the multiple cascaded stages in which data computations are performed in parallel with synchronization. For example, FIG. 9 and related description describes an embodiment in which gradual synchronization is performed from an asynchronous domain to a synchronous domain. In FIG. 13, an embodiment for gradual synchronization from a synchronous domain to an asynchronous domain is described. Furthermore, each such synchronization cascade may be operated using a two-phase or a four-phase clock, as described herein.

Figure 47:
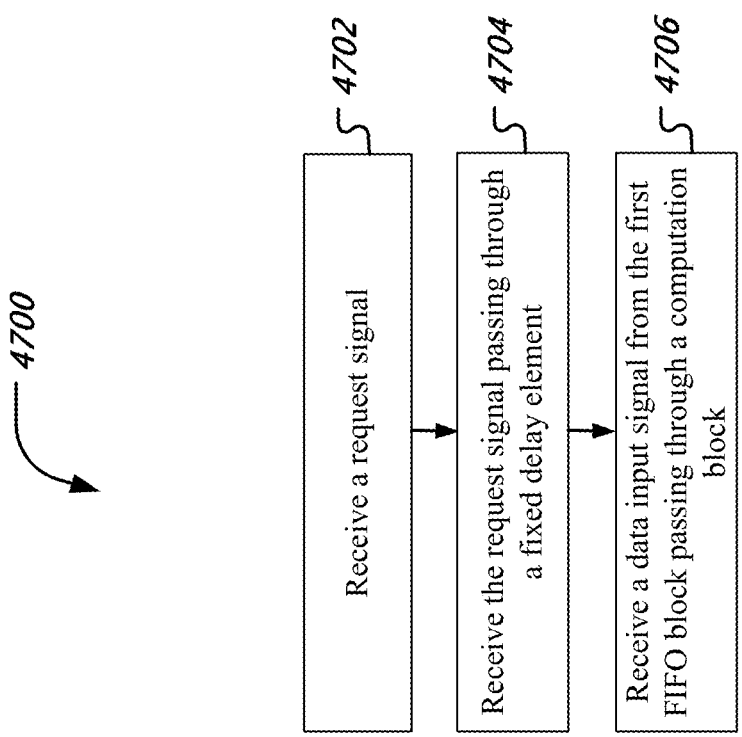
FIG. 47 shows a flowchart of an example method performed by a first asynchronous FIFO block of a device.

FIG. 47 shows a flowchart of a method 4700 performed by a first asynchronous FIFO block of a device. The method may be performed, e.g., by an integrated circuit. The method 4700 includes, at 4702, receiving a request signal passing through a synchronizer block from a second asynchronous FIFO block connected to a second clock domain comprising circuits clocked by a second clock, wherein the first asynchronous FIFO block is connected to a first clock domain comprising circuits clocked by a first clock, the second asynchronous FIFO block receives data from the second clock domain, the first asynchronous FIFO block sends data to the first clock domain, and the synchronizer is to synchronize signals output from the second clock domain to the first clock domain. The method 4700 includes, at 4704, receiving the request signal passing through a fixed delay element. The method 4700 includes, at 4706, receiving a data input signal from the first asynchronous FIFO block passing through a computation block placed between the first asynchronous FIFO block and the asynchronous FIFO block. In some embodiments, the method includes acknowledging the request signal to the first asynchronous FIFO block and issuing a second request to a next stage of the device. In some embodiments, the method 4700 further includes processing the data input signal to change a value of the data input signal. In some embodiments, the method 4700 further includes making a determination, at a clock edge, whether the value of the data input signal after change is stable. Using the method 4700, the integrated circuit, e.g., may perform synchronization and computations during a same time interval. Thus, synchronization of signals is performed without any additional computational delays through the pipeline.

Correctness Proofs

A.1 Two-Phase Synchronous to Asynchronous Gradual Synchronizer

Figure 41:
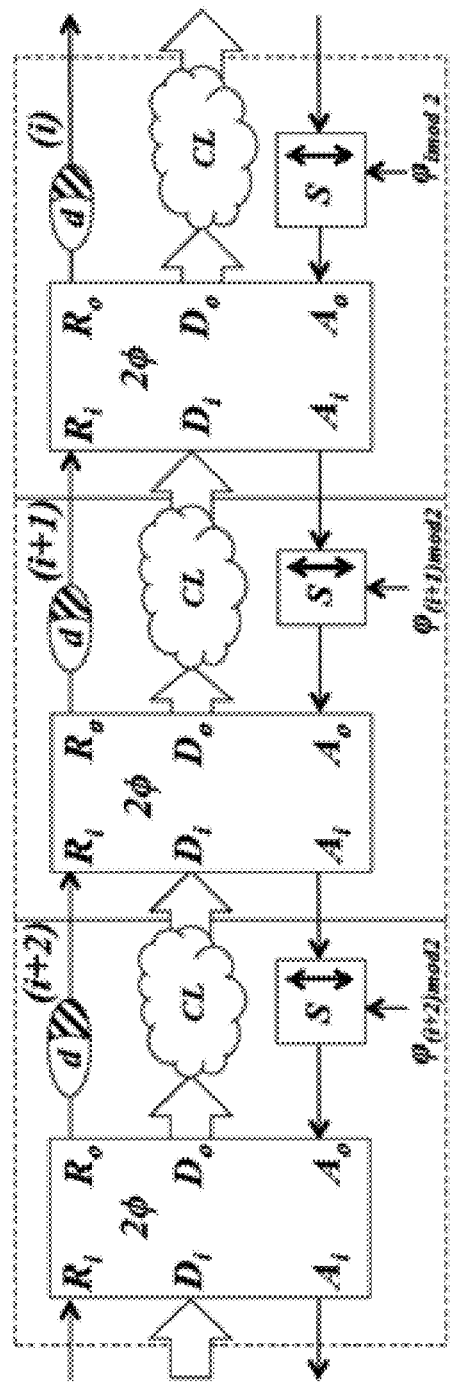
FIG. 41 shows an example of a segment of the 2-phase synchronous-to-asynchronous gradual synchronizer.

This section presents the correctness proof for the two-phase synchronous-to-asynchronous gradual synchronizer and the requirements for correct operation are derived as well. A segment of a two-phase synchronous-to-asynchronous gradual synchronizer is shown in FIG. 41. Recall from equation 3.40 that the handshaking expansion of this FIFO is:

$$*[[R_i];A_i,R_o;[A_o]].$$

The $j^{th}$ event on $A_i^{(i)}$ can only occur at time:

$$t_{A_i(i)}^{(j)} = t_{R_i(i)}^{(j)} + \tau_{R_i A_i}, \quad (A.1)$$

$$t_{A_i(i)}^{(j)} = t_{A_o(i)}^{(j-1)} + \tau_{A_o A_i}. \quad (A.2)$$

This event can cause metastable behavior at the $(i+1)^{st}$ synchronizer if it occurs coincidentally with the falling clock edge of $\varphi_{(i+1) \bmod 2}$. The probability of metastability failure at the $(i+1)^{st}$ synchronizer is $$P_f^{(i+1)} \leq P_f^{(i+1)}(R_i) + P_f^{(i+1)}(A_o). \quad (A.3)$$

The second part of the sum in equation A.3 is the probability that an event on $A_o$ takes place $\tau_{A_o A_i}$ before the clock edge. If the delay through the FIFO when a transition on $A_i$ was waiting on a transition of the signal $A_o$ is:

$$\tau_{A_o A_i} < T/2 - \tau_S, \quad (A.4)$$

then for a metastability to occur at the $(i+1)^{st}$ synchronizer, the $i^{th}$ synchronizer must have entered the metastable state half a clock period beforehand and remained in the metastable state for exactly:

$$t_m = T/2 - \tau_S - \tau_{A_o A_i}. \quad (A.5)$$

Thus, the probability that there is a metastability failure at the $(i+1)^{st}$ synchronizer due to $A_o$ is:

$$P_f^{(i+1)}(A_o) \leq P_f^{(i)} e^{-\frac{T/2 - \tau_S - \tau_{A_o A_i}}{\tau_0}}. \quad (A.6)$$

If we could show that $P_f^{(i+1)}(R_i) = 0$ then:

$$P_f^{(k)} \leq P_f^{(0)} e^{-\frac{k(T/2 - T_{oh})}{\tau_0}}, \quad (A.7)$$

where, $$T_{oh} = \tau_S + \tau_{A_o A_i}. \quad (A.8)$$

As in the asynchronous to synchronous case, if a metastability is caused by a transition on $R_i^{(i)}$ and that metastability is SEM, it does not affect the correct operation of the synchronizer. Therefore even if the behavior of $R_i^{(i)}$ changes due to $\tau_d$, as long as the metastability caused is still SEM there is no problem. If the $j^{th}$ event on $A_i^{(i)}$ is caused by the $j^{th}$ event on $R_i^{(i)}$:

$$t_{R_o(i+1)}^{(j-1)} + \tau_d = t_{R_i(i)}^{(j)} = t_{A_i(i)}^{(j)} - \tau_{R_i A_i}. \quad (A.9)$$

If a metastability at the $(i+1)^{st}$ synchronizer is a result of the $(j)^{th}$ transition on $R_i^{(i)}$, then as a result, metastability can occur at the $(i+2)^{nd}$ synchronizer. The metastability at the $(i+2)^{nd}$ synchronizer will always be SEM if:

$$t_{A_i(i)}^{(j)} - T/2 < t_{A_i(i+1)}^{(j)} < t_{A_i(i)}^{(j)} + T/2. \quad (A.10)$$

Which leads to the requirement:

$$\tau_{R_i A_i} + \tau_d < T/2 \quad (A.11)$$

Next the SEM can only cause SEM argument needs to be reevaluated for any changes due to the addition of $\tau_d$. Suppose the $j^{th}$ event on $A_i^{(i)}$ is SEM. By definition, this event must have occurred at time:

$$t_{A_i(i)}^{(j)} = t_{\varphi(i+1) \bmod 2 \downarrow}^{(k)}, \quad (A.12)$$

and the previous event must have occurred within the last clock cycle, $$t_{\varphi(i+1) mod\ 2\downarrow}^{(k-1)} < t_{A_i(i)}^{(j-1)} < t_{\varphi(i+1) mod\ 2\downarrow}^{(k)} \quad (A.13)$$

therefore the $(j-1)^{st}$ event on $A_o^{(i+1)}$:

$$t_{A_i}^{(j)} - T_0 + \tau_S \le t_{A_o}^{(i+1)(j-1)} < t_{A_i}^{(j)} + \tau_S \quad (A.14)$$

$$t_{A_i}^{(i+1)(j-1)} \ge t_{A_i}^{(j)} - T_0 + \tau_S + \tau_{A_o A_i}, \quad (A.15)$$

which implies that the arrival of the $(j-1)^{st}$ event at the $(i+2)^{nd}$ synchronizer must be $$t_{A_i}^{(i+1)(j-1)} > t_{A_i}^{(j)} - T/2. \quad (A.16)$$

Since, for this FIFO implementation the timing of $R_o$ and $A_i$ are approximately equal $$t_{A_i}^{(i+1)(j-1)} \approx t_{R_o}^{(i+1)(j-1)} \le t_{A_i}^{(j)} - \tau_{R_i A_i} - \tau_d, \quad (A.17)$$

and according the previously established requirement $\tau_{R_i A_i} - \tau_d < T/2$ and equation A.16:

$$t_{A_i}^{(j)} - T/2 < t_{A_i}^{(i+1)(j-1)} < t_{A_i}^{(j)} + T/2 \quad (A.18)$$

Figure 42:
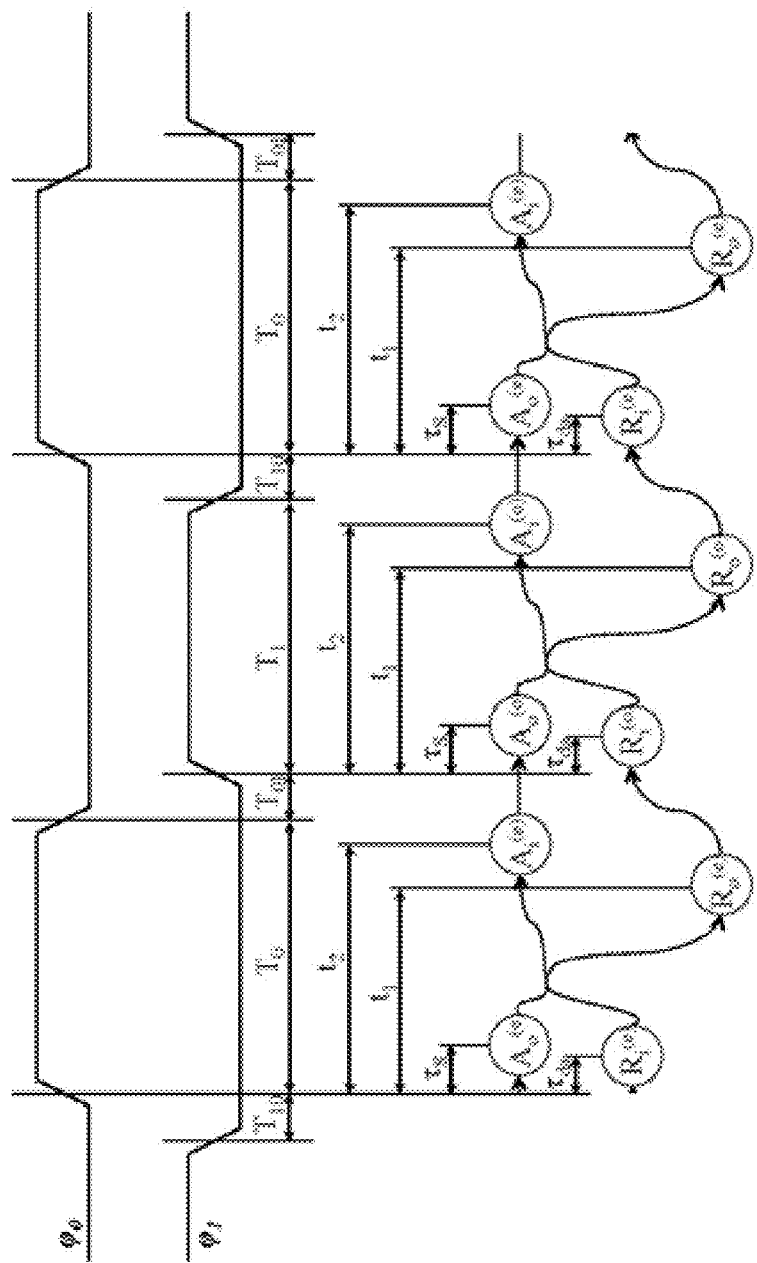
FIG. 42 shows an example of a steady State Operation of a 2-phase synchronous-to-asynchronous gradual synchronizer.

Meaning, in the presence of SEM at the $i^{th}$ synchronizer, a resulting metastable event at the $(i+1)^{st}$ synchronizer must also be SEM (See FIG. 42).

Throughput

The synchronous environment on the sending end of the gradual synchronizer is capable of sending one request and accepting one acknowledge per clock cycle. The gradual synchronizer stages must be able to operate at the same throughput level. FIG. 42 shows the steady state of a 2-phase synchronous-to-asynchronous gradual synchronizer with an infinite number of stages. All events on $A_o$ entering even-numbered FIFO blocks arrive $\tau_s$ after the rising edge of $\varphi_0$. All events on $A_o$ entering odd-numbered FIFO blocks arrive $\tau_s$ after the rising edge of $\varphi_1$. All events on $R_i$ entering even-numbered FIFO blocks arrive $\tau_{da}$ after the rising edge of $\varphi_0$ and all events on $R_i$ entering odd-numbered FIFO blocks arrive $\tau_{da}$ after the rising edge of $\varphi_1$. $\tau_{da}$ is the portion of the computational delay that occurs after the clock edge. Note that it can be equal to zero. The $V_o$ input is left off the diagram since it only contributes to shortening $\tau_{A_o A_i}$ and $\tau_{A_o R_o}$. In the steady state no synchronizer assumes a metastable state, and:

$$t1 = \max(\tau_S + {}_{A_o R_o}, \tau_{da} + \tau_{R_i R_o},)$$

$$t2 = \max(\tau_S + {}_{A_o A_i}, \tau_{da} + \tau_{R_i A_i}) \quad (A.19)$$

Since $$\tau_{da} = \tau_d - \tau_{db} \quad (A.20)$$

and $$\tau_{db} = \frac{T}{2} - t1, \quad (A.21)$$

$$t1 = \max(\tau_S + \tau_{A_o R_o}, \tau_d - (T/2 - t1) + \tau_{R_i R_o},) \quad (A.22)$$

$$t2 = \max(\tau_S + \tau_{A_o A_i}, \tau_d - (T/2 - t1) + \tau_{R_i A_i})$$

For $\tau_d + \tau_{R_i R_o} < T/2$, $$t1 = \tau_S + \tau_{A_o R_o}$$

$$t2 = \max(\tau_S + \tau_{A_o A_i}, \tau_d - T/2 + \tau_S + \tau_{A_o R_o} + \tau_{R_i A_i}) \quad (A.23)$$

For the maximum throughput to be maintained t2 must be less than half a clock period, so:

$$\tau_S + \tau_{A_o A_i} < T/2$$

$$\tau_S + \tau_d + \tau_{A_o R_o} + \tau_{R_i A_i} < T \quad (A.24)$$

The synchronous end has an interface which does not include computation, therefore the requirement at the synchronous end of a finite-length pipeline remains:

$$\tau_{AR} + \tau_{R_i A_i} < T. \quad (A.25)$$

If computation is included on the interface then:

$$\tau_{AR} + \tau_d + \tau_{R_i A_i} < T \quad (A.26)$$

$\tau_{AR}$ is the delay from the time when one transfer is acknowledged until the next transfer is requested. The asynchronous end requirement must also include the computational delay effect:

$$\tau_S + \tau_{A_o R_o} + \tau_{RA} + \tau_d < T, \quad (A.27)$$

if computation is left out of the interface than $\tau_d$ in the above equation equals zero.

Four-Phase Asynchronous to Synchronous Gradual Synchronizer

The four-phase asynchronous to synchronous gradual synchronizer is similar to the two-phase case. The FIFO element handshake order below:

$$*[[R_i \wedge S_i]; A_i \downarrow; [\overline{R_i}]; A_i \uparrow, R_o \uparrow; [\overline{A_o}]; R_o \downarrow; [A_o]]. \quad (A.28)$$

makes it easier to see the relationship as the full receive handshake takes place before the send handshake begins, but other four-phase FIFO reshufflings are suitable as well. The four-phase FIFO element produces signals with timings represented by the following equations:

$$t_{A_i \downarrow}^{(j)} = \begin{cases} \max(t_{R_i \uparrow}^{(0)} + \tau_{R_i \uparrow A_i \downarrow}, t_{S_i \uparrow}^{(0)} + \tau_{S_i \uparrow A_i \downarrow}) & j = 0 \\ \max(t_{R_i \uparrow}^{(j)} + \tau_{R_i \uparrow A_S \downarrow}, t_{S_i \uparrow}^{(j)} + \tau_{S_i \uparrow A_i \downarrow}, t_{A_o \uparrow}^{(j-1)} + \tau_{A_o \uparrow A_i \downarrow}), & j > 0 \end{cases} \quad (A.29)$$

$$t_{R_o \uparrow}^{(j)} = \begin{cases} \max(t_{R_i \downarrow}^{(0)} + \tau_{R_i \downarrow R_o \uparrow}, t_{S_i \downarrow}^{(0)} + \tau_{S_i \downarrow R_o \uparrow}) & j = 0 \\ \max(t_{R_i \downarrow}^{(j)} + \tau_{R_i \downarrow R_o \uparrow}, t_{S_i \downarrow}^{(j)} + \tau_{S_i \downarrow R_o \uparrow}), & j > 0 \end{cases} \quad (A.30)$$

$$t_{A_i \uparrow}^{(j)} = \begin{cases} \max(t_{R_i \downarrow}^{(0)} + \tau_{R_i \downarrow A_i \uparrow}, t_{S_i \downarrow}^{(0)} + \tau_{S_i \downarrow A_i \uparrow}) & j = 0 \\ \max(t_{R_i \downarrow}^{(j)} + \tau_{R_i \downarrow A_i \uparrow}, t_{S_i \downarrow}^{(j)} + \tau_{S_i \downarrow A_i \uparrow}), & j > 0 \end{cases} \quad (A.31)$$

$$t_{R_o \downarrow}^{(j)} = \begin{cases} t_{A_o \downarrow}^{(0)} + \tau_{A_o \downarrow R_o \downarrow} & j = 0 \\ t_{A_o \downarrow}^{(j)} + \tau_{A_o \downarrow R_o \downarrow} & j > 0 \end{cases} \quad (A.32)$$

The computational delay and the synchronizer delay are both bounded. Placing a bounded delay previous to the input of the four-phase asynchronous FIFO element does not interfere with correct operation. The end result of several synchronizer stages placed end-to-end is still an asynchronous FIFO. Placing computation on the data wires in between the FIFOs changes the data, making the FIFO resemble pipelined computation.

Figure 43:
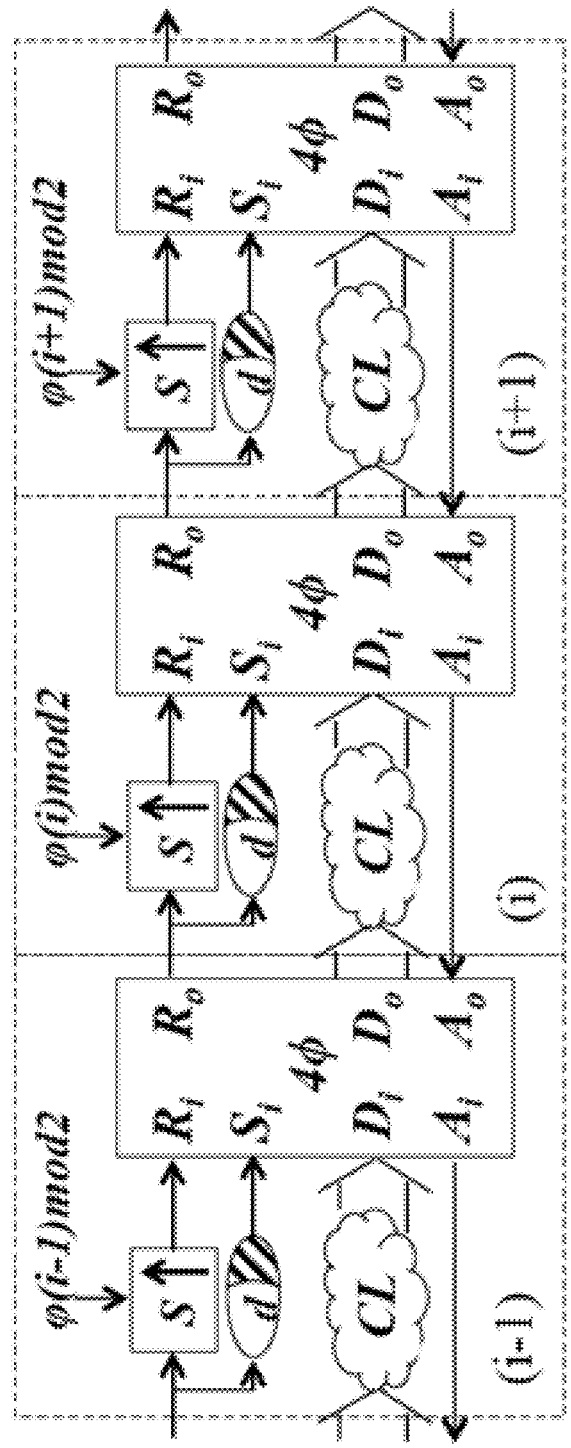
FIG. 43 shows an example of a segment of a four-phase asynchronous-to-synchronous gradual synchronizer.

The timing difference between the two-phase and four-phase handshaking is the result of the return to the same starting state nature of the four-phase handshake. The signals must complete both an up-going transition and a down going transition before the next data exchange can begin. A three stage segment of the four-phase asynchronous-to-synchronous gradual synchronizer is shown in FIG. 43. The $j^{th}$ up-going event on $R_o^{(i)}$ can only occur at time:

$$t_{R_o \uparrow}^{(i)(j)} = t_{R_i \uparrow}^{(i)(j)} + \tau_{R_i \uparrow A_i \downarrow} + \tau_{A_o \downarrow R_o \downarrow} + \tau_{R_i \downarrow R_o \uparrow}, \quad (A.33)$$

$$t_{R_o \uparrow}^{(i)(j)} = t_{A_o \uparrow}^{(i)(j-1)} + \tau_{A_o \uparrow A_i \downarrow} + \tau_{A_o \downarrow R_o \downarrow} + \tau_{R_i \downarrow R_o \uparrow}, \quad (A.34)$$

or at time:

$$t_{R_o\uparrow}{}^{(j)} = t_{S_i\uparrow}{}^{(j)} + \tau_{S_i\uparrow A_i\downarrow} + \tau_{A_o\downarrow R_o\downarrow} + \tau_{R_i\downarrow R_o\uparrow}. \quad (A.35)$$

It is important to observe that only one transition of a signal can drive a metastability failure because the four-phase version of the synchronizer only provides exclusion of the transition in one direction and the computational delay only delays one transition as well. The arrival times of the other transitions are deterministic based on the $\tau_S$ of the FIFO implementation. Therefore, the probability of metastability failure at the $(i+1)^{st}$ synchronizer is:

$$P_f^{(i+1)} \leq P_f^{(i+1)}(R_i\uparrow) + P_f^{(i+1)}(A_o\uparrow) + P_f^{(i+1)}(S_i\uparrow). \quad (A.36)$$

The first term of the sum in A.36 is the probability that an upgoing event on $R_i$ occurs $\tau_{R_i\uparrow A_i\downarrow} + \tau_{A_o\downarrow R_o\downarrow} + \tau_{R_i\downarrow R_o\uparrow}$ before a falling edge of $\varphi(i+1)$mod 2. The second term corresponds to the probability that an upgoing event on $A_o$ occurs $\tau_{A_o\uparrow A_i\downarrow} + \tau_{A_o\downarrow R_o\downarrow} + \tau_{R_i\downarrow R_o\uparrow}$ before a falling edge of $\varphi(i+1)$mod 2 and the third term in the sum is the probability that and upgoing event on $S_i$ occurs $\tau_{S_i\uparrow A_i\downarrow} + \tau_{A_o\downarrow R_o\downarrow} + \tau_{R_i\downarrow R_o\uparrow}$ before a falling edge of $\varphi(i+1)$mod 2. If the FIFO block implementation and the ME element implementation meet the requirement:

$$\tau_S + \tau_{R_i\uparrow A_i\downarrow} + \tau_{A_o\downarrow R_o\downarrow} + \tau_{R_i\downarrow R_o\uparrow} < T/2, \quad (A.37)$$

then metastability at the $(i+1)^{st}$ synchronizer can only occur if the $i^{th}$ synchronizer was in the metastable state for exactly $$t_m = T/2 - \tau_S - \tau_{R_i\uparrow A_i\downarrow} - \tau_{A_o\downarrow R_o\downarrow} - \tau_{R_i\downarrow R_o\uparrow}. \quad (A.38)$$

The resulting probability of metastability failure is $$P_f^{(i+1)}(R_i\uparrow) \leq P_f^{(i)} e^{-\frac{T/2 - \tau_S - \tau_{R_i\uparrow A_i\downarrow} - \tau_{A_o\downarrow R_o\downarrow} - \tau_{R_i\downarrow R_o\uparrow}}{\tau_0}}. \quad (A.39)$$

If both remaining probabilities, $P_f^{(i+1)}(A_o\uparrow)$ and $P_f^{(i+1)}(S_i\uparrow)$ are equal to zero the probability of failure at any stage k would be:

$$P_f^{(k)} \leq P_f^{(0)} e^{-\frac{k(\frac{T}{2} - T_{oh})}{\tau_0}}, \quad (A.40)$$

where, $$T_{oh} = \tau_S + \tau_{R_i\uparrow A_i\downarrow} + \tau_{A_o\downarrow R_o\downarrow} + \tau_{R_i\downarrow R_o\uparrow} \quad (A.41)$$

In the case of $P_f^{(i+1)}(S_i\uparrow)$, the $j^{(th)}$ up-going transition of $R_o^{(i-1)}$ must arrive at the computational delay $(\tau_d)$ in stage (i) exactly $$t_a = \tau_d + \tau_{S_i\uparrow A_i\downarrow} + \tau_{A_o\downarrow R_o\downarrow} + \tau_{R_i\downarrow R_o\uparrow} \quad (A.42)$$

before the falling clock edge in order for $S_i^{(i)} \uparrow$ to cause a metastability at the $(i+1)^{st}$ synchronizer. However, this is also the time that $R_o \uparrow$ arrives at synchronizer (i). Synchronizer (i) will be in a blocking phase at this point, therefore if the implementation of the gradual synchronizer satisfies the requirement $$\tau_d + \tau_{S_i\uparrow A_i\downarrow} + \tau_{A_o\downarrow R_o\downarrow} + \tau_{R_i\downarrow R_o\uparrow} < T/2 \quad (A.43)$$

then, $$P_f^{(i+1)}(S_i\uparrow) = 0, \quad (A.44)$$

since $R_i \uparrow$ will not propagate to the $i^{th}$ FIFO until $\tau_S$ after the falling edge of the clock at which point a metastability cannot occur in the $(i+1)^{st}$ synchronizer.

If the $(j-1)^{st}$ up-going transition of $A_o^{(i)}$ causes the $j^{th}$ up-going event on $R_o^{(i)}$ then:

$$t_{A_i\uparrow}{}^{(i+1)(j-1)} = t_{A_o\uparrow}{}^{(i)(j-1)} = t_{R_o\uparrow}{}^{(i)(j)} - \tau_{A_o\uparrow A_i\downarrow} - \tau_{A_o\downarrow R_o\downarrow} - \tau_{R_i\downarrow R_o\uparrow}. \quad (A.45)$$

As in the two-phase case a metastability at the $(i+1)^{st}$ synchronizer caused by an event on $A_o$ can only cause SEM at the $(i+2)^{nd}$ synchronizer which is harmless if:

$$t_{R_o\uparrow}{}^{(i)} - T/2 < t_{R_o\uparrow}{}^{(i+1)(j-1)} < t_{R_o\uparrow}{}^{(i)} + T/2. \quad (A.46)$$

The requirement:

$$\tau_{A_o\uparrow A_i\downarrow} + \tau_{A_o\downarrow R_o\downarrow} + \tau_{R_i\downarrow R_o\uparrow} < T/2, \quad (A.47)$$

follows from A.45 and A.46.

The proof that SEM can only cause SEM is the same as in the two phase case, not much changes, but the argument is included here for completeness and to show the equations in four-phase form. If the $j^{(th)}$ up-going transition on $R_o^{(i)}$ is SEM, then Definition 3.4.2 requires that $$t_{R_o\uparrow}{}^{(i)} = t_{\varphi(i+1)\bmod 2\downarrow}{}^{(k)} \quad (A.48)$$

$$t_{\varphi(i+1)\bmod 2\downarrow}{}^{(k-1)} < t_{R_o\uparrow}{}^{(i)(j-1)} < t_{\varphi(i+1)\bmod 2\downarrow}{}^{(k)}, \quad (A.49)$$

which means:

$$t_{R_o\uparrow}{}^{(i)} - T_0 + \tau_S \leq t_{R_i\uparrow}{}^{(i+1)(j-1)} < t_{R_o\uparrow}{}^{(i)} + \tau_S, \quad (A.50)$$

$$t_{R_o\uparrow}{}^{(i+1)(j-1)} \leq t_{R_o\uparrow}{}^{(i)} - T_0 + \tau_S + \tau_{R_i\uparrow R_o\uparrow}, \quad (A.51)$$

and this implies $$t_{R_o\uparrow}{}^{(i+1)(j-1)} > t_{R_o\uparrow}{}^{(i)} - T/2. \quad (A.52)$$

Since the timing of $R_o^{(i+1)}$ and $A_i^{(i+1)}$ are approximately equal, from equations A.45 and A.52:

$$t_{R_o\uparrow}{}^{(i)} - T/2 < t_{R_o\uparrow}{}^{(i+1)(j-1)} < t_{R_o\uparrow}{}^{(i)} + T/2, \quad (A.53)$$

which is in accordance with A.46 meaning SEM at the $i^{(th)}$ synchronizer can only cause SEM at the synchronizer in the next stage.

Figure 44:
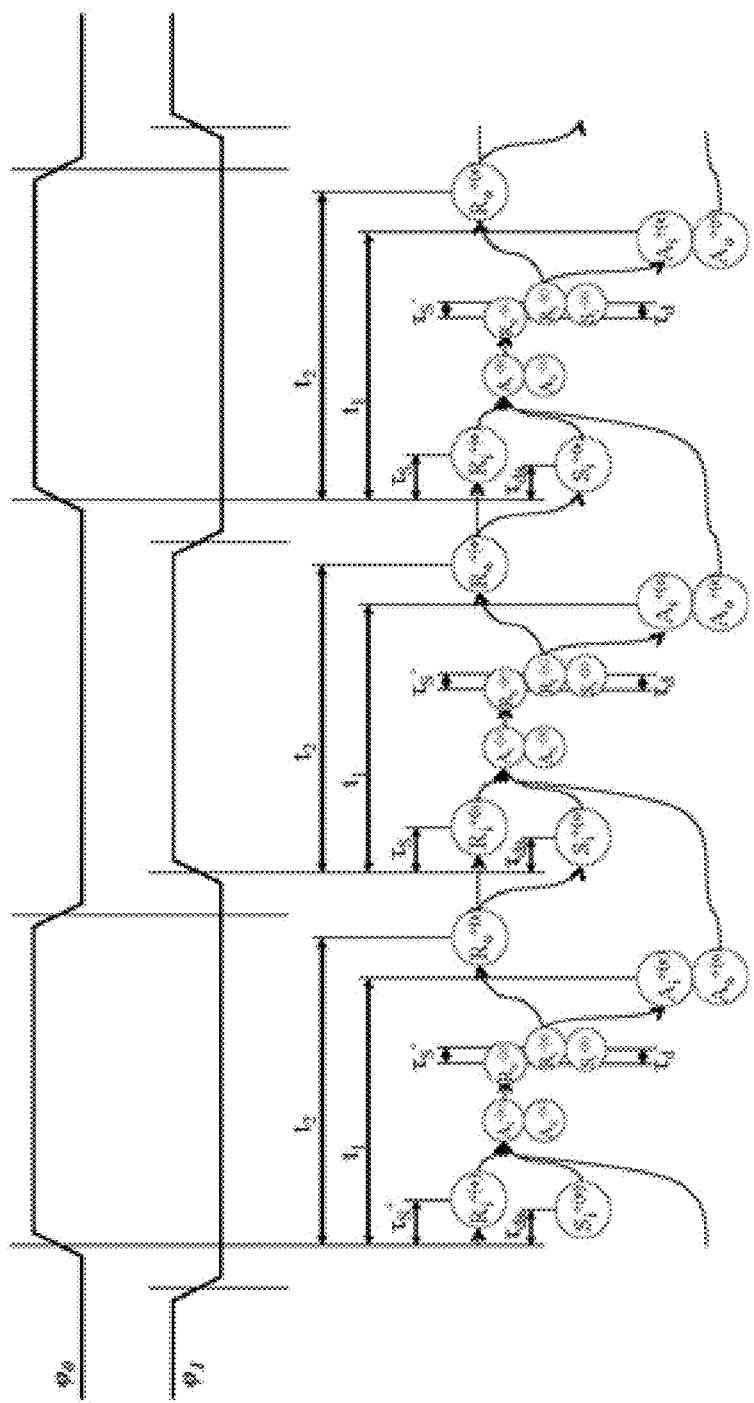
FIG. 44 shows an example of a steady-state operation of a four-phase asynchronous-to-synchronous gradual synchronizer.

The synchronous environment on the receiving side of the synchronizer can only accept data once every clock cycle. The synchronizer itself must be able to sustain that throughput. The requirements that must be met for the synchronizer to function at that throughput can be found by modeling the steady-state of the synchronizer chain. FIG. 44 shows the steady state of the four-phase synchronizer. In the four-phase case multiple transitions contribute to the delay between receiving a request and completing the acknowledge, so t1 becomes:

$$t1 = \max\left(\tau_S + \tau_{R_i\uparrow A_i\downarrow} + \tau_{A_o\downarrow R_o\downarrow} + \tau_{R_i\downarrow A_i\uparrow}, \right. \quad (A.54)$$

$$\tau_{da} + \tau_{S_i\uparrow A_i\downarrow} + \tau_{A_o\downarrow R_o\downarrow} + \tau_{R_i\downarrow A_i\uparrow},$$

$$\left. t1 + \tau_{A_o\uparrow A_i\downarrow} + \tau_{A_o\downarrow R_o\downarrow} + \tau_{R_i\uparrow A_i\downarrow} - \frac{T}{2}\right)$$

and t2 must include all the transitions that occur before sending a request on to the next stage, therefore t2 is $$t2 = \quad (A.55)$$

$$\max\left(\tau_S + \tau_{R_i\uparrow A_i\downarrow} + \tau_{A_o\downarrow R_o\downarrow} + \tau_{R_i\downarrow R_o\uparrow}, \tau_{da} + \tau_{S_i\uparrow A_i\downarrow} + \tau_{A_o\downarrow R_o\downarrow} + \right.$$

$$\left. \tau_{R_i\downarrow R_o\uparrow}, t1 + \tau_{A_o\uparrow A_i\downarrow} + \tau_{A_o\downarrow R_o\downarrow} + \tau_{R_i\uparrow R_o\downarrow} - \frac{T}{2}\right).$$

If $$\tau_{A_o\uparrow A_i\downarrow} + \tau_{A_o\uparrow R_o\downarrow} + \tau_{R_i\downarrow A_i\uparrow} < \frac{T}{2} \quad (A.56)$$

then $$t1 = \max(\tau_S + \tau_{R_i\uparrow A_i\downarrow} + \tau_{A_o\downarrow R_o\downarrow} + \tau_{R_i\downarrow A_i\uparrow}, \quad (A.57)$$
$$\tau_{da} + \tau_{S_i\uparrow A_i\downarrow} + \tau_{A_o\downarrow R_o\downarrow} + \tau_{R_i\downarrow A_i\uparrow})$$

$$t2 = \max\Big(\tau_S + \tau_{R_i\uparrow A_i\downarrow} + \tau_{A_o\downarrow R_o\downarrow} + \tau_{R_i\downarrow R_o\uparrow}, \quad (A.58)$$
$$\tau_{da} + \tau_{S_i\uparrow A_i\downarrow} + \tau_{A_o\downarrow R_o\downarrow} + \tau_{R_i\downarrow R_o\uparrow}, \tau_S + \tau_{R_i\uparrow A_i\downarrow} + \tau_{A_o\downarrow R_o\downarrow} +$$
$$\tau_{R_i\downarrow A_i\uparrow} + \tau_{A_o\uparrow A_i\downarrow} + \tau_{A_o\downarrow R_o\downarrow} + \tau_{R_i\downarrow R_o\uparrow} - \frac{T}{2}, \tau_{da} + \tau_{S_i\uparrow A_i\downarrow} +$$
$$\tau_{A_o\downarrow R_o\downarrow} + \tau_{R_i\uparrow A_i\downarrow} + \tau_{A_o\uparrow A_i\downarrow} + \tau_{A_o\downarrow R_o\downarrow} + \tau_{R_i\downarrow R_o\uparrow} - \frac{T}{2}\Big).$$

In order for the steady state to be possible t2 cannot exceed half the clock period:

$$\tau_S + \tau_{R_i\uparrow A_i\downarrow} + \tau_{A_o\downarrow R_o\downarrow} + \tau_{R_i\downarrow R_o\uparrow} < T/2$$

$$\tau_{da} + \tau_{R_i\uparrow A_i\downarrow} + \tau_{A_o\downarrow R_o\downarrow} + \tau_{R_i\downarrow R_o\uparrow} < T/2$$

$$\tau_S + \tau_{R_i\uparrow A_i\downarrow} + \tau_{A_o\downarrow R_o\downarrow} + \tau_{R_i\downarrow A_i\uparrow} + \tau_{A_o\uparrow A_i\downarrow} + \tau_{A_o\downarrow R_o\downarrow} + \tau_{R_i\downarrow R_o\uparrow} < T$$

$$\tau_{da} + \tau_{S_i\uparrow A_i\downarrow} + \tau_{A_o\downarrow R_o\downarrow} + \tau_{R_i\downarrow A_i\uparrow} + \tau_{A_o\uparrow A_i\downarrow} + \tau_{A_o\downarrow R_o\downarrow} + \tau_{R_i\downarrow R_o\uparrow} < T \quad (A.59)$$

Again $\tau_{da}$ is just a place holder to represent the portion of $\tau_d$ that occurs after the clock edge. Ideally, the requirements should be expressed in terms of $\tau_d$, so going back to equation A.58 and substituting for $\tau_{da}$, the second term in the max expression becomes:

$$\tau_d - \tau_{db} + \tau_{S_i\uparrow A_i\downarrow} + \tau_{A_o\downarrow R_o\downarrow} + \tau_{R_i\downarrow R_o\uparrow} \quad (A.60)$$

Since, $$\tau_{db} = T/2 - t2 \quad (A.61)$$

the term then becomes $$\tau_d - T/2 + t2 + \tau_{S_i\uparrow A_i\downarrow} + \tau_{A_o\downarrow R_o\downarrow} + \tau_{R_i\downarrow R_o\uparrow} \quad (A.62)$$

Given that the above equation includes t2, the term can be canceled by including the requirement:

$$\tau_d + \tau_{S_i\uparrow A_i\downarrow} + \tau_{A_o\downarrow R_o\downarrow} + \tau_{R_i\downarrow R_o\uparrow} < T/2. \quad (A.63)$$

The fourth term in the max expression from equation A.58 can be canceled in a similar manner leading to the requirement:

$$\tau_d + \tau_{S_i\uparrow A_i\downarrow} + \tau_{A_o\downarrow R_o\downarrow} + \tau_{R_i\downarrow A_i\uparrow} + \tau_{A_o\uparrow A_i\downarrow} + \tau_{A_o\downarrow R_o\downarrow} + \tau_{R_i\downarrow R_o\uparrow} < T. \quad (A.64)$$

The gradual synchronizer is not infinitely long so there are boundary conditions that must be met in order to ensure the steady state is possible as well. At the synchronous end this conditions is:

$$\tau_{RA} + \tau_{A_o\uparrow R_o\uparrow}. \quad (A.65)$$

At the asynchronous end the conditions are:

$$\tau_S + \tau_{R_i\uparrow A_i\downarrow} + \tau_{A_o\downarrow R_o\downarrow} + \tau_{R_i\downarrow A_i\uparrow} + \tau_{AR} < T$$

$$\tau_d + \tau_{S_i\uparrow A_i\downarrow} + \tau_{A_o\downarrow R_o\downarrow} + \tau_{S_i\downarrow A_i\uparrow} + \tau_{AR} < T \quad (A.66)$$

The explanation of these boundary requirements is exactly the same as in the two-phase asynchronous-to-synchronous case, the only changes are due to the four-phase handshake, so the explanation is not repeated here.

Four-Phase Synchronous to Asynchronous Gradual Synchronizer

Figure 45:
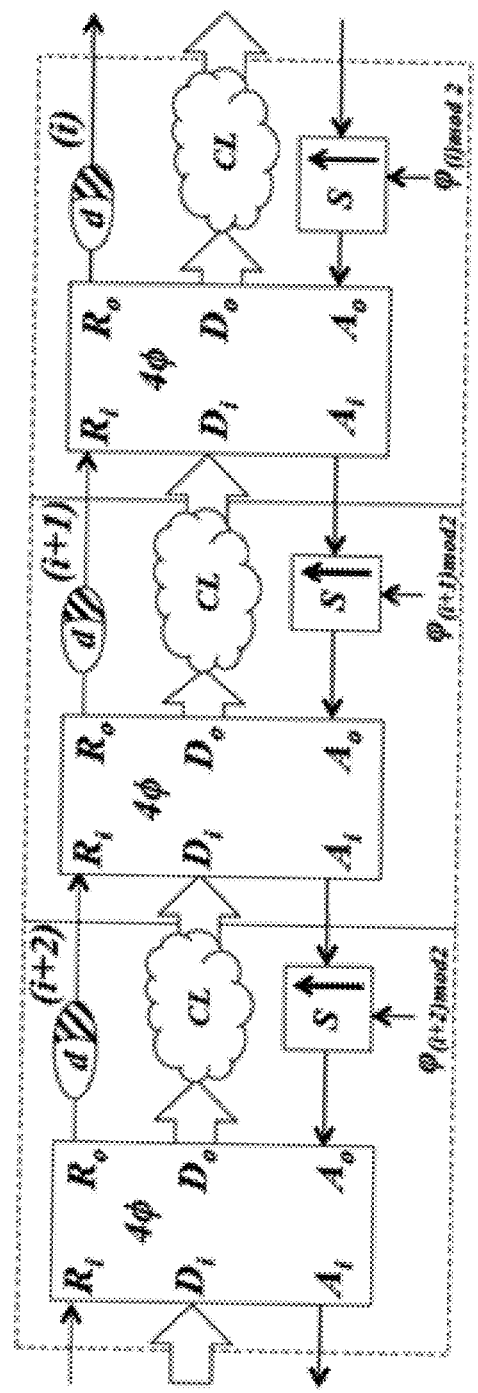
FIG. 45 shows an example of a segment of the 4-phase synchronous-to-asynchronous gradual synchronizer.

This section shows the derivation of the requirements and the correctness proof of the four-phase synchronous-to-asynchronous gradual synchronizer. A segment of this synchronizer if shown in FIG. 45. The HSE of the FIFO used in this gradual synchronizer is:

$$*[[R_i]; A_i\downarrow; [\overline{R_i}]; A_i\uparrow, R_o\uparrow; [\overline{A_o}]; R_o\downarrow; [A_o]]. \quad (A.67)$$

The $j^{th}$ upgoing event on $A_i^{(i)}$ can only occur at time:

$$t_{A_i^{(i)}\uparrow}^{(j)} = t_{R_i^{(i)}\uparrow}^{(j)} + \tau_{R_i\uparrow A_i\downarrow} + \tau_{A_o\downarrow R_o\downarrow} + \tau_{R_i\downarrow A_i\uparrow}, \quad (A.68)$$

$$t_{A_i^{(i)}\uparrow}^{(j)} = t_{A_o^{(i)}\uparrow}^{(j-1)} + \tau_{R_i\uparrow A_i\downarrow} + \tau_{A_o\downarrow R_o\downarrow} + \tau_{R_i\downarrow A_i\uparrow}. \quad (A.69)$$

In the four-phase gradual synchronizer the down-going transitions of $R_o$ and A are forwarded directly to their receiving FIFO blocks, these transitions do not get delayed or synchronized. There is only a very small logic cost for this forwarding, so in order to simplify the above equations this cost is assumed to be absorbed into the receiving FIFO delay, since this constant delay would look the same as $\tau_{A_o\downarrow R_o\downarrow}$ and $\tau_{R_i\downarrow A_i\uparrow}$ taking slightly longer. Obviously, when designing a system these delays must be taken into account. The upgoing event on $A_i^{(i)}$ can cause metastable behavior at the $(i+1)^{st}$ synchronizer if it occurs at the same time as the falling clock edge of $\varphi_{(i+1) \mod 2}$. The probability of metastability failure at the $(i+1)^{st}$ synchronizer is $$P_f^{(i+1)} \leq P_f^{(i+1)}(R_i\uparrow) + P_f^{(i+1)}(A_o\uparrow). \quad (A.70)$$

The second term in equation A.70 refers to the probability that the timing of an up-going event on $A_o$ takes place $\tau_{A_o\uparrow A_i\downarrow} + \tau_{R_i\downarrow A_i\uparrow} + \tau_{A_o\downarrow R_o\downarrow}$ before the clock edge. If the delay from the incoming upgoing transition on $A_o$ until the outgoing upgoing transition on $A_i$ when a new incoming request on $R_i$ was waiting for $A_o$ is:

$$\tau_{A_o\uparrow A_i\downarrow} + \tau_{R_i\downarrow A_i\uparrow} + \tau_{A_o\downarrow R_o\downarrow} < T/2 - \tau_S, \quad (A.71)$$

then for a metastability to occur at the $(i+1)^{st}$ synchronizer, the $i^{(th)}$ synchronizer must have entered the metastable state half a clock period beforehand and remained in the metastable state for exactly:

$$t = T/2 - \tau_S - \tau_{A_o\uparrow A_i\downarrow} + \tau_{R_i\downarrow A_i\uparrow} + \tau_{A_o\downarrow R_o\downarrow} \quad (A.72)$$

This means the probability of metastability failure at synchronizer (i+1) due to $A_o$ is:

$$P_f^{(i+1)}(A_o) \leq P_f^{(i)} e^{-\frac{T/2 - \tau_S - (\tau_{A_o\uparrow A_i\downarrow} + \tau_{R_i\downarrow A_i\uparrow} + \tau_{A_o\downarrow R_o\downarrow})}{\tau_0}}. \quad (A.73)$$

If the second term in A.70 were equal to zero then:

$$P_f^{(k)} \leq P_f^{(0)} e^{-\frac{k(T/2 - T_{oh})}{\tau_0}}, \quad (A.74)$$

where, $$T_{oh} = \tau_S + \tau_{A_o\uparrow A_i\downarrow} + \tau_{R_i\downarrow A_i\uparrow} + \tau_{A_o\downarrow R_o\downarrow}. \quad (A.75)$$

Recall from the previous proofs that if a metastability is SEM then it does not affect the correct operation of the synchronizer. Even if Td changes the arrival time of $R_i^{(i)}\uparrow$ to a time where it causes a metastability the method is still valid as long as that metastability is SEM. If the $j^{th}$ up-going event on $A_i^{(i)}$ is caused by the $j^{th}$ up-going event on $R_i^{(i)}$:

$$t_{A_i^{(i+1)}\uparrow}^{(j)} + \tau_d = t_{R_i^{(i)}\uparrow}^{(j)} = t_{A_i^{(i)}\uparrow}^{(j)} - \tau_{R_i\uparrow A_i\downarrow} + \tau_{A_o\downarrow R_o\downarrow} + \tau_{R_i\downarrow A_i\uparrow} \quad (A.76)$$

If a metastability at the $(i+1)^{st}$ synchronizer happens as a result of the arrival time of the $(j)^{th}$ up-going transition of $R_i^{(i)}$ then in turn a metastability can occur at the $(i+2)^{nd}$ synchronizer. The metastability at the $(i+2)^{nd}$ synchronizer will always be SEM if:

$$t_{A_i^{(i)}}^{(j)} - T/2 < t_{A_i^{(i+1)}}^{(j+1)} < t_{A_i^{(i)}}^{(j)} + T/2 \quad (A.77)$$

Which, in the four-phase case, leads to the requirement:

$$\tau_{R_i\uparrow A_i\downarrow} + \tau_{A_o\downarrow R_o\downarrow} + \tau_{R_i\downarrow A_i\uparrow} + \tau_d < T/2. \quad (A.78)$$

SEM itself can cause metastability as well, however SEM can only cause SEM. Suppose the $j^{th}$ event on $A_i^{(i)}$ is SEM, this event must have occurred at time:

$$t_{A_i^{(i)}\uparrow}^{(j)} = \varphi_{(i+1) \bmod 2\downarrow}^{(k)} \quad (A.79)$$

and the previous up-going event must have occurred within the last clock cycle, $$\varphi_{(i+1) \bmod 2\downarrow}^{(k-1)} < t_{A_i^{(i)}\uparrow}^{(j-1)} < \varphi_{(i+1) \bmod 3\downarrow}^{(k)} \quad (A.80)$$

therefore the $(j-1)^{st}$ up-going event on $A_o^{(i+1)}$ took place $$t_{A_i^{(i)}\uparrow}^{(j)} - T_0 + \tau_S \le t_{A_o^{(i+1)}}^{(j-1)} < t_{A_i^{(i)}\uparrow}^{(j)} + \tau_S \quad (A.81)$$

and $$t_{A_i^{(i+1)}\uparrow}^{(j-1)} \ge t_{A_i^{(i)}\uparrow}^{(j)} - T_0 + \tau_S + \tau_{A_o\uparrow A_i\downarrow} + \tau_{A_o\downarrow R_o\downarrow} + \tau_{R_i\downarrow A_i\uparrow} \quad (A.82)$$

which implies that the arrival of the $(j-1)^{st}$ up-going event at the $(i+2)^{nd}$ synchronizer must be $$t_{A_i^{(i+1)}\uparrow}^{(j-1)} > t_{A_i^{(i)}\uparrow}^{(j)} - T/2. \quad (A.83)$$

Since, for the FIFO implementation the arrival times of $R_o \uparrow$ and $A_i \uparrow$ are approximately equal $$t_{A_i^{(i+1)}\uparrow}^{(j-1)} \approx t_{R_{o_2}^{(i+1)}\uparrow}^{(j-1)} \le t_{A_i^{(i)}\uparrow}^{(j)} - \tau_{R_i\uparrow A_i\downarrow} - \tau_d - \tau_{A_o\downarrow R_o\downarrow} - \tau_{R_i\downarrow A_i\uparrow} - \tau_{d\uparrow} \quad (A.84)$$

and according to the requirement $\tau_{R_i\uparrow A_i\downarrow} + \tau_{d\uparrow} + \tau_{A_o\downarrow R_o\downarrow} + \tau_{R_i\downarrow A_i\uparrow} + \tau_{d\downarrow} < T/2$ and equation A.83:

$$t_{A_i^{(i)}}^{(j)} - T/2 < t_{A_i^{(i+1)}}^{(j-1)} < t_{A_i^{(i)}}^{(j)} + T/2 \quad (A.85)$$

Meaning, in the presence of SEM at the $i^{th}$ synchronizer, a subsequent metastable event at the $(i+_1)^{st}$ synchronizer must also be SEM.

Throughput

Figure 46:
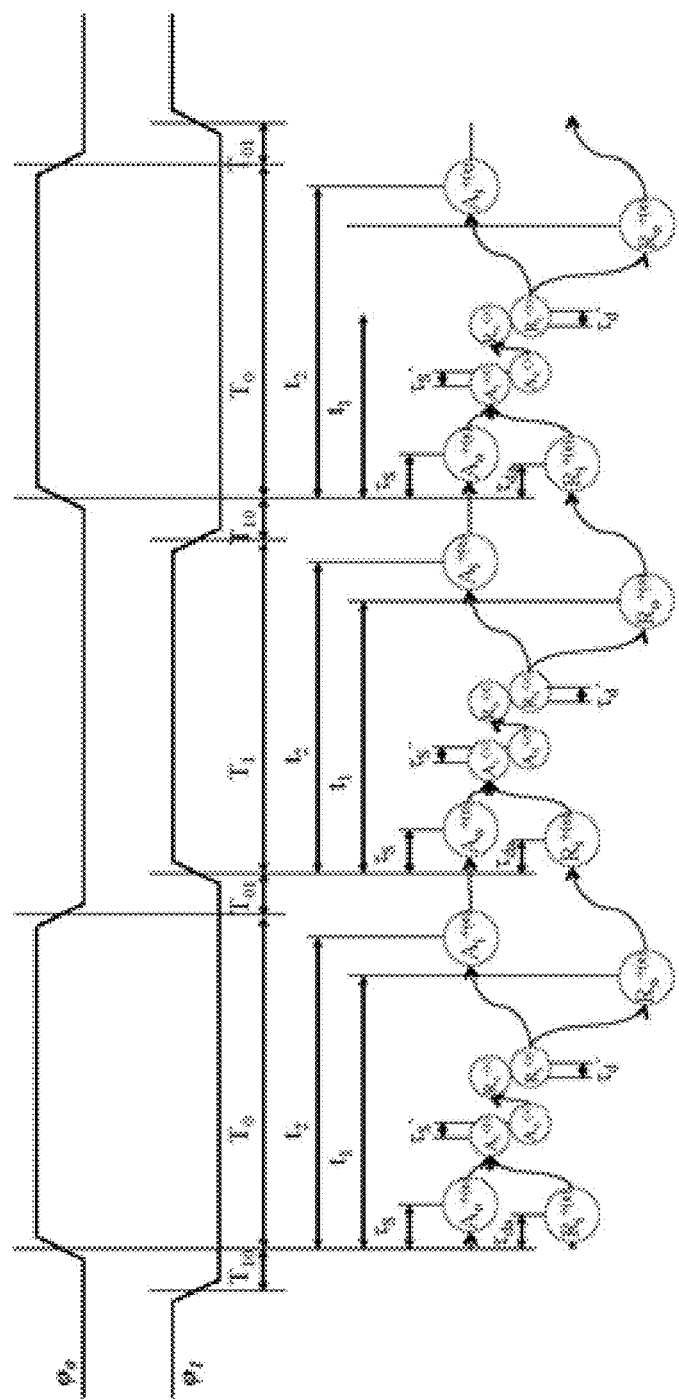
FIG. 46 shows an example of a steady-state operation of a four-phase synchronous-to-asynchronous gradual synchronizer.

The gradual synchronizer must be capable of accepting one request and retuning one acknowledge per clock cycle. FIG. 46 shows the steady state of a 2-phase synchronous-to-asynchronous gradual synchronizer with an infinite number of stages. All up-going events on $A_o$ entering even-numbered FIFO blocks arrive $\tau_S$ after the rising edge of $\varphi_0$. All upgoing events on $A_o$ entering odd-numbered FIFO blocks arrive $\tau_S$ after the rising edge of $\varphi_1$. All up-going events on $R_i$ entering even-numbered FIFO blocks arrive $\tau_{da}$ after the rising edge of $\varphi_0$ and all up-going events on $R_i$ entering odd-numbered FIFO blocks arrive $\tau_{da}$ after the rising edge of $\varphi_1$. The $V_o$ input is left off the diagram since it only contributes to shortening $\tau_{A_q\uparrow A_i\downarrow}$. While $\tau_{S}$ and $\tau_{d}$ are shown on the diagram, for simplicity they are not displayed in the following equations. Since they are constants we assume that they are included in the following FIFO delay. In the steady state no synchronizer assumes a metastable state, and:

$$t1 = \max(\tau_S + \tau_{A_o\uparrow A_i\downarrow} + \tau_{A_o\downarrow R_o\downarrow} + \tau_{R_i\downarrow R_o\uparrow}, \tau_{da} + \tau_{R_i\uparrow A_i\downarrow} + \tau_{A_o\downarrow R_o\downarrow} + \tau_{R_i\downarrow R_o\uparrow}), \quad (A.86)$$

$$t2 = \max(\tau_S + \tau_{A_o\uparrow A_i\downarrow} + \tau_{A_o\downarrow R_o\downarrow} + \tau_{R_i\downarrow A_i\uparrow}, \tau_{da} + \tau_{R_i\uparrow A_i\downarrow} + \tau_{A_o\downarrow R_o\downarrow} + \tau_{R_i\downarrow A_i\uparrow}). \quad (A.87)$$

Since $$\tau_{da} = \tau_d - \tau_{db} \quad (A.88)$$

and $$\tau_{db} = \frac{T}{2} - t1, \quad (A.89)$$

$$t1 = \max(\tau_S + \tau_{A_o\uparrow A_i\downarrow} + \tau_{A_o\downarrow R_o\downarrow} + \tau_{R_i\downarrow R_o\uparrow}, \quad (A.90)$$
$$\tau_d - (T/2 - t1) + \tau_{R_i\uparrow A_i\downarrow} + \tau_{A_o\downarrow R_o\downarrow} + \tau_{R_i\downarrow R_o\uparrow}),$$

$$t2 = \max(\tau_S + \tau_{A_o\uparrow A_i\downarrow} + \tau_{A_o\downarrow R_o\downarrow} + \tau_{R_i\downarrow A_i\uparrow}, \quad (A.91)$$
$$\tau_d - (T/2 - t1) + \tau_{R_i\uparrow A_i\downarrow} + \tau_{A_o\downarrow R_o\downarrow} + \tau_{R_i\downarrow A_i\uparrow}).$$

For $\tau_d + \tau_{R_i\uparrow A_i\downarrow} + \tau_{A_o\downarrow R_o\downarrow} + \tau_{R_i\downarrow R_o\uparrow} < T/2$, $$t1 = \tau_S + \tau_{A_o\uparrow A_i\downarrow} + \tau_{A_o\downarrow R_o\downarrow} + \tau_{R_i\downarrow R_o\uparrow} \quad (A.92)$$

$$t2 = \max(\tau_S + \tau_{A_o\uparrow A_i\downarrow} + \tau_{A_o\downarrow R_o\downarrow} + \tau_{R_i\downarrow A_i\uparrow}, \tau_d - T/2 + \tau_S + \tau_{A_o\uparrow A_i\downarrow} + \tau_{A_o\downarrow R_o\downarrow} + \tau_{R_i\downarrow R_o\uparrow} + \tau_{R_i\uparrow R_o\downarrow} + \tau_{A_o\downarrow R_o\downarrow} + \tau_{R_i\downarrow A_i\uparrow}) \quad (A.93)$$

For the maximum throughput to be maintained t2 must be less than half a clock period, so:

$$\tau_S + \tau_{A_o\uparrow A_i\downarrow} + \tau_{A_o\downarrow R_o\downarrow} + \tau_{R_i\downarrow A_i\uparrow} < T/2$$

$$\tau_S + \tau_d + \tau_{A_o\uparrow A_i\downarrow} + \tau_{A_o\downarrow R_o\downarrow} + \tau_{R_i\downarrow A_i\uparrow} + \tau_{R_i\uparrow A_i\downarrow} + \tau_{A_o\downarrow R_o\downarrow} + \tau_{R_i\downarrow A_i\uparrow} < T \quad (A.94)$$

The synchronous end has an interface which does not include computation, therefore the requirement at the synchronous end of a finite-length pipeline remains:

$$\tau_{AR} + \tau_{R_i\uparrow A_i\downarrow} + \tau_{A_o\downarrow R_o\downarrow} + \tau_{R_i\downarrow A_i\uparrow} < T. \quad (A.95)$$

The asynchronous end requirement must include the computational delay effect:

$$\tau_S + \tau_{A_o\uparrow A_i\downarrow} + \tau_{A_o\downarrow R_o\downarrow} + \tau_{R_i\downarrow R_o\uparrow} + \tau_{RA} + \tau_d < T. \quad (A.96)$$

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A device for gradual clock synchronization, comprising:
    a cascade of multiple First In First Out (FIFO) blocks coupleable between a first clock domain comprising circuits clocked by a first clock and a second clock domain comprising circuits clocked by a second clock;
    wherein two adjacent FIFO blocks include data storage FIFOs that are connected in parallel to each other via:
    a fixed delay circuit;
    a data computation block configured to perform computations on data; and
    a synchronizer coupled in parallel to the data computation block and configured to synchronize signals output from the second clock domain to the first clock domain; and
    wherein the data computations through the data computation block occur in parallel to clock synchronization through the synchronizer.

2. The device of claim 1, wherein the fixed delay circuit delays a signal passing through by a time that is equal to a worst case delay through the data computation block.

3. The device of claim 1, wherein the FIFO stage locks data values computed by the data computational block only after ascertaining stability of the data values.

4. The device of claim 3, wherein the synchronizer uses a clock transition to make a determination of stability of the data values.

5. The device of claim 1, wherein the synchronizer changes values of at least some data processed through the synchronizer.

6. The device of claim 1, wherein the first clock domain is an asynchronous clock domain and wherein the second clock domain is a synchronous clock domain.

7. The device of claim 6, wherein the data storage FIFOs are driven by a two-phase clock.

8. The device of claim 6, wherein the data storage FIFOs are driven by a four-phase clock.

9. The device of claim 1, wherein the first clock domain is a synchronous clock domain and wherein the second clock domain is an asynchronous clock domain.

10. The device of claim 9, wherein the data storage FIFOs are driven by one of a two-phase clock and a four-phase clock.

11. A method performed by a first FIFO block of a device, comprising:
   receiving a request signal passing through a synchronizer block from a second FIFO block connected to a second clock domain comprising circuits clocked by a second clock, wherein the first FIFO block is connected to a first clock domain comprising circuits clocked by a first clock, the second FIFO block receives data from the second clock domain, the first FIFO block sends data to the first clock domain, and the synchronizer block synchronizes signals output from the second clock domain to the first clock domain;
   receiving a data input signal from the second FIFO block passing through a data computation block placed between the first FIFO block and the second FIFO block, and
   performing, using a data computation block, computations on data in parallel with the synchronizer synchronizing signals other than the data.

12. The method of claim 11, further comprising:
   acknowledging receipt of the request signal received by the first FIFO block; and
   issuing a second request to a next stage of the device.

13. The method of claim 11, further comprising:
   processing the data input signal to change a value of the data input signal.

14. The method of claim 13, further comprising:
   making a determination, at a clock edge, whether the value of the data input signal after change is stable.

* * * * *